(12) United States Patent
Jeong et al.

(10) Patent No.: US 12,136,381 B2
(45) Date of Patent: Nov. 5, 2024

(54) DISPLAY DEVICE AND TILED DISPLAY DEVICE INCLUDING THE SAME

(71) Applicant: Samsung Display Co., LTD., Yongin-si (KR)

(72) Inventors: Jun Ki Jeong, Yongin-si (KR); Hyun Joon Kim, Hwaseong-si (KR); Kye Uk Lee, Seoul (KR); Sang Jin Jeon, Hwaseong-si (KR); Jung Hwan Hwang, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/842,927

(22) Filed: Jun. 17, 2022

(65) Prior Publication Data

US 2023/0082959 A1 Mar. 16, 2023

(30) Foreign Application Priority Data

Sep. 16, 2021 (KR) .......................... 10-2021-0123718

(51) Int. Cl.
*G09G 3/32* (2016.01)

(52) U.S. Cl.
CPC ......... *G09G 3/32* (2013.01); *G09G 2300/026* (2013.01); *G09G 2300/0426* (2013.01); *G09G 2310/0297* (2013.01); *G09G 2330/04* (2013.01)

(58) Field of Classification Search
None
See application file for complete search history.

(56) References Cited

U.S. PATENT DOCUMENTS

| 10,134,327 | B2* | 11/2018 | Park | G09G 3/20 |
| 2005/0116906 | A1* | 6/2005 | Goto | G09G 3/3208 345/76 |
| 2016/0182042 | A1* | 6/2016 | Kim | G06F 1/04 327/109 |
| 2017/0110041 | A1* | 4/2017 | Watsuda | G09G 3/20 |
| 2018/0301104 | A1* | 10/2018 | Hao | G09G 3/3685 |
| 2020/0159054 | A1* | 5/2020 | Jeong | G09G 3/32 |
| 2020/0202784 | A1* | 6/2020 | Kim | G09G 3/3291 |

(Continued)

FOREIGN PATENT DOCUMENTS

| CN | 110189639 | 8/2019 |
| CN | 112420790 | 2/2021 |

(Continued)

*Primary Examiner* — Patrick N Edouard
*Assistant Examiner* — Peijie Shen
(74) *Attorney, Agent, or Firm* — CANTOR COLBURN LLP

(57) ABSTRACT

A display device includes a display area which displays an image, and a non-display area disposed around the display area and including a pad part. The display area includes pixels of a first pixel row which are pixels arranged in a first direction along the first pixel row, pixels of a second pixel row, which are pixels arranged in the first direction along the second pixel row next to the first pixel row, and pixel circuits of a first circuit row which are pixel circuits arranged in the first direction along the first circuit row, where the pixel circuits of the first circuit row are electrically connected to the pixels of the first pixel row, respectively. The first pixel row and the first circuit row are spaced apart from each other with the second pixel row interposed therebetween.

21 Claims, 27 Drawing Sheets

(56) References Cited

U.S. PATENT DOCUMENTS

| | | | |
|---|---|---|---|
| 2020/0243021 A1* | 7/2020 | Li | G09G 3/3266 |
| 2020/0251457 A1 | 8/2020 | Huang et al. | |
| 2021/0012706 A1* | 1/2021 | Yang | G09G 3/32 |
| 2021/0096615 A1* | 4/2021 | Hu | G06F 1/189 |
| 2022/0069047 A1* | 3/2022 | Yang | H10K 59/88 |
| 2022/0208933 A1* | 6/2022 | Choi | G09G 3/3233 |
| 2022/0359577 A1* | 11/2022 | Jeong | G09G 3/2085 |
| 2023/0025386 A1* | 1/2023 | Sun | G09G 3/32 |
| 2023/0133807 A1* | 5/2023 | Kwak | H10K 59/131 |
| | | | 257/40 |
| 2023/0162687 A1* | 5/2023 | Kim | G09G 3/035 |
| | | | 345/76 |

FOREIGN PATENT DOCUMENTS

| | | |
|---|---|---|
| KR | 1020160099999 | 8/2016 |
| KR | 1020160110737 | 9/2016 |
| KR | 1020170080962 | 7/2017 |
| KR | 1020190113535 | 10/2019 |
| KR | 1020190137658 | 12/2019 |

* cited by examiner

T16: T161, 162

DISPLAY DEVICE AND TILED DISPLAY DEVICE INCLUDING THE SAME

This application claims priority to Korean Patent Application No. 10-2021-0123718, filed on Sep. 16, 2021, and all the benefits accruing therefrom under 35 U.S.C. 119, the content of which in its entirety is herein incorporated by reference.

BACKGROUND

1. Field

The disclosure relates to a display device and a tiled display device including the display device.

2. Description of the Related Art

With the advance of information-oriented society, more and more demands are placed on display devices for displaying images in various ways. For example, display devices are employed in various electronic devices such as smartphones, digital cameras, laptop computers, navigation devices, and smart televisions. The display device may be a flat panel display device such as a liquid crystal display device, a field emission display device and an organic light emitting display device. Among the flat panel display devices, in the light emitting display device, since each of pixels of a display panel includes a light emitting element capable of emitting light by itself, an image may be displayed without a backlight unit providing light to the display panel.

SUMMARY

When the display device is manufactured in a large size, a defect rate of the light emitting element may increase due to an increase in the number of pixels, thereby deteriorating productivity or reliability of the display device. Accordingly, a large-sized screen may be implemented by connecting a plurality of display devices having a relatively small size as a tiled display device. The tiled display device may include a boundary portion or a seam between the plurality of display devices, due to a non-display area or a bezel area of each of the plurality of display devices adjacent to each other. When a single image is displayed on the entire screen of the tiled display device, the boundary portion between the plurality of display devices gives a sense of disconnection over the entire screen, thereby reducing a sense of immersion in the image.

Embodiments of the disclosure provide a display device capable of minimizing a non-display area and designing a pixel pitch between adjacent display devices to be the same as a pixel pitch in a display device, and a tiled display device including the display device.

Embodiments of the disclosure provide a display device capable of removing a sense of disconnection between a plurality of display devices and improving a sense of immersion in an image by preventing a boundary portion between the plurality of display devices or a non-display area from being recognized, and a tiled display device including the display device.

According to an embodiment of the disclosure, a display device includes a display area which displays an image, and a non-display area disposed around the display area and including a pad part. In such an embodiment, the display area includes pixels of a first pixel row which are pixels arranged in a first direction along the first pixel row, pixels of a second pixel row which are pixels arranged in the first direction along the second pixel row next to the first pixel row, and pixel circuits of a first circuit row which are pixel circuits arranged in the first direction along the first circuit row, where the pixel circuits of the first circuit row are electrically connected to the pixels of the first pixel row, respectively. In such an embodiment, the first pixel row and the first circuit row are spaced apart from each other with the second pixel row interposed therebetween.

In an embodiment, the display area may further include a first anode connection line electrically connecting one of the pixels of the first pixel row a to a corresponding one of the pixel circuits of the first circuit row. In such an embodiment, the first anode connection line may overlap the second pixel row.

In an embodiment, the display area may further include pixels of a third pixel row which pixels are arranged in the first direction along the third pixel row next to the second pixel row, and pixel circuits of a second circuit row which are pixel circuits arranged in the first direction along the second circuit row next to the first circuit row, where the pixel circuits of the second circuit row may be electrically connected to the pixels of the second pixel row, respectively. In such an embodiment, the second pixel row and the second circuit row may be spaced apart from each other with the third pixel row interposed therebetween.

In an embodiment, the display area may further include a second anode connection line electrically connecting one of the pixels of the second pixel row to a corresponding one of the pixel circuits of the second circuit row. In such an embodiment, the second anode connection line may overlap the third pixel row.

In an embodiment, the display area may further include a demultiplexer disposed between the second pixel row and the third pixel row. In such an embodiment, the first circuit row may be disposed between the demultiplexer and the third circuit row.

In an embodiment, the display area may further include a fan-out area including a fan-out line disposed between the pad part of the non-display area and the demultiplexer. In such an embodiment, the fan-out line may be connected between the pad part and the demultiplexer.

In an embodiment, the fan-out area may overlap the second pixel row.

In an embodiment, the display area may further include an electrostatic discharging circuit disposed between the non-display area and the fan-out area. In such an embodiment, the electrostatic discharging circuit may overlap the first pixel row.

In an embodiment, the display area may further include a demultiplexer disposed between the first circuit row and the pad part, an electrostatic discharging circuit disposed between the demultiplexer and the pad part, and a fan-out line disposed between the electrostatic discharging circuit and the pad part.

In an embodiment, the display area may further include an electrostatic discharging circuit disposed between the first circuit row and the pad part, a demultiplexer disposed between the electrostatic discharging circuit and the pad part, and a fan-out line disposed between the demultiplexer and the pad part.

According to an embodiment of the disclosure, a display device includes a display area which displays an image, and a non-display area disposed around the display area and including a pad part. In such an embodiment, the display area includes pixels of a first pixel row which are pixels arranged in a first direction along a first pixel row, pixels of a second pixel row which are pixels arranged in the first direction along the second pixel row next to the first pixel row, pixel circuits of a first circuit row which are pixel circuits arranged in the first direction along the first circuit row, where the pixel circuits of the first circuit row are electrically connected to the pixels of the first pixel row, respectively, a demultiplexer spaced apart from the non-display area with the second pixel row interposed therebetween, and a fan-out line connected between the pad part and the demultiplexer.

In an embodiment, the fan-out line may overlap the second pixel row.

In an embodiment, the display area may further include an electrostatic discharging circuit disposed between a fan-out area, which includes the fan-out line, and the non-display area. In such an embodiment, the electrostatic discharging circuit may overlap the first pixel row.

In an embodiment, the first pixel row and the first circuit row may be spaced apart from each other with the second pixel row interposed therebetween.

In an embodiment, the display area may further include pixels of a third pixel row which are pixels arranged in the first direction along the third pixel row next to the second pixel row, and pixel circuits of a second circuit row which are pixel circuits arranged in the first direction along the second circuit row next to the first circuit row, where the pixel circuits of the second circuit row are electrically connected to the pixels of the second pixel row, respectively. In such an embodiment, the second pixel row and the second circuit row may be spaced apart from each other with the third pixel row interposed therebetween.

In an embodiment, the demultiplexer and the first circuit row may be disposed between the second pixel row and the third pixel row.

According to an embodiment of the disclosure, a display device includes a display area which displays an image, and a non-display area disposed around the display area and including a pad part. In such an embodiment, the display area includes pixels of a first pixel row which are pixels arranged in a first direction along the first pixel row, pixels of a second pixel row which are pixels arranged in the first direction along the second pixel row next to the first pixel row, a plurality of demultiplexers spaced apart from the non-display area with the second pixel row interposed therebetween, a clock line disposed between the plurality of demultiplexers and extending in a second direction crossing the first direction, a voltage line spaced apart from the clock line with at least one demultiplexer of the plurality of demultiplexers interposed therebetween, and a gate driver including a plurality of stages connected to the clock line and the voltage line.

In an embodiment, the display area may further include pixel circuits of a first circuit row, which are pixel circuits arranged in the first direction along the first circuit row, where the pixel circuits of the first circuit row are electrically connected to the pixels of the first pixel row, respectively, pixels of a third pixel row which are pixels arranged in the first direction along the third pixel row next to the second pixel row, pixel circuits of a second circuit row which are pixel circuits arranged in the first direction along the second circuit row next to the first circuit row, where the pixel circuits of the second circuit row are electrically connected to the pixels of the second pixel row, respectively, and pixel circuits of a third circuit row which are pixel circuits arranged in the first direction along the third circuit row next to the second circuit row, wherein the pixel circuits of the third circuit row are electrically connected to the pixels of the third pixel row, respectively. In such an embodiment, the gate driver may be spaced apart from the non-display area with the third pixel row interposed therebetween.

In an embodiment, the gate driver may include a first stage electrically connected to a first gate line connected to the first circuit row. In such an embodiment, the first stage may be electrically connected to the first gate line through a connection line overlapping the second circuit row and the third circuit row.

In an embodiment, the first gate line may include a scan initialization line and a scan write line. In such an embodiment, the first stage may include a scan initialization stage which supplies a scan initialization signal to the scan initialization line, and a scan write stage which supplies a scan write signal delayed in phase from the scan initialization signal to the scan write line.

According to an embodiment of the disclosure, a tiled display device includes a plurality of display devices, each including a display area which displays an image and a non-display area surrounding the display area, and a coupling area disposed between the plurality of display devices. In such an embodiment, the display area of each of the plurality of display devices includes pixels of a first pixel row which are pixels arranged in a first direction along the first pixel row, pixels of a second pixel row which are pixels arranged in the first direction along the second pixel row next to the first pixel row, and pixel circuits of a first circuit row which are pixel circuits arranged in the first direction along the first circuit row, wherein the pixel circuits of the first circuit row are electrically connected to the pixels of the first pixel row, respectively. In such an embodiment, the first pixel row and the first circuit row are spaced apart from each other with the second pixel row interposed therebetween.

The pixels of the first pixel row and the second pixel row may include a flip chip type micro light emitting diode element.

In accordance with embodiments of the display device and the tiled display device including the display device, an electrostatic discharging circuit, a fan-out line, a demultiplexer, and a gate driver are arranged in a display area, such that the non-display area may be minimized and the pixel pitch between adjacent display devices may be allowed to be the same as the pixel pitch in the display device. Accordingly, in such embodiments of the tiled display device, the coupling area between the plurality of display devices may be prevented from being recognized by a user by minimizing the gap between the plurality of display devices, thereby reducing a sense of disconnection between the plurality of display devices and improving a sense of immersion in an image.

BRIEF DESCRIPTION OF THE DRAWINGS

The above and other features of the disclosure will become more apparent by describing in detail embodiments thereof with reference to the attached drawings, in which.

DETAILED DESCRIPTION

Figure 1:
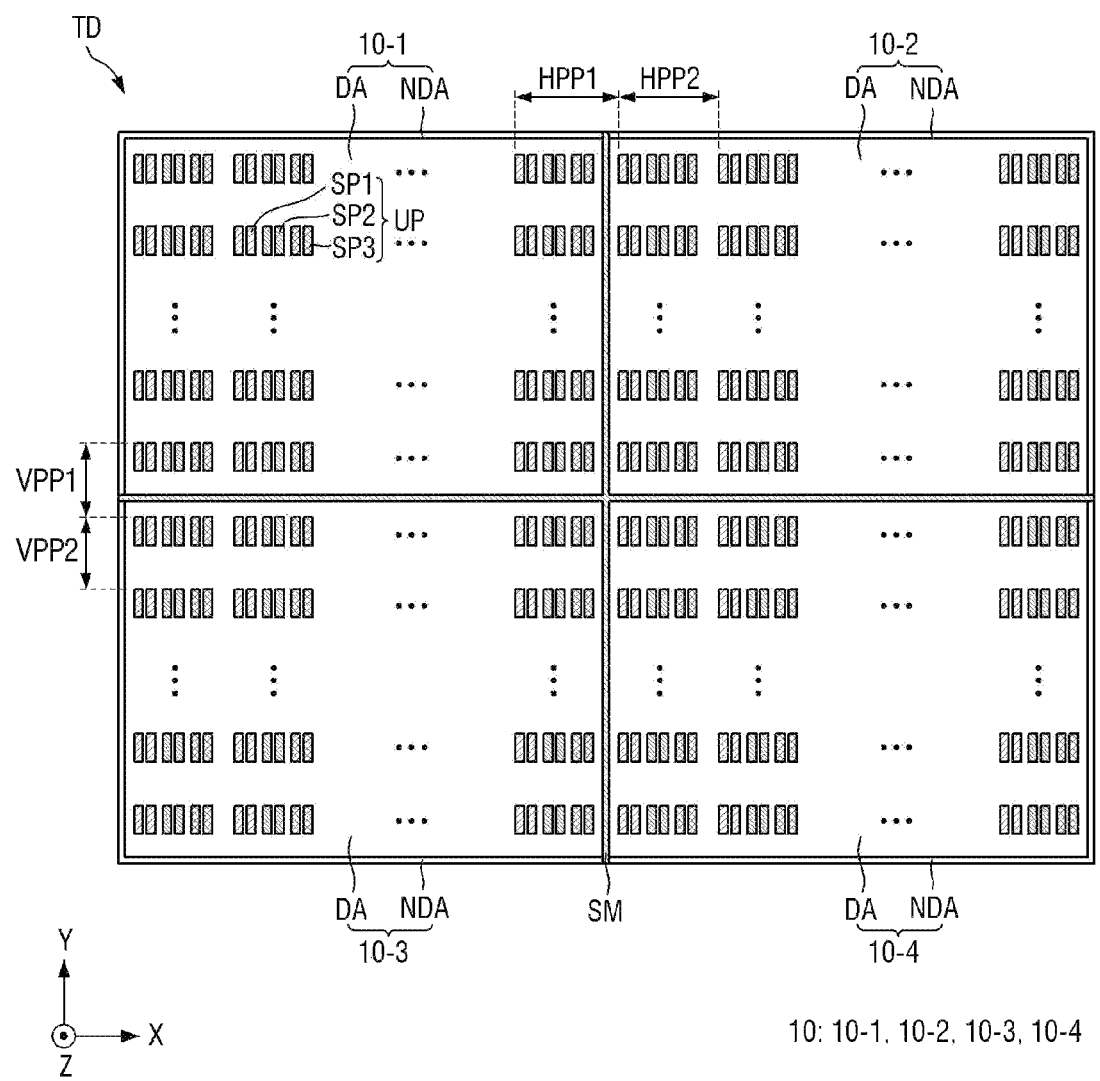
FIG. 1 is a plan view illustrating a tiled display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Unless otherwise specified, the illustrated embodiments are to be understood as providing features of varying detail of some ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation, not as terms of degree, and thus are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or overly formal sense, unless clearly so defined herein.

Hereinafter, embodiments of the disclosure will be described in detail with reference to the accompanying drawings.

FIG. 1 is a plan view illustrating a tiled display device according to an embodiment.

Referring to FIG. 1, an embodiment of a tiled display device TD may include a plurality of display devices 10. The plurality of display devices 10 may be arranged in a grid form, but are not limited thereto. The plurality of display devices 10 may be connected in the first direction (X-axis direction) or the second direction (Y-axis direction), and the tiled display device TD may have a particular shape. In an embodiment, for example, the plurality of display devices 10 may have a same size as each other, but are not limited thereto. In an alternative embodiment, for example, the plurality of display devices 10 may have different sizes from each other.

In an embodiment, the tiled display device TD may include first to fourth display devices 10-1 to 10-4. The number and connection relationship of the display devices 10 are not limited to those shown in FIG. 1. The number of the display devices 10 may be determined based on the size of each of the display devices 10 and the tiled display device TD.

Each of the plurality of display devices 10 may have a rectangular shape including long sides and short sides. The plurality of display devices 10 may be arranged in a way such that the long sides or the short sides thereof are connected to each other. Some of the display devices 10 may be disposed at the edge of the tiled display device TD to form one side of the tiled display device TD. Some others of the display devices 10 may be disposed at corners of the tiled display device TD to form two adjacent sides of the tiled display device TD. Yet some others of the display devices 10 may be disposed on the inner side of the tiled display device TD, and may be surrounded by other display devices 10.

Each of the plurality of display devices 10 may include a display area DA and a non-display area NDA. The display area DA may include a plurality of unit pixels UP to display an image. Each of the plurality of unit pixels UP may include first to third pixels SP1, SP2, and SP3. Each of the first to third pixels SP1, SP2, and SP3 may include an organic light emitting diode ("LED") including an organic light emitting layer, a quantum dot LED including a quantum dot light emitting layer, an inorganic LED including an inorganic semiconductor, and a micro LED. Hereinafter, for convenience of description, embodiments in which each of the first to third pixels SP1, SP2, and SP3 includes the micro LED will be mainly described, but the disclosure is not limited thereto. The non-display area NDA may be disposed around the display area DA to surround the display area DA, and may not display an image.

The display device 10 may include first to third pixels SP1, SP2, and SP3 arranged along a plurality of rows and columns (or in a matrix form) in the display area DA. Each of the first to third pixels SP1, SP2, and SP3 may include an emission area or an opening area defined by a pixel defining layer or a bank, and emit light having a predetermined peak wavelength through the emission area or the opening area. The emission area may be an area in which light generated from the light emitting element of the display device 10 is emitted to the outside of the display device 10. The first pixel SP1 may emit light of a first color, the second pixel SP2 may emit light of a second color, and the third pixel SP3 may emit light of a third color. In an embodiment, for example, the first color light may be red light having a peak wavelength in a range from about 610 nanometers (nm) to about 650 nm, the second color light may be green light having a peak wavelength in a range from about 510 nm to about 550 nm, and the third color light may be blue light having a peak wavelength in a range from about 440 nm to about 480 nm, but the disclosure is not limited thereto.

The first to third pixels SP1, SP2, and SP3 may be sequentially and repeatedly arranged along the first direction (X-axis direction) in the display area DA. In an embodiment, for example, the emission areas of the first to third pixels SP1, SP2, and SP3 may be substantially the same as each other. In an alternative embodiment, for example, the emission area of the third pixel SP3 may be larger in size than the emission area of the first pixel SP1, and the emission area of the first pixel SP1 may be larger in size than the emission area of the second pixel SP2. However, the disclosure is not limited thereto.

The tiled display device TD may have a planar shape as a whole, but is not limited thereto. The tiled display device TD may have a three-dimensional shape to provide a three-dimensional effect to a user. In an embodiment, for example, where the tiled display device TD has a three-dimensional shape, at least some of the plurality of display devices 10 may have a curved shape. In an alternative embodiment, for example, the plurality of display devices 10 may each have a planar shape and may be connected to each other at a predetermined angle, so that the tiled display device TD may have a three-dimensional shape.

The tiled display device TD may include a coupling area SM disposed between a plurality of display areas DA. The tiled display device TD may be formed or defined by connecting non-display areas NDA of the adjacent display devices 10. The plurality of display devices 10 may be connected to each other through a bonding member or an adhesive member disposed in the coupling area SM. Each of the coupling areas SM of the plurality of display devices 10 may not include a pad part or a flexible film attached to the pad part. The distance between the display areas DA of the plurality of display devices 10 may be small enough that the coupling area SM between the plurality of display devices 10 is not recognized by the user. In an embodiment, for example, a first horizontal pixel pitch HPP1 between the pixels of the first display device 10-1 and the pixels of the second display device 10-2 may be substantially the same as a second horizontal pixel pitch HPP2 between the pixels of the second display device 10-2. A first vertical pixel pitch VPP1 between the pixels of the first display device 10-1 and the pixels of the third display device 10-3 may be substantially the same as a second vertical pixel pitch VPP2 between the pixels of the third display device 10-3. Accordingly, in an embodiment of the tiled display device TD, the coupling area SM between the plurality of display devices 10 may be effectively prevented from being recognized by the user, thereby reducing a sense of disconnection between the plurality of display devices 10 and improving a sense of immersion in an image.

Figure 2:
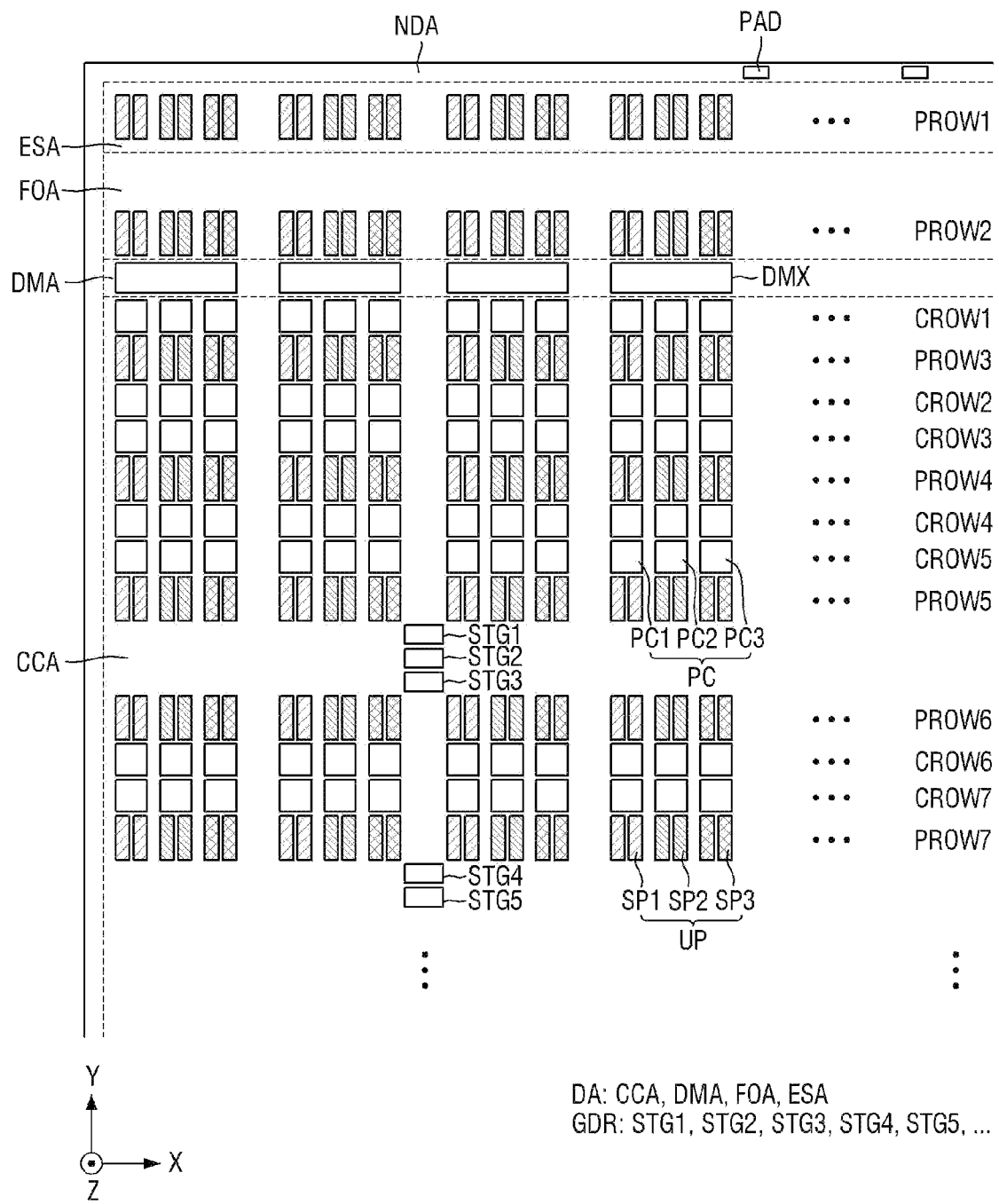
FIG. 2 is a plan view illustrating a display device according to an embodiment.
Figure 3:
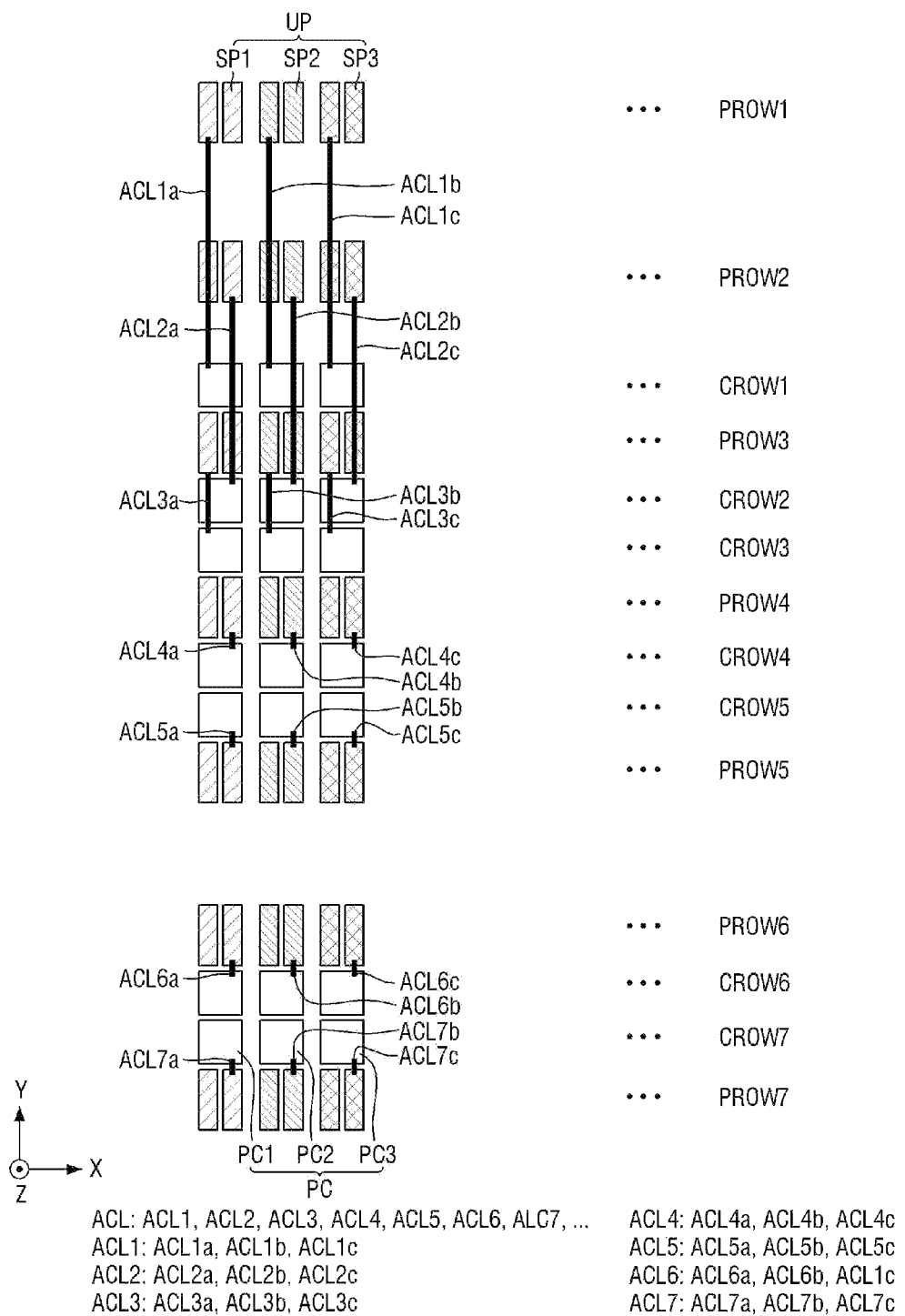
FIG. 3 illustrates the connection relationship between a pixel and a pixel circuit in a display device according to an embodiment.

FIG. 2 is a plan view illustrating a display device according to an embodiment, and FIG. 3 illustrates the connection relationship between a pixel and a pixel circuit in a display device according to an embodiment.

Referring to FIGS. 2 and 3, an embodiment of the display device 10 may include the display area DA and the non-display area NDA. The display area DA may include a pixel circuit area CCA, a demultiplexer area DMA, a fan-out area FOA, and an antistatic area ESA. In an embodiment, for example, the demultiplexer area DMA, the fan-out area FOA, and the antistatic area ESA may be disposed at one edge or the upper edge of the display area DA. Although FIG. 2 illustrates an embodiment where the demultiplexer area DMA, the fan-out area FOA, and the antistatic area ESA are disposed at the upper edge of the display area DA, the arrangement positions thereof are not limited thereto. In an alternative embodiment, for example, the demultiplexer area DMA, the fan-out area FOA, and the antistatic area ESA may be disposed at left and right edges or upper and lower edges. The non-display area NDA may include a plurality of pad parts PAD.

Each of the plurality of unit pixels UP may include first to third pixels SP1, SP2, and SP3. The first to third pixels SP1, SP2, and SP3 of FIG. 2 may correspond to at least one light emitting element exposed by the opening area. In an embodiment, for example, each of the first to third pixels SP1, SP2, and SP3 may include two light emitting elements. In such an embodiment, each of the first to third pixels SP1, SP2, and SP3 may include a main light emitting element and a repair light emitting element, but is not limited thereto. In an alternative embodiment, for example, each of the first to third pixels SP1, SP2, and SP3 may include three or more light emitting elements. Therefore, the first to third pixels SP1, SP2, and SP3 may emit light corresponding to the gray scale of a corresponding pixel.

In an embodiment, for example, the light emitting element of each of the first to third pixels SP1, SP2, and SP3 may be disposed in a way such that a long side thereof is parallel to the second direction (Y-axis direction). In an embodiment where one pixel includes a plurality of light emitting elements, the plurality of light emitting elements of one pixel may be adjacent to each other in the first direction (X-axis direction).

In an alternative embodiment, for example, the light emitting elements of each of the first to third pixels SP1, SP2, and SP3 may be disposed in a way such that a long side thereof is parallel to the first direction (X-axis direction). In an embodiment where one pixel includes a plurality of light emitting elements, the plurality of light emitting elements of one pixel may be adjacent to each other in the second direction (Y-axis direction).

The plurality of unit pixels UP may be arranged to have a uniform pixel pitch. The plurality of unit pixels UP may be arranged along a plurality of pixel rows. In an embodiment, for example, the first to third pixels SP1, SP2, and SP3 may be arranged along first to seventh pixel rows PROW1, PROW2, PROW3, PROW4, PROW5, PROW6, and PROW7. The first to seventh pixel rows PROW1, PROW2, PROW3, PROW4, PROW5, PROW6, and PROW7 may be sequentially arranged in a direction opposite to the second direction (Y-axis direction).

A plurality of pixel circuits PC may be disposed in the pixel circuit area CCA. The plurality of pixel circuits PC may include first to third pixel circuits PC1, PC2, and PC3. The first pixel circuit PC1 may supply a driving current to the first pixel SP1, the second pixel circuit PC2 may supply a driving current to the second pixel SP2, and the third pixel circuit PC3 may supply a driving current to the third pixel SP3. The plurality of pixel circuits PC may be arranged along a plurality of circuit rows. The first to third pixel circuits PC1, PC2, and PC3 may be arranged along first to seventh circuit rows CROW1, CROW2, CROW3, CROW4, CROW5, CROW6, and CROW7. The first to seventh circuit rows CROW1, CROW2, CROW3, CROW4, CROW5, CROW6, and CROW7 may be sequentially arranged in a direction opposite to the second direction (Y-axis direction).

The first pixel row PROW1 may be disposed at the outermost (or uppermost) part of the display area DA. The first pixel row PROW1 may be disposed at one edge or the upper edge of the display area DA. The first pixel row PROW1 may overlap the antistatic area ESA. The first pixel row PROW1 and the first circuit row CROW1 may be spaced apart from each other in the second direction (Y-axis direction). The first pixel row PROW1 and the first circuit row CROW1 may be spaced apart from each other with the second pixel row PROW2 interposed therebetween. The first circuit row CROW1 may be disposed between the second pixel row PROW2 and the third pixel row PROW3. The first pixel row PROW1 and the first circuit row CROW1 may be spaced apart from each other with the fan-out area FOA and the demultiplexer area DMA interposed therebetween.

The first to third pixels SP1, SP2, and SP3 of the first pixel row PROW1 may be electrically connected to the first to third pixel circuits PC1, PC2, and PC3 of the first circuit row CROW1, respectively. The first pixel SP1 of the first pixel row PROW1 may be electrically connected to the first pixel circuit PC1 of the first circuit row CROW1 through a 1a anode connection line (or a first first anode connection line) ACL1a. The second pixel SP2 of the first pixel row PROW1 may be electrically connected to the second pixel circuit PC2 of the first circuit row CROW1 through a 1b anode connection line (or a second first anode connection line) ACL1b. The third pixel SP3 of the first pixel row PROW1 may be electrically connected to the third pixel circuit PC3 of the first circuit row CROW1 through a 1c anode connection line (or a third first anode connection line) ACL1c. A first anode connection line ACL1 including (or collectively defined by) the 1a anode connection line ACL1a, the 1b anode connection line ACL1b and the 1c anode connection line ACL1c may extend in the second direction (Y-axis direction). The first anode connection line ACL1 may extend from the pixel circuit area CCA to the antistatic area ESA. The first anode connection line ACL1 may overlap the second pixel row PROW2. The first anode connection line ACL1 may overlap the fan-out area FOA and the demultiplexer area DMA.

The second pixel row PROW2 may be disposed closer to the inside of the display area DA than the first pixel row PROW1. The second pixel row PROW2 may overlap the fan-out area FOA. The second pixel row PROW2 and the second circuit row CROW2 may be spaced apart from each other in the second direction (Y-axis direction). The second pixel row PROW2 and the second circuit row CROW2 may be spaced apart from each other with the third pixel row PROW3 interposed therebetween. The second circuit row CROW2 may be disposed between the third pixel row PROW3 and the fourth pixel row PROW4. The second pixel row PROW2 and the second circuit row CROW2 may be spaced apart from each other with the demultiplexer area DMA interposed therebetween.

The first to third pixels SP1, SP2, and SP3 of the second pixel row PROW2 may be electrically connected to the first to third pixel circuits PC1, PC2, and PC3 of the second circuit row CROW2, respectively. The first pixel SP1 of the second pixel row PROW2 may be electrically connected to the first pixel circuit PC1 of the second circuit row CROW2 through a 2a anode connection line (or a first second anode connection line) ACL2a. The second pixel SP2 of the second pixel row PROW2 may be electrically connected to the second pixel circuit PC2 of the second circuit row CROW2 through a 2b anode connection line (or a second second anode connection line) ACL2b. The third pixel SP3 of the second pixel row PROW2 may be electrically connected to the third pixel circuit PC3 of the second circuit row CROW2 through a 2c anode connection line (or a third second anode connection line) ACL2c. A second anode connection line ACL2 including the 2a anode connection line ACL2a, the 2b anode connection line ACL2b and the 2c anode connection line ACL2c may extend in the second direction (Y-axis direction). The second anode connection line ACL2 may extend from the pixel circuit area CCA to the fan-out area FOA. The second anode connection line ACL2 may overlap the third pixel row PROW3. The second anode connection line ACL2 may overlap the demultiplexer area DMA.

The third pixel row PROW3 may be disposed closer to the inside of the display area DA than the second pixel row PROW2. The third pixel row PROW3 may be disposed in the pixel circuit area CCA. The third pixel row PROW3 and the third circuit row CROW3 may be spaced apart from each other in the second direction (Y-axis direction). The third pixel row PROW3 and the third circuit row CROW3 may be spaced apart from each other with the second circuit row CROW2 interposed therebetween. The third circuit row CROW3 may be disposed between the third pixel row PROW3 and the fourth pixel row PROW4.

The first to third pixels SP1, SP2, and SP3 of the third pixel row PROW3 may be electrically connected to the first to third pixel circuits PC1, PC2, and PC3 of the third circuit row CROW3, respectively. The first pixel SP1 of the third pixel row PROW3 may be electrically connected to the first pixel circuit PC1 of the third circuit row CROW3 through a 3a anode connection line (or a first third anode connection line) ACL3a. The second pixel SP2 of the third pixel row PROW3 may be electrically connected to the second pixel circuit PC2 of the third circuit row CROW3 through a 3b anode connection line (or a second third anode connection line) ACL3b. The third pixel SP3 of the third pixel row PROW3 may be electrically connected to the third pixel circuit PC3 of the third circuit row CROW3 through a 3c anode connection line (or a third third anode connection line) ACL3c. A third anode connection line ACL3 including the 3a anode connection line ACL3a, the 3b anode connection line ACL3b and the 3c anode connection line ACL3c may extend in the second direction (Y-axis direction). The third anode connection line ACL3 may overlap the second circuit row CROW2.

The fourth and fifth pixel rows PROW4 and PROW5 may be disposed closer to the inside of the display area DA than the third pixel row PROW3. The fourth and fifth pixel rows PROW4 and PROW5 may be disposed in the pixel circuit area CCA. The fourth pixel row PROW4 may be adjacent to the fourth circuit row CROW4 in the second direction (Y-axis direction), and the fifth pixel row PROW5 may be adjacent to the fifth circuit row CROW5 in the second direction (Y-axis direction). The fourth and fifth circuit rows CROW4 and CROW5 may be disposed between the fourth and fifth pixel rows PROW4 and PROW5.

The first to third pixels SP1, SP2, and SP3 of the fourth pixel row PROW4 may be electrically connected to the first to third pixel circuits PC1, PC2, and PC3 of the fourth circuit row CROW4, respectively. The first pixel SP1 of the fourth pixel row PROW4 may be electrically connected to the first pixel circuit PC1 of the fourth circuit row CROW4 through a 4a anode connection line (or a first fourth anode connection line) ACL4a. The second pixel SP2 of the fourth pixel row PROW4 may be electrically connected to the second pixel circuit PC2 of the fourth circuit row CROW4 through a 4b anode connection line (or a second fourth anode connection line) ACL4b. The third pixel SP3 of the fourth pixel row PROW4 may be electrically connected to the third pixel circuit PC3 of the fourth circuit row CROW4 through a 4c anode connection line (or a third fourth anode connection line) ACL4c. A fourth anode connection line ACL4 including the 4a anode connection line ACL4a, the 4b anode connection line ACL4b and the 4c anode connection line ACL4c may extend in the second direction (Y-axis direction).

The first to third pixels SP1, SP2, and SP3 of the fifth pixel row PROW5 may be electrically connected to the first to third pixel circuits PC1, PC2, and PC3 of the fifth circuit row CROW5, respectively. The first pixel SP1 of the fifth pixel row PROW5 may be electrically connected to the first pixel circuit PC1 of the fifth circuit row CROW5 through a 5a anode connection line (or a first fifth anode connection line) ACL5a. The second pixel SP2 of the fifth pixel row PROW5 may be electrically connected to the second pixel circuit PC2 of the fifth circuit row CROW5 through a 5b anode connection line (or a second fifth anode connection line) ACL5b. The third pixel SP3 of the fifth pixel row PROW5 may be electrically connected to the third pixel circuit PC3 of the fifth circuit row CROW5 through a 5c anode connection line (or a third fifth anode connection line) ACL5c. A fifth anode connection line ACL5 including the 5a anode connection line ACL5a, the 5b anode connection line ACL5b and the 5c anode connection line ACL5c may extend in the second direction (Y-axis direction).

The sixth and seventh pixel rows PROW6 and PROW7 may be disposed closer to the inside of the display area DA than the fifth pixel row PROW5. The sixth and seventh pixel rows PROW6 and PROW7 may be disposed in the pixel circuit area CCA. The sixth pixel row PROW6 may be adjacent to the sixth circuit row CROW6 in the second direction (Y-axis direction), and the seventh pixel row PROW7 may be adjacent to the seventh circuit row CROW7 in the second direction (Y-axis direction). The sixth and seventh circuit rows CROW6 and CROW7 may be disposed between the sixth and seventh pixel rows PROW6 and PROW7.

The first to third pixels SP1, SP2, and SP3 of the sixth pixel row PROW6 may be electrically connected to the first to third pixel circuits PC1, PC2, and PC3 of the sixth circuit row CROW6, respectively. The first pixel SP1 of the sixth pixel row PROW6 may be electrically connected to the first pixel circuit PC1 of the sixth circuit row CROW6 through a 6a anode connection line (or a first sixth anode connection line) ACL6a. The second pixel SP2 of the sixth pixel row PROW6 may be electrically connected to the second pixel circuit PC2 of the sixth circuit row CROW6 through a 6b anode connection line (or a second sixth anode connection line) ACL6b. The third pixel SP3 of the sixth pixel row PROW6 may be electrically connected to the third pixel circuit PC3 of the sixth circuit row CROW6 through a 6c anode connection line (or a third sixth anode connection line) ACL6c. A sixth anode connection line ACL6 including the 6a anode connection line ACL6a, the 6b anode connection line ACL6b and the 6c anode connection line ACL6c may extend in the second direction (Y-axis direction).

The first to third pixels SP1, SP2, and SP3 of the seventh pixel row PROW7 may be electrically connected to the first to third pixel circuits PC1, PC2, and PC3 of the seventh circuit row CROW7, respectively. The first pixel SP1 of the seventh pixel row PROW7 may be electrically connected to the first pixel circuit PC1 of the seventh circuit row CROW7 through a 7a anode connection line (or a first seventh anode connection line) ACL7a. The second pixel SP2 of the seventh pixel row PROW7 may be electrically connected to the second pixel circuit PC2 of the seventh circuit row CROW7 through a 7b anode connection line (or a second seventh anode connection line) ACL7b. The third pixel SP3 of the seventh pixel row PROW7 may be electrically connected to the third pixel circuit PC3 of the seventh circuit row CROW7 through a 7c anode connection line (or a third seventh anode connection line) ACL7c. A seventh anode connection line ACL7 including the 7a anode connection line ACL7a, the 7b anode connection line ACL7b and the 7c anode connection line ACL7c may extend in the second direction (Y-axis direction).

A gate driver GDR may be disposed in the pixel circuit area CCA. The gate driver GDR may supply a gate signal to the gate line connected to the plurality of pixel circuits PC. The gate driver GDR may be connected to a clock line, a voltage line, and a carry line extending in the pixel circuit area CCA. The gate driver GDR may be disposed between two pixel rows. The gate driver GDR may not overlap the plurality of pixels SP or the plurality of pixel circuits PC in the first direction (X-axis direction) or the second direction (Y-axis direction), but the disclosure is not limited thereto. In an embodiment, for example, the gate driver GDR may include at least one selected from a scan initialization driver, a scan write driver, a scan control driver, a sweep driver, a pulse width modulation ("PWM") driver, or a pulse amplitude modulation ("PAM") driver.

The gate driver GDR may include a plurality of stages, e.g., first to fifth stages STG1, STG2, STG3, STG4, and STG5. The first to third stages STG1, STG2, and STG3 may be disposed between the fifth pixel row PROW5 and the sixth pixel row PROW6. The first stage STG1 may supply a gate signal to the gate line disposed in the first circuit row CROW1. The first stage STG1 and the first circuit row CROW1 may be spaced apart from each other with the third to fifth pixel rows PROW3, PROW4, and PROW5 and the second to fifth circuit rows CROW2, CROW3, CROW4, and CROW5 interposed therebetween.

The second stage STG2 may supply a gate signal to the gate line disposed in the second circuit row CROW2. The second stage STG2 and the second circuit row CROW2 may be spaced apart from each other with the fourth and fifth pixel rows PROW4 and PROW5 and the third to fifth circuit rows CROW3, CROW4, and CROW5 interposed therebetween.

The third stage STG3 may supply a gate signal to the gate line disposed in the third circuit row CROW3. The third stage STG3 and the third circuit row CROW3 may be spaced apart from each other with the fourth and fifth pixel rows PROW4 and PROW5 and the fourth and fifth circuit rows CROW4 and CROW5 interposed therebetween.

The fourth and fifth stages STG4 and STG5 may be disposed under the seventh pixel row PROW7. The fourth stage STG4 may supply a gate signal to the gate line disposed in the fourth circuit row CROW4. The fourth stage STG4 and the fourth circuit row CROW4 may be spaced apart from each other with the fifth to seventh pixel rows PROW5, PROW6, and PROW7 and the fifth to seventh circuit rows CROW5, CROW6, and CROW7 interposed therebetween.

The fifth stage STG5 may supply a gate signal to the gate line disposed in the fifth circuit row CROW5. The fifth stage STG5 and the fifth circuit row CROW5 may be spaced apart from each other with the fifth to seventh pixel rows PROW5, PROW6, and PROW7 and the sixth and seventh circuit rows CROW6 and CROW7 interposed therebetween.

Therefore, in such an embodiment of the display device 10, the pixel circuit area CCA, the demultiplexer area DMA, the fan-out area FOA, and the antistatic area ESA are arranged in the display area DA, such that the non-display area NDA is minimized and the pixel pitch between adjacent display devices 10 may be allowed to be substantially the same as the pixel pitch in the display device 10. In such an embodiment, the antistatic area ESA is disposed at the outer part of the display area DA, such that electrostatic discharge and a short-circuit failure between lines may be effectively prevented. Further, in such an embodiment of the tiled display device TD, the coupling area SM between the plurality of display devices 10 may be effectively prevented from being recognized by a user by minimizing the gap between the plurality of display devices 10, thereby reducing a sense of disconnection between the plurality of display devices 10 and improving a sense of immersion in an image.

Figure 4:
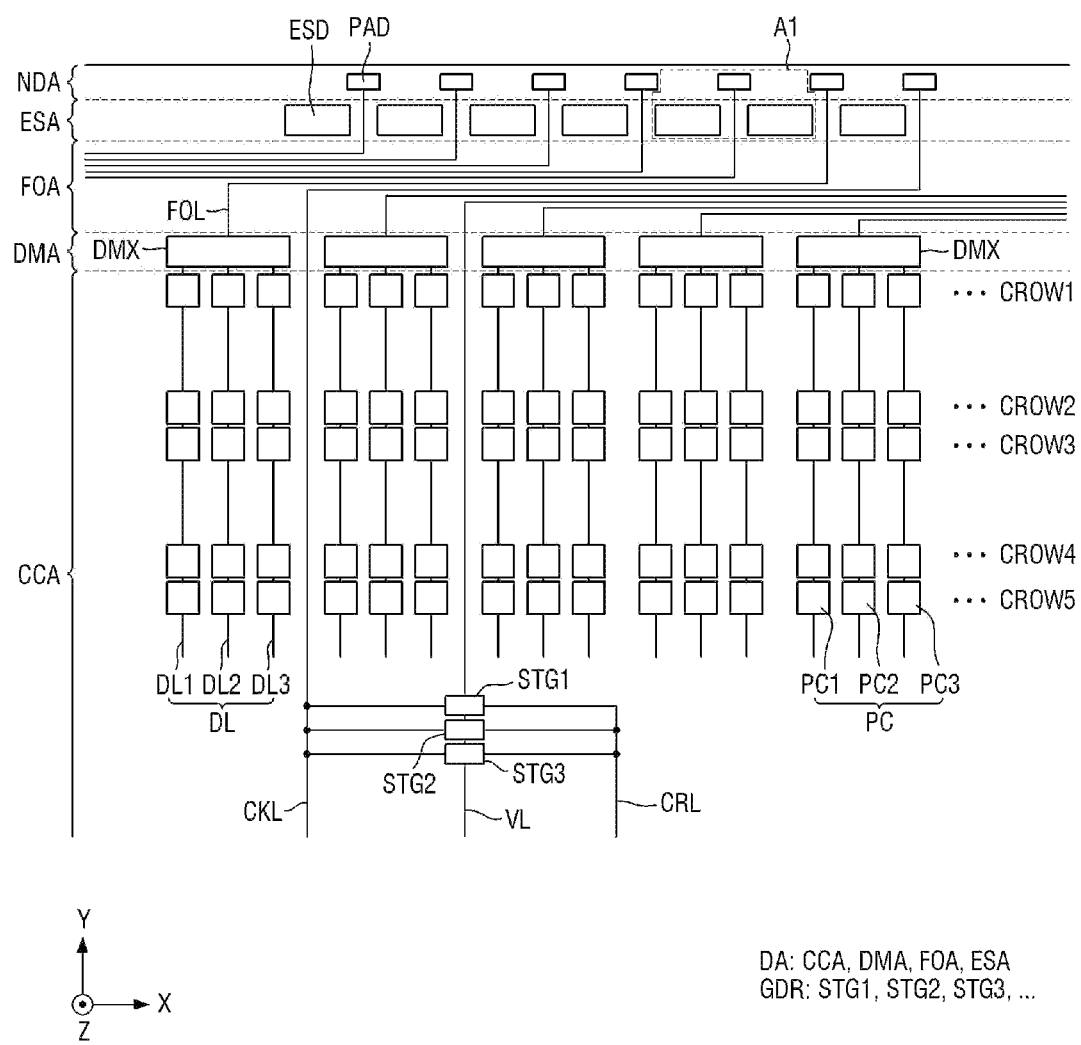
FIG. 4 illustrates a pixel circuit area, a demultiplexer area, a fan-out area, an antistatic area, and a non-display area in a display device according to an embodiment.

FIG. 4 illustrates a pixel circuit area, a demultiplexer area, a fan-out area, an antistatic area, and a non-display area in a display device according to an embodiment.

Referring to FIG. 4, an embodiment of the display device 10 may include the display area DA and the non-display area NDA. The display area DA may include the antistatic area ESA, the fan-out area FOA, the demultiplexer area DMA, and the pixel circuit area CCA. In an embodiment, for example, the antistatic area ESA, the fan-out area FOA, and the demultiplexer area DMA may be disposed at one edge or the upper edge of the display area DA. In an alternative embodiment, for example, the antistatic area ESA, the fan-out area FOA, and the demultiplexer area DMA may be disposed at opposing edges or upper and lower edges. In another alternative embodiment, for example, at least one selected from the antistatic area ESA, the fan-out area FOA, or the demultiplexer area DMA may be disposed or defined at at least one edge of the display device 10. The non-display area NDA may include the plurality of pad parts PAD.

The antistatic area ESA may include a plurality of electrostatic discharging circuits ESD. The plurality of electrostatic discharging circuits ESD may overlap the first to third pixels SP1, SP2, and SP3 of the first pixel row PROW1 The electrostatic discharging circuit ESD may protect a fan-out line FOL, a demultiplexer DMX, and the pixel circuit PC from static electricity. The electrostatic discharging circuit ESD may dissipate static electricity flowing from the outside to prevent the static electricity from flowing into the display area DA.

The fan-out area FOA may include the plurality of fan-out lines FOL. The plurality of fan-out lines FOL may overlap the first to third pixels SP1, SP2, and SP3 of the second pixel row PROW2. The fan-out line FOL may extend from the pad part PAD to the demultiplexer DMX. The fan-out line FOL may supply the data voltage received from the pad part PAD to the demultiplexer DMX. The fan-out line FOL may extend from the pad part PAD to the pixel circuit area CCA. The fan-out line FOL may supply the clock signal received from the pad part PAD to a clock line CKL, and may supply the power voltage or the control voltage received from the pad part PAD to a voltage line VL.

The demultiplexer area DMA may include a plurality of demultiplexers DMX. The demultiplexer DMX may sequentially supply the data voltage received from the fan-out line FOL to the first to third data lines DL1, DL2, and DL3. In such an embodiment, the display device 10 includes the plurality of demultiplexers DMX, such that the number of fan-out lines FOL and the area of the fan-out area FOA may be substantially reduced.

The pixel circuit area CCA may include a data line DL, the clock line CKL, the voltage line VL, and a carry line CRL.

The data line DL may be connected between the demultiplexer DMX and the pixel circuit PC. The plurality of data lines DL may extend in the second direction (Y-axis direction) and may be spaced apart from each other in the first direction (X-axis direction). The data line DL may supply the data voltage received from the demultiplexer DMX to the pixel circuit PC. The data lines DL may include first to third data lines DL1, DL2, and DL3. The first data line DL1 may supply a data voltage to a plurality of first pixel circuits PC1 disposed in a same column as each other. The first data line DL1 may overlap the plurality of first pixels SP1 disposed in a same column as each other. The second data line DL2 may supply a data voltage to a plurality of second pixel circuits PC2 disposed in a same column as each other. The second data line DL2 may overlap the plurality of second pixels SP2 disposed in a same column as each other. The third data line DL3 may supply a data voltage to a plurality of third pixel circuits PC3 disposed in a same column as each other. The third data line DL3 may overlap the plurality of third pixels SP3 disposed in a same column as each other.

The clock line CLK may extend in the second direction (Y-axis direction) between two adjacent demultiplexers DMX. In an embodiment, for example, the clock line CLK may be disposed between the third data line DL3 connected to the left demultiplexer DMX between two demultiplexers DMX adjacent in the first direction (X-axis direction) and the first data line DL1 connected to the right demultiplexer DMX. The clock line CLK may receive a clock signal from the fan-out line FOL and supply the clock signal to the first to third stages STG1, STG2, and STG3.

The voltage line VL may extend in the second direction (Y-axis direction) between two adjacent demultiplexers DMX. In an embodiment, for example, the voltage line VL may be disposed between the third data line DL3 connected to the left demultiplexer DMX between two demultiplexers DMX adjacent in the first direction (X-axis direction) and the first data line DL1 connected to the right demultiplexer DMX. The voltage line VL and the clock line CLK may be spaced apart from each other with the first to third data lines DL1, DL2, and DL3 interposed therebetween. The voltage line VL may supply at least one selected from a gate high voltage, a gate low voltage, a power voltage, or a control voltage to the first to third stages STG1, STG2, and STG3. The voltage line VL may pass or extend through the first to third stages STG1, STG2, and STG3, but the disclosure is not limited thereto.

The carry line CRL may be disposed between the third data line DL3 connected to the left demultiplexer DMX between two demultiplexers DMX adjacent in the first direction (X-axis direction) and the first data line DL1 connected to the right demultiplexer DMX. The carry line CRL and the clock line CLK may be spaced apart from each other with the first to third data lines DL1, DL2, and DL3 interposed therebetween. The carry line CRL may supply the carry signal of the first stage STG1 to the second stage STG2, and may supply the carry signal of the second stage STG2 to the third stage STG3.

The gate driver GDR may be disposed in the pixel circuit area CCA. The gate driver GDR may supply a gate signal to the gate line connected to the plurality of pixel circuits PC.

The gate driver GDR may be connected to the clock line CLK, the voltage line VL, and the carry line CRL extending in the pixel circuit area CCA. The gate driver GDR may not overlap the plurality of pixels SP or the plurality of pixel circuits PC in the first direction (X-axis direction) or the second direction (Y-axis direction), but the disclosure is not limited thereto.

The first to third stages STG1, STG2, and STG3 may be disposed under the fifth circuit row CROW5. The first stage STG1 may supply a gate signal to the gate line disposed in the first circuit row CROW1. The second stage STG2 may supply a gate signal to the gate line disposed in the second circuit row CROW2. The third stage STG3 may supply a gate signal to the gate line disposed in the third circuit row CROW3.

Figure 5:
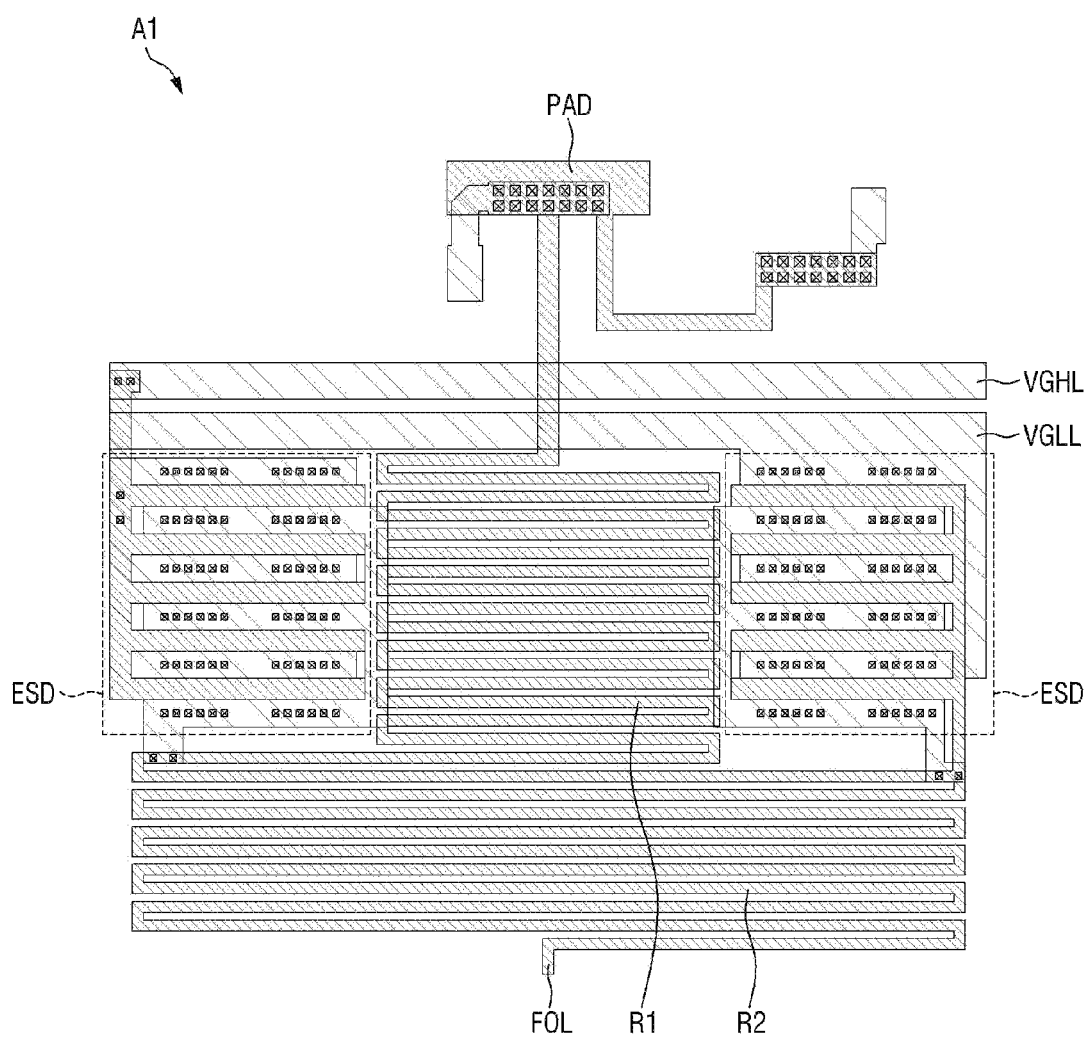
FIG. 5 is an enlarged view of area A1 of FIG. 4.
Figure 6:
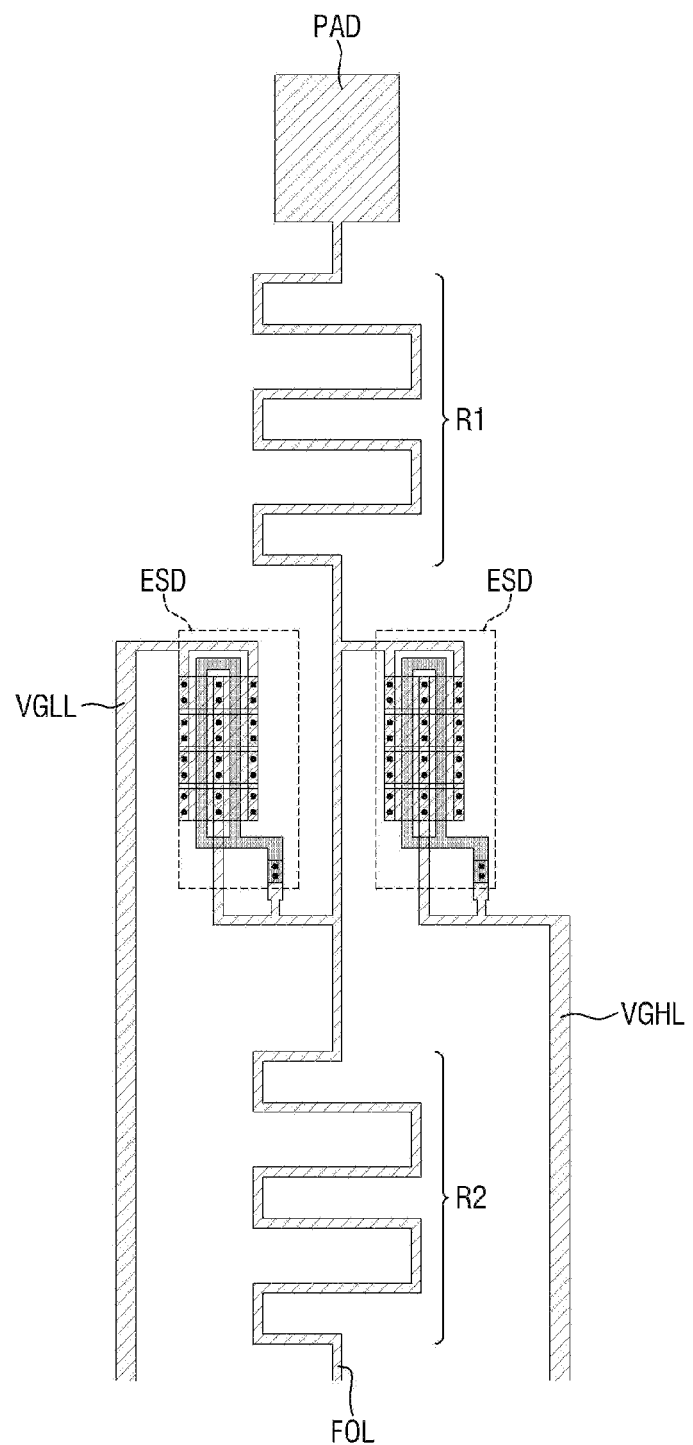
FIG. 6 schematically illustrates area A1 of FIG. 4.

FIG. 5 is an enlarged view of area A1 of FIG. 4, and FIG. 6 schematically illustrates area A1 of FIG. 4.

Referring to FIGS. 5 and 6, in an embodiment, the fan-out line FOL connected to the pad part PAD may include a first line resistor R1 and a second line resistor R2. Each of the first and second line resistors R1 and R2 may be formed in a zigzag pattern. The lengths of the first and second line resistors R1 and R2 may be designed to be different from each other based on the position of the fan-out line FOL. In an embodiment, the fan-out lines FOL of the display device 10 have substantially a same length as each other, such that the fan-out lines FOL may have substantially a same resistance value as each other.

The electrostatic discharging circuit ESD may be disposed adjacent to the fan-out line FOL. Some of the electrostatic discharging circuits ESD may be connected between the fan-out line FOL and a gate-off voltage line VGHL, and some others of the electrostatic discharging circuits ESD may be connected between the fan-out line FOL and a gate-on voltage line VGLL. The electrostatic discharging circuit ESD may be connected to the portion between the first and second line resistors R1 and R2 of the fan-out line FOL, but the disclosure is not limited thereto. Therefore, the electrostatic discharging circuit ESD may dissipate static electricity flowing from the outside to prevent the static electricity from flowing into the display area DA.

Figure 7:
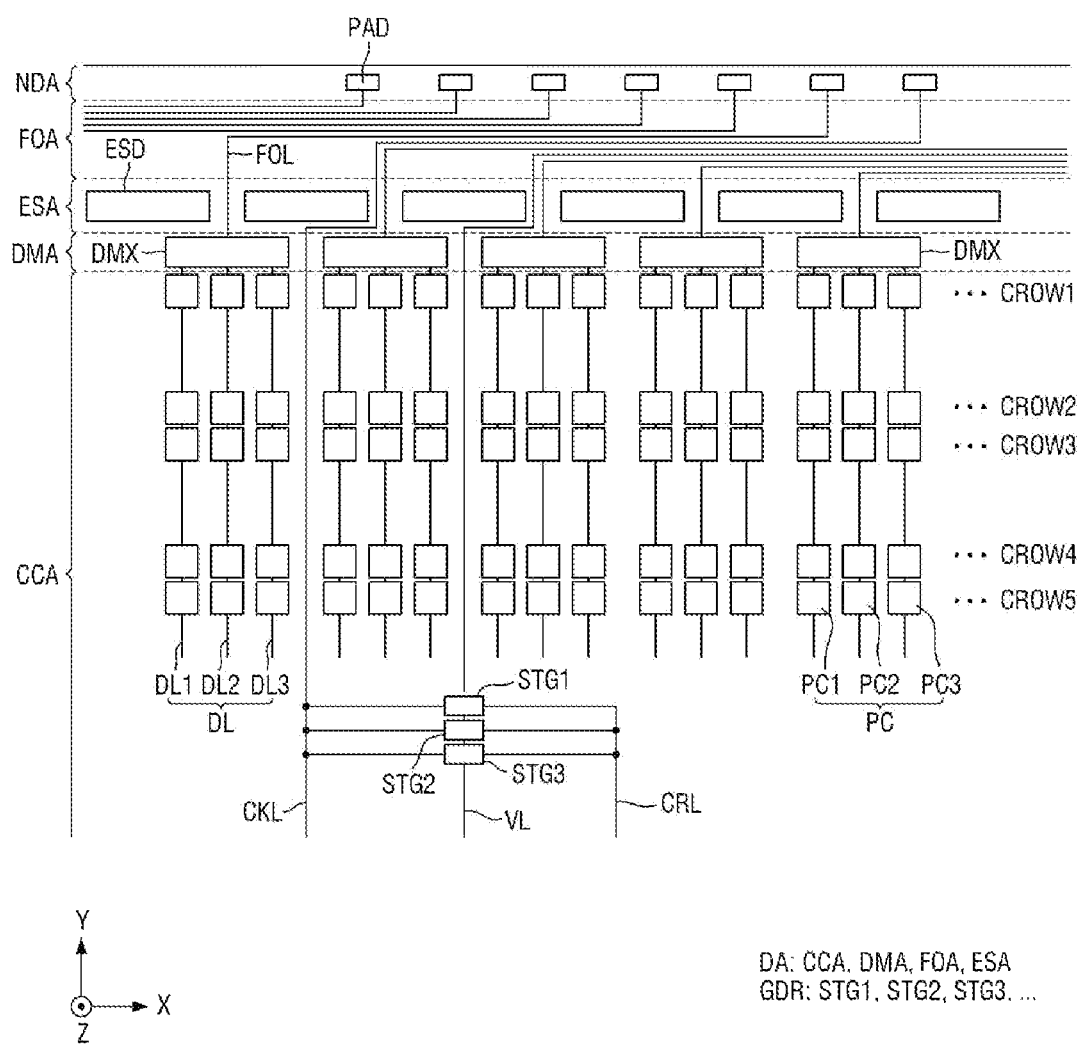
FIG. 7 illustrates a pixel circuit area, a demultiplexer area, an antistatic area, a fan-out area, and a non-display area in a display device according to an alternative embodiment.

FIG. 7 illustrates a pixel circuit area, a demultiplexer area, an antistatic area, a fan-out area, and a non-display area in a display device according to an alternative embodiment. The display device of FIG. 7 is substantially the same as the display device of FIG. 4 except for the position of the antistatic area ESA. The same or like elements shown in FIG. 7 have been labeled with the same reference characters as used above to describe the embodiment of the display device shown in FIG. 4, and any repetitive detailed description thereof will hereinafter be omitted or simplified.

Referring to FIG. 7, an embodiment of the display device 10 may include the display area DA and the non-display area NDA. The display area DA may include the fan-out area FOA, the antistatic area ESA, the demultiplexer area DMA, and the pixel circuit area CCA. In an embodiment, for example, the fan-out area FOA, the antistatic area ESA, and the demultiplexer area DMA may be disposed at one edge or the upper edge of the display area DA. In an alternative embodiment, for example, the fan-out area FOA, the antistatic area ESA, and the demultiplexer area DMA may be disposed at opposing edges or upper and lower edges. The non-display area NDA may include the plurality of pad parts PAD.

The fan-out area FOA may include the plurality of fan-out lines FOL. The plurality of fan-out lines FOL may overlap the first to third pixels SP1, SP2, and SP3 of the first pixel row PROW1. The fan-out line FOL may extend from the pad part PAD to the demultiplexer DMX. The fan-out line FOL may supply the data voltage received from the pad part PAD to the demultiplexer DMX. The fan-out line FOL may extend from the pad part PAD to the pixel circuit area CCA. The fan-out line FOL may supply the clock signal received from the pad part PAD to a clock line CKL, and may supply the power voltage or the control voltage received from the pad part PAD to a voltage line VL.

The antistatic area ESA may include a plurality of electrostatic discharging circuits ESD. The plurality of electrostatic discharging circuits ESD may overlap the first to third pixels SP1, SP2, and SP3 of the second pixel row PROW2. The electrostatic discharging circuit ESD may protect the demultiplexer DMX and the pixel circuit PC from static electricity. The electrostatic discharging circuit ESD may dissipate static electricity flowing from the outside to prevent the static electricity from flowing into the display area DA.

The demultiplexer area DMA may include a plurality of demultiplexers DMX. The demultiplexer DMX may sequentially supply the data voltage received from the fan-out line FOL to the first to third data lines DL1, DL2, and DL3. In such an embodiment, the display device 10 includes the plurality of demultiplexers DMX, such that the number of fan-out lines FOL and the area of the fan-out area FOA may be substantially reduced.

The pixel circuit area CCA may include a data line DL, the clock line CKL, the voltage line VL, and a carry line CRL.

A gate driver GDR may be disposed in the pixel circuit area CCA. The gate driver GDR may supply a gate signal to the gate line connected to the plurality of pixel circuits PC. The gate driver GDR may be connected to the clock line CLK, the voltage line VL, and the carry line CRL extending in the pixel circuit area CCA. The gate driver GDR may not overlap the plurality of pixels SP or the plurality of pixel circuits PC in the first direction (X-axis direction) or the second direction (Y-axis direction), but the disclosure is not limited thereto.

Figure 8:
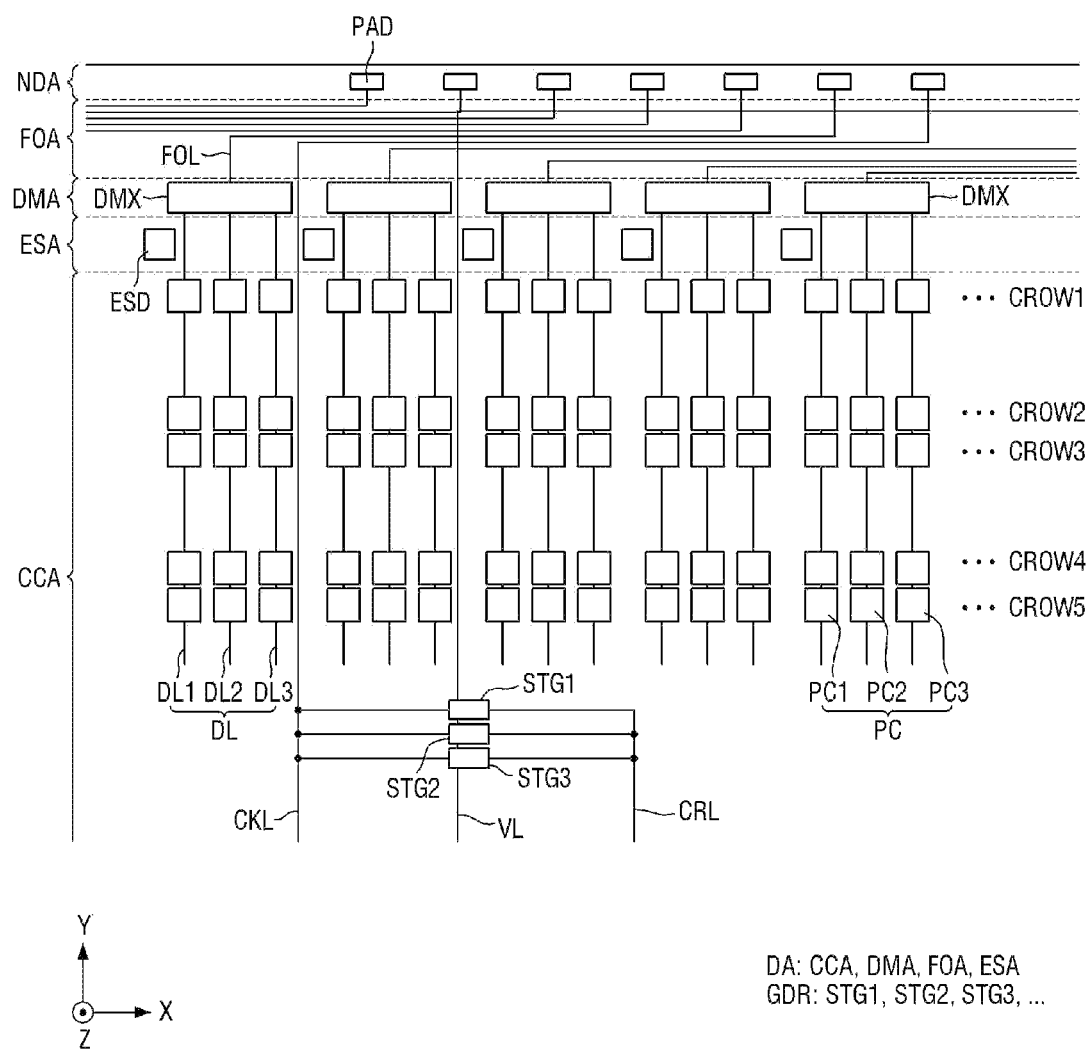
FIG. 8 illustrates a pixel circuit area, an antistatic area, a demultiplexer area, a fan-out area, and a non-display area in a display device according to another alternative embodiment.

FIG. 8 illustrates a pixel circuit area, an antistatic area, a demultiplexer area, a fan-out area, and a non-display area in a display device according to another alternative embodiment. The display device of FIG. 8 is substantially the same as the display devices of FIGS. 4 and 7 except for the position of the antistatic area ESA. The same or like elements shown in FIG. 8 have been labeled with the same reference characters as used above to describe the embodiments of the display device shown in FIGS. 4 and 7, and any repetitive detailed description thereof will hereinafter be omitted or simplified.

Referring to FIG. 8, an embodiment of the display device 10 may include the display area DA and the non-display area NDA. The display area DA may include the fan-out area FOA, the demultiplexer area DMA, the antistatic area ESA, and the pixel circuit area CCA. In an embodiment, for example, the fan-out area FOA, the demultiplexer area DMA, and the antistatic area ESA may be disposed at one edge or the upper edge of the display area DA. In an alternative embodiment, for example, the fan-out area FOA, the demultiplexer area DMA, and the antistatic area ESA may be disposed at opposing edges or upper and lower edges. The non-display area NDA may include the plurality of pad parts PAD.

The fan-out area FOA may include the plurality of fan-out lines FOL. The plurality of fan-out lines FOL may overlap the first to third pixels SP1, SP2, and SP3 of the first pixel row PROW1. The fan-out line FOL may extend from the pad part PAD to the demultiplexer DMX. The fan-out line FOL may supply the data voltage received from the pad part PAD to the demultiplexer DMX. The fan-out line FOL may extend from the pad part PAD to the pixel circuit area CCA. The fan-out line FOL may supply the clock signal received from the pad part PAD to a clock line CKL, and may supply the power voltage or the control voltage received from the pad part PAD to a voltage line VL.

The demultiplexer area DMA may include a plurality of demultiplexers DMX. The plurality of demultiplexers DMX may overlap the first to third pixels SP1, SP2, and SP3 of the second pixel row PROW2. The demultiplexer DMX may sequentially supply the data voltage received from the fan-out line FOL to the first to third data lines DL1, DL2, and DL3. In such an embodiment, the display device 10 includes the plurality of demultiplexers DMX, such that the number of fan-out lines FOL and the area of the fan-out area FOA may be substantially reduced.

The antistatic area ESA may include a plurality of electrostatic discharging circuits ESD. The electrostatic discharging circuit ESD may protect the pixel circuit PC from static electricity. The electrostatic discharging circuit ESD may dissipate static electricity flowing from the outside to prevent the static electricity from flowing into the display area DA.

The pixel circuit area CCA may include a data line DL, the clock line CKL, the voltage line VL, and a carry line CRL.

A gate driver GDR may be disposed in the pixel circuit area CCA. The gate driver GDR may supply a gate signal to the gate line connected to the plurality of pixel circuits PC. The gate driver GDR may be connected to the clock line CLK, the voltage line VL, and the carry line CRL extending in the pixel circuit area CCA. The gate driver GDR may not overlap the plurality of pixels SP or the plurality of pixel circuits PC in the first direction (X-axis direction) or the second direction (Y-axis direction), but the disclosure is not limited thereto.

Figure 9:
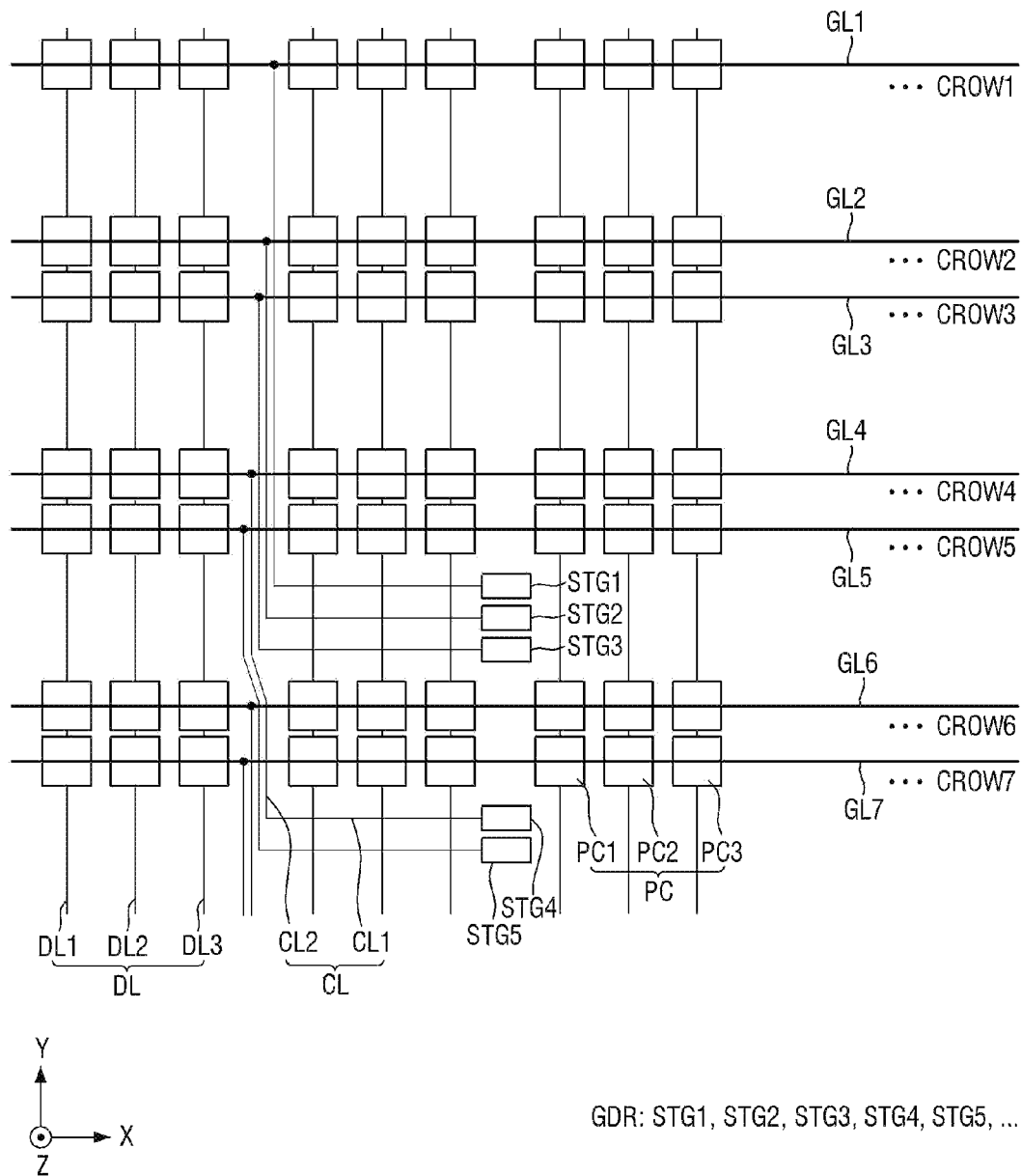
FIG. 9 illustrates the connection relationship between a stage and a gate line in a display device according to an embodiment.

FIG. 9 illustrates the connection relationship between a stage and a gate line in a display device according to an embodiment.

Referring to FIG. 9, in an embodiment, the gate driver GDR may be disposed in the pixel circuit area CCA. The gate driver GDR may supply a gate signal to the gate line connected to the plurality of pixel circuits PC. The gate driver GDR may be connected to the clock line CLK, the voltage line VL, and the carry line CRL extending in the pixel circuit area CCA. The gate driver GDR may be disposed between two pixel rows. The gate driver GDR may not overlap the plurality of pixels SP or the plurality of pixel circuits PC in the first direction (X-axis direction) or the second direction (Y-axis direction), but the disclosure is not limited thereto.

The gate driver GDR may include first to fifth stages STG1, STG2, STG3, STG4, and STG5. The first to third stages STG1, STG2, and STG3 may be disposed between the fifth circuit row CROW5 and the sixth circuit row CROW6. The first stage STG1 and the first circuit row CROW1 may be spaced apart from each other with the second to fifth circuit rows CROW2, CROW3, CROW4, and CROW5 interposed therebetween. The first stage STG1 may supply a gate signal to a first gate line GL1 connected to the pixel circuits PC of the first circuit row CROW1. The first stage STG1 may be connected to the first gate line GL1 through a connection line CL. The first stage STG1 may be connected to the first gate line GL1 through a first connection line CL1 extending in the first direction (X-axis direction) and a second connection line CL2 extending in the second direction (Y-axis direction). The first and second connection lines CL1 and CL2 may be disposed in the space between the plurality of pixels SP. The first and second connection lines CL1 and CL2 may be disposed in the space between the plurality of pixel circuits PC. The first connection line CL1 may be disposed in or directly on a same layer as the gate electrode of the thin film transistor of the pixel circuit PC, and the second connection line CL2 may be disposed in or directly on a same layer as the data line DL, but the disclosure is not limited thereto.

The second stage STG2 and the second circuit row CROW2 may be spaced apart from each other with the third to fifth circuit rows CROW3, CROW4, and CROW5 interposed therebetween. The second stage STG2 may supply a gate signal to a second gate line GL2 connected to the pixel circuits PC of the second circuit row CROW2. The second stage STG2 may be connected to the second gate line GL2 through the connection line CL. The second stage STG2 may be connected to the second gate line GL2 through the first connection line CL1 extending in the first direction (X-axis direction) and the second connection line CL2 extending in the second direction (Y-axis direction).

The third stage STG3 and the third circuit row CROW3 may be spaced apart from each other with the fourth and fifth circuit rows CROW4 and CROW5 interposed therebetween. The third stage STG3 may supply a gate signal to a third gate line GL3 connected to the pixel circuits PC of the third circuit row CROW3. The third stage STG3 may be connected to the third gate line GL3 through the connection line CL. The third stage STG3 may be connected to the third gate line GL3 through the first connection line CL1 extending in the first direction (X-axis direction) and the second connection line CL2 extending in the second direction (Y-axis direction).

The fourth and fifth stages STG4 and STG5 may be disposed under the seventh pixel row PROW7. The fourth stage STG4 and the fourth circuit row CROW4 may be spaced apart from each other with the fifth to seventh circuit rows CROW5, CROW6, and CROW7 interposed therebetween. The fourth stage STG4 may supply a gate signal to a fourth gate line GL4 connected to the pixel circuits PC of the fourth circuit row CROW4. The fourth stage STG4 may be connected to the fourth gate line GL4 through the connection line CL.

The fifth stage STG5 and the fifth circuit row CROW5 may be spaced apart from each other with the sixth and seventh circuit rows CROW6 and CROW7 interposed therebetween. The fifth stage STG5 may supply a gate signal to a fifth gate line GL5 connected to the pixel circuits PC of the fifth circuit row CROW5. The fifth stage STG5 may be connected to the fifth gate line GL5 through the connection line CL.

The pixel circuits PC of the sixth circuit row CROW6 may receive a gate signal from a sixth gate line GL6, and the pixel circuits PC of the seventh circuit row CROW7 may receive a gate signal from a seventh gate line GL7.

Figure 10:
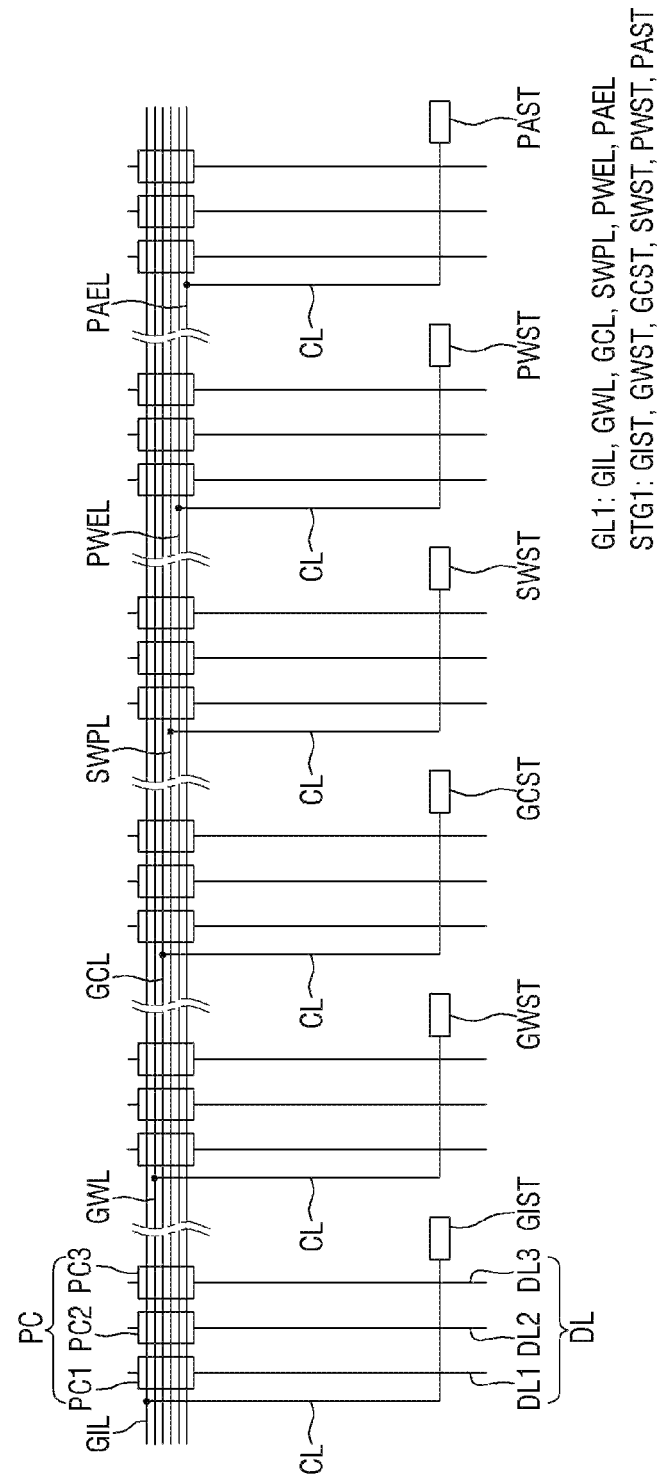
FIG. 10 illustrates the connection relationship between a plurality of stages and a plurality of gate lines in a display device according to an embodiment.

FIG. 10 illustrates the connection relationship between a plurality of stages and a plurality of gate lines in a display device according to an embodiment.

Referring to FIG. 10 in conjunction with FIG. 9, in an embodiment, the gate driver GDR may include the first to fifth stages STG1, STG2, STG3, STG4, and STG5. Each of the first to fifth stages STG1, STG2, STG3, STG4, and STG5 may include at least one selected from a scan initialization stage GIST, a scan write stage GWST, a scan control stage GCST, a sweep stage SWST, a PWM stage PWST, or a PAM stage PAST. In an embodiment, for example, the first stage STG1 may include at least one selected from the scan initialization stage GIST, the scan write stage GWST, the scan control stage GCST, the sweep stage SWST, the PWM stage PWST, or the PAM stage PAST.

The scan initialization stage GIST, the scan write stage GWST, the scan control stage GCST, the sweep stage SWST, the PWM stage PWST, and the PAM stage PAST may be disposed in the pixel circuit area CCA. Each of the scan initialization stage GIST, the scan write stage GWST, the scan control stage GCST, the sweep stage SWST, the PWM stage PWST, and the PAM stage PAST may be connected to the clock line CLK, the voltage line VL, and the carry line CRL. Each of the scan initialization stage GIST, the scan write stage GWST, the scan control stage GCST, the sweep stage SWST, the PWM stage PWST, and the PAM stage PAST may be disposed between two pixel rows. Each of the scan initialization stage GIST, the scan write stage GWST, the scan control stage GCST, the sweep stage SWST, the PWM stage PWST, and the PAM stage PAST may not overlap the plurality of pixels SP or the plurality of pixel circuits PC in the first direction (X-axis direction) or the second direction (Y-axis direction), but the disclosure is not limited thereto.

Each of the first to seventh gate lines GL1, GL2, GL3, GL4, GL5, GL6, and GL7 may include at least one selected from a scan initialization line GIL, a scan write line GWL, a scan control line GCL, a sweep line SWPL, a PWM emission line PWEL, or a PAM emission line PAEL. In an embodiment, for example, the first gate line GL1 may include at least one selected from the scan initialization line GIL, the scan write line GWL, the scan control line GCL, the sweep line SWPL, the PWM emission line PWEL, or the PAM emission line PAEL.

The scan initialization stage GIST may supply a scan initialization signal to the scan initialization line GIL connected to the pixel circuits PC of the first circuit row CROW1. The scan initialization stage GIST may be connected to the scan initialization line GIL through the connection line CL.

The scan write stage GWST may supply a scan write signal to the scan write line GWL connected to the pixel circuits PC of the first circuit row CROW1. The scan write stage GWST may be connected to the scan write line GWL through the connection line CL.

The scan control stage GCST may supply a scan control signal to the scan control line GCL connected to the pixel circuits PC of the first circuit row CROW1. The scan control stage GCST may be connected to the scan control line GCL through the connection line CL.

The sweep stage SWST may supply a sweep signal to the sweep line SWPL connected to the pixel circuits PC of the first circuit row CROW1. The sweep stage SWST may be connected to the sweep line SWPL through the connection line CL.

The PWM stage PWST may supply a sweep signal to the PWM emission line PWEL connected to the pixel circuits PC of the first circuit row CROW1. The PWM stage PWST may be connected to the PWM emission line PWEL through the connection line CL.

The PAM stage PAST may supply a sweep signal to the PAM emission line PAEL connected to the pixel circuits PC of the first circuit row CROW1. The PAM stage PAST may be connected to the PAM emission line PAEL through the connection line CL.

Figure 11:
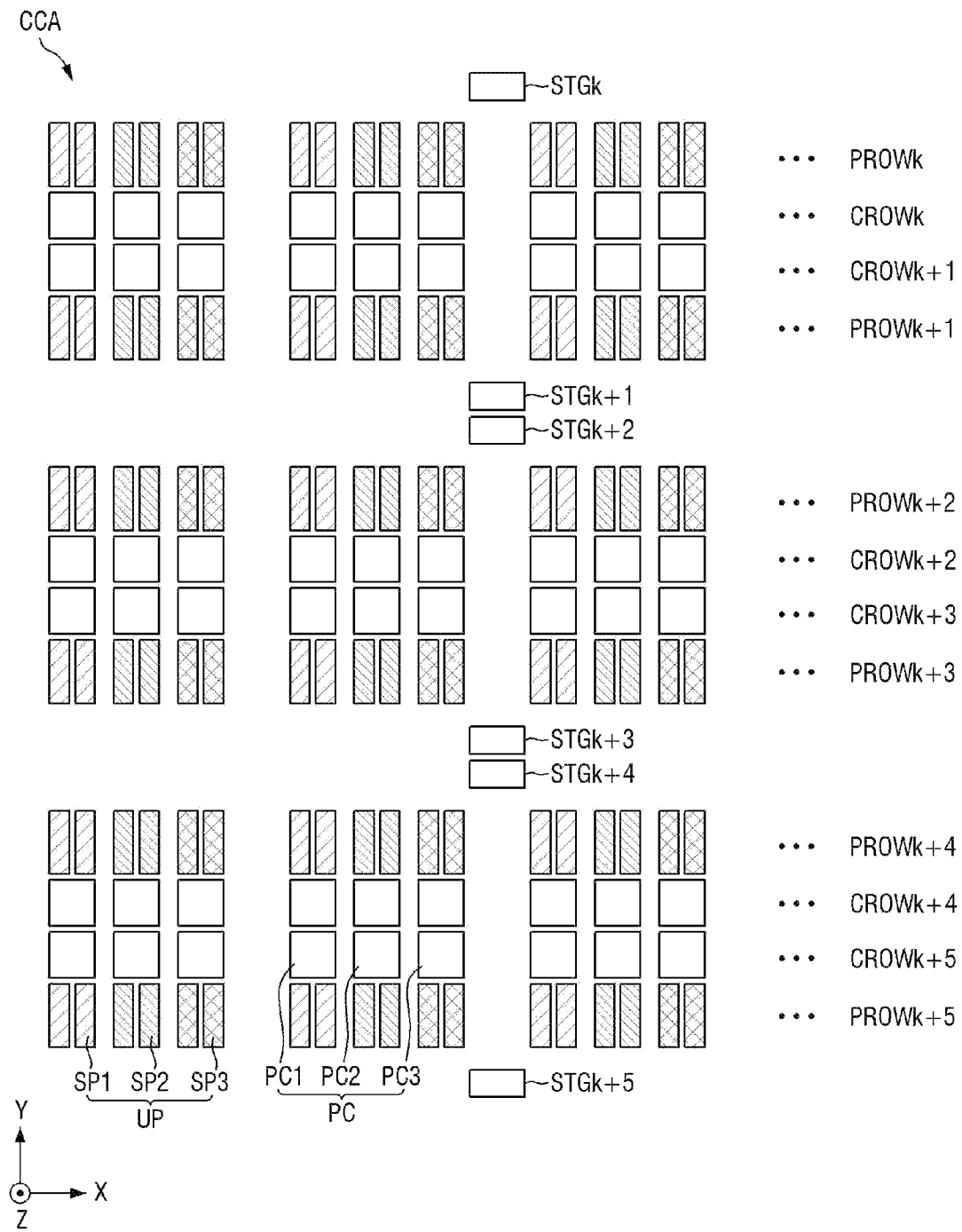
FIG. 11 illustrates a pixel circuit area of a display device according to an embodiment.
Figure 12:
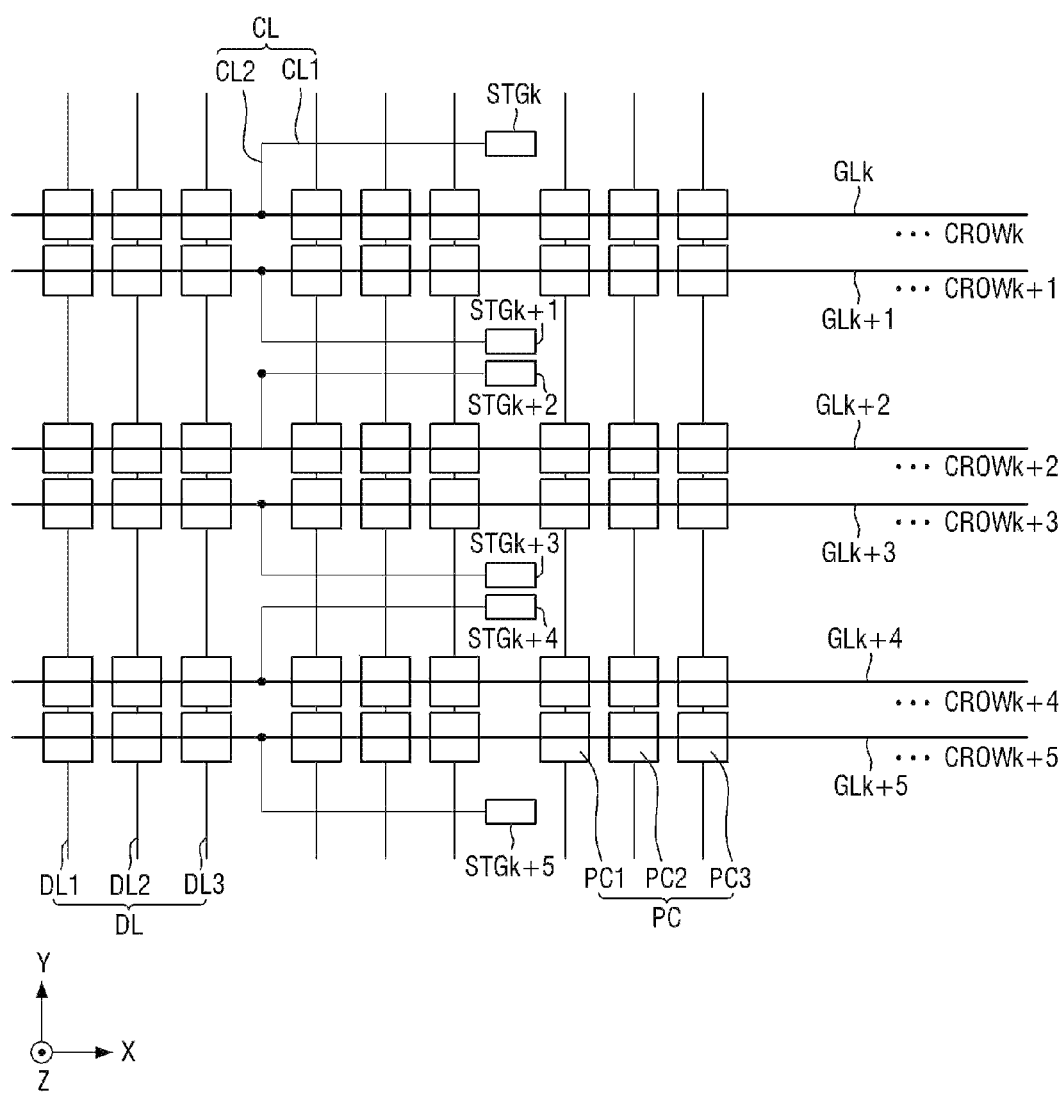
FIG. 12 illustrates the connection relationship between a stage and a gate line in a pixel circuit area of a display device according to an embodiment.

FIG. 11 illustrates a pixel circuit area of a display device according to an embodiment, and FIG. 12 illustrates the connection relationship between a stage and a gate line in a pixel circuit area of a display device according to an embodiment. The pixel circuit area CCA of FIGS. 11 and 12 may correspond to most of the pixel circuit area CCA that is not adjacent to the demultiplexer area DMA.

Referring to FIGS. 11 and 12 in conjunction with FIGS. 2, 3, and 9, in an embodiment, the pixel circuit PC may not be disposed above the sixth pixel row PROW6 and under the seventh pixel row PROW7. In an embodiment, for example, k in FIGS. 11 and 12 may be an integer of 6 or greater, but is not limited thereto.

A $k^{th}$ pixel row PROWk may be adjacent to a $k^{th}$ circuit row CROWk in the second direction (Y-axis direction), and a $(k+1)^{th}$ pixel row PROWk+1 may be adjacent to a $(k+1)^{th}$ circuit row CROWk+1 in the second direction (Y-axis direction). The $k^{th}$ and $(k+1)^{th}$ circuit rows CROWk and CROWk+1 may be disposed between the $k^{th}$ and $(k+1)^{th}$ pixel rows PROWk and PROWk+1. The first to third pixels SP1, SP2, and SP3 of the $k^{th}$ pixel row PROWk may be electrically connected to the first to third pixel circuits PC1, PC2, and PC3 of the $k^{th}$ circuit row CROWk through an anode connection line ACL, respectively. The first to third pixels SP1, SP2, and SP3 of the $(k+1)^{th}$ pixel row PROWk+1 may be electrically connected to the first to third pixel circuits PC1, PC2, and PC3 of the $(k+1)^{th}$ circuit row CROWk+1 through the anode connection line ACL, respectively.

A $(k+2)^{th}$ pixel row PROWk+2 may be adjacent to a $(k+2)^{th}$ circuit row CROWk+2 in the second direction (Y-axis direction), and a $(k+3)^{th}$ pixel row PROWk+3 may be adjacent to a $(k+3)^{th}$ circuit row CROWk+3 in the second direction (Y-axis direction). The $(k+2)^{th}$ and $(k+3)^{th}$ circuit rows CROWk+2 and CROWk+3 may be disposed between the $(k+2)^{th}$ and $(k+3)^{th}$ pixel rows PROWk+2 and PROWk+3. The first to third pixels SP1, SP2, and SP3 of the $(k+2)^{th}$ pixel row PROWk+2 may be electrically connected to the first to third pixel circuits PC1, PC2, and PC3 of the $(k+2)^{th}$ circuit row CROWk+2 through the anode connection line ACL, respectively. The first to third pixels SP1, SP2, and SP3 of the $(k+3)^{th}$ pixel row PROWk+3 may be electrically connected to the first to third pixel circuits PC1, PC2, and PC3 of the $(k+3)^{th}$ circuit row CROWk+3 through the anode connection line ACL, respectively.

A $(k+4)^{th}$ pixel row PROWk+4 may be adjacent to a $(k+4)^{th}$ circuit row CROWk+4 in the second direction (Y-axis direction), and a $(k+5)^{th}$ pixel row PROWk+5 may be adjacent to a $(k+5)^{th}$ circuit row CROWk+5 in the second direction (Y-axis direction). The $(k+4)^{th}$ and $(k+5)^{th}$ circuit rows CROWk+4 and CROWk+5 may be disposed between the $(k+4)^{th}$ and $(k+5)^{th}$ pixel rows PROWk+4 and PROWk+5. The first to third pixels SP1, SP2, and SP3 of the $(k+4)^{th}$ pixel row PROWk+4 may be electrically connected to the first to third pixel circuits PC1, PC2, and PC3 of the $(k+4)^{th}$ circuit row CROWk+4 through the anode connection line ACL, respectively. The first to third pixels SP1, SP2, and SP3 of the $(k+5)^{th}$ pixel row PROWk+5 may be electrically connected to the first to third pixel circuits PC1, PC2, and PC3 of the $(k+5)^{th}$ circuit row CROWk+5 through the anode connection line ACL, respectively.

A $k^{th}$ stage STGk may be disposed above the $k^{th}$ circuit row CROWk and the $k^{th}$ pixel row PROWk. The $k^{th}$ stage STGk may supply a gate signal to a $k^{th}$ gate line GLk connected to the pixel circuits PC of the $k^{th}$ circuit row CROWk. The $k^{th}$ stage STGk may be connected to the $k^{th}$ gate line GLk through the connection line CL. The $k^{th}$ stage STGk may be connected to the $k^{th}$ gate line GLk through the first connection line CL1 extending in the first direction (X-axis direction) and the second connection line CL2 extending in the second direction (Y-axis direction).

A $(k+1)^{th}$ stage STGk+1 and a $(k+2)^{th}$ stage STGk+2 may be disposed between the $(k+1)^{th}$ pixel row PROWk+1 and the $(k+2)^{th}$ pixel row PROWk+2. The $(k+1)^{th}$ stage STGk+1 may be disposed under the $(k+1)^{th}$ circuit row CROWk+1 and the $(k+1)^{th}$ pixel row PROWk+1. The $(k+1)^{th}$ stage STGk+1 may supply a gate signal to a $(k+1)^{th}$ gate line GLk+1 connected to the pixel circuits PC of the $(k+1)^{th}$ circuit row CROWk+1. The $(k+1)^{th}$ stage STGk+1 may be connected to the $(k+1)^{th}$ gate line GLk+1 through the connection line CL.

The $(k+2)^{th}$ stage STGk+2 may be disposed above the $(k+2)^{th}$ circuit row CROWk+2 and the $(k+2)^{th}$ pixel row PROWk+2. The $(k+1)^{th}$ stage STGk+1 may supply a gate signal to the $(k+1)^{th}$ gate line GLk+1 connected to the pixel circuits PC of the $(k+1)^{th}$ circuit row CROWk+1. The $(k+1)^{th}$ stage STGk+1 may be connected to the $(k+1)^{th}$ gate line GLk+1 through the connection line CL.

A $(k+3)^{th}$ stage STGk+3 and a $(k+4)^{th}$ stage STGk+4 may be disposed between the $(k+3)^{th}$ pixel row PROWk+3 and the $(k+4)^{th}$ pixel row PROWk+4. The $(k+3)^{th}$ stage STGk+3 may be disposed under the $(k+3)^{th}$ circuit row CROWk+3 and the $(k+3)^{th}$ pixel row PROWk+3. The $(k+3)^{th}$ stage STGk+3 may supply a gate signal to a $(k+3)^{th}$ gate line GLk+3 connected to the pixel circuits PC of the $(k+3)^{th}$ circuit row CROWk+3. The $(k+3)^{th}$ stage STGk+3 may be connected to the $(k+3)^{th}$ gate line GLk+3 through the connection line CL.

The $(k+4)^{th}$ stage STGk+4 may be disposed above the $(k+4)^{th}$ circuit row CROWk+4 and the (k+4)th pixel row PROWk+4. The $(k+4)^{th}$ stage STGk+4 may supply a gate signal to a $(k+4)^{th}$ gate line GLk+4 connected to the pixel circuits PC of the $(k+4)^{th}$ circuit row CROWk+4. The $(k+4)^{th}$ stage STGk+4 may be connected to the $(k+4)^{th}$ gate line GLk+4 through the connection line CL.

A $(k+5)^{th}$ stage STGk+5 may be disposed under the $(k+5)^{th}$ circuit row CROWk+5 and the $(k+5)^{th}$ pixel row PROWk+5. The $(k+5)^{th}$ stage STGk+5 may supply a gate signal to a $(k+5)^{th}$ gate line GLk+5 connected to the pixel circuits PC of the $(k+5)^{th}$ circuit row CROWk+5. The $(k+5)^{th}$ stage STGk+5 may be connected to the $(k+5)^{th}$ gate line GLk+5 through the connection line CL.

Figure 13:
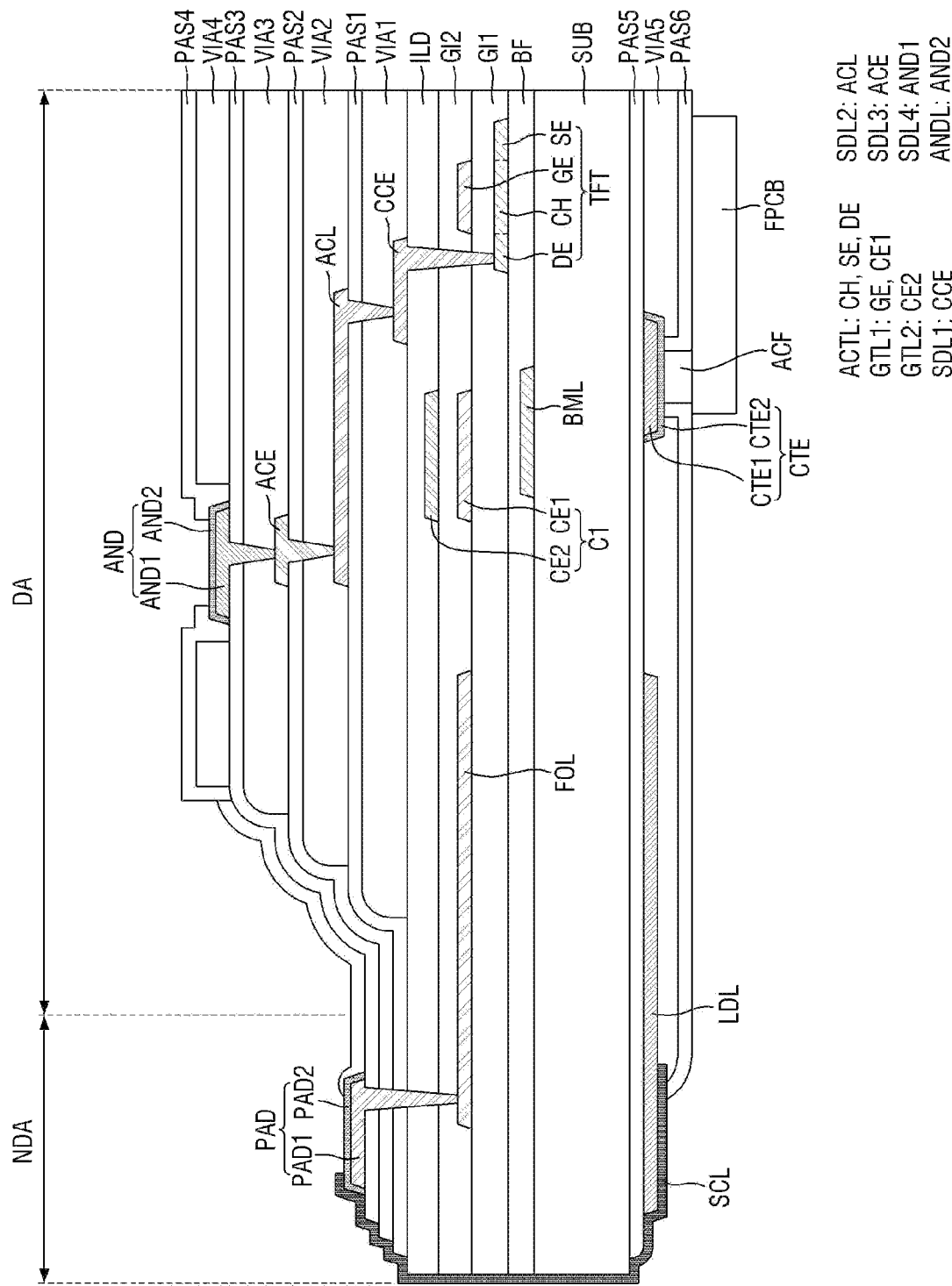
FIG. 13 is a cross-sectional view illustrating a display device according to an embodiment.

FIG. 13 is a cross-sectional view illustrating a display device according to an embodiment.

Referring to FIG. 13, an embodiment of the display device 10 may include a substrate SUB, a light blocking layer BML, a buffer layer BF, an active layer ACTL, a first gate insulating layer GI1, a first gate layer GTL1, a second gate insulating layer GI2, a second gate layer GTL2, an interlayer insulating layer ILD, a first source metal layer SDL1, a first via layer VIA1, a first passivation layer PAS1, a second source metal layer SDL2, a second via layer VIA2, a second passivation layer PAS2, a third source metal layer SDL3, a third via layer VIA3, a third passivation layer PAS3, a fourth source metal layer SDL4, an anode layer ANDL, a fourth via layer VIA4, a fourth passivation layer PAS4, a fifth passivation layer PAS5, a contact electrode CTE, a lead line LDL, a side surface connection line SCL, a fifth via layer VIA5, a sixth passivation layer PAS6, and a flexible film FPCB.

The substrate SUB may support the display device 10. The substrate SUB may be a base substrate or a base member. The substrate SUB may be a flexible substrate which can be bent, folded or rolled. In an embodiment, for example, the substrate SUB may include an insulating material such as a polymer resin such as polyimide ("PI"), but the disclosure is not limited thereto. In an alternative embodiment, for example, the substrate SUB may be a rigid substrate including a glass material.

The light blocking layer BML may be disposed on the substrate SUB. The light blocking layer BML may block light incident on the pixel circuit PC and a pixel electrode AND. The light blocking layer BML may be a single layer or multiple layers, each layer therein including or made of at least one selected from molybdenum (Mo), aluminum (Al), chromium (Cr), gold (Au), titanium (Ti), nickel (Ni), neodymium (Nd) and copper (Cu) or an alloy thereof.

The buffer layer BF may be disposed on the substrate SUB. The buffer layer BF may include an inorganic material capable of preventing permeation of air or moisture. The buffer layer BF may include a plurality of inorganic layers that are alternately stacked. In an embodiment, for example, the buffer layer BF may be a multilayer in which one or more inorganic layers selected from a silicon nitride layer, a silicon oxynitride layer, a silicon oxide layer, a titanium oxide layer and an aluminum oxide layer are alternately stacked one on another.

The active layer ACTL may be disposed on the buffer layer BF. The active layer ACTL may include a channel CH, a source electrode SE, and a drain electrode DE of a thin film transistor TFT. Here, the thin film transistor TFT may be a transistor constituting the pixel circuit PC. The source electrode SE and the drain electrode DE may be made to be conductive by performing heat treatment on the active layer ACTL. In an embodiment, for example, the active layer ACTL may include polycrystalline silicon, monocrystalline silicon, low-temperature polycrystalline silicon, amorphous silicon, or an oxide semiconductor. In an alternative embodiment, for example, the active layer ACTL may include first and second active layers disposed in or directly on different layers from each other. In such an embodiment, the first active layer may include polycrystalline silicon, monocrystalline silicon, low-temperature polycrystalline silicon, or amorphous silicon, and the second active layer may include an oxide semiconductor.

The first gate insulating layer GI1 may be disposed on the active layer ACTL. The first gate insulating layer GI1 may insulate a gate electrode GE and the channel CH of the thin film transistor TFT. The first gate insulating layer GI1 may include an inorganic layer. In an embodiment, for example, the first gate insulating layer GI1 may include at least one selected from a silicon nitride layer, a silicon oxynitride layer, a silicon oxide layer, a titanium oxide layer, and an aluminum oxide layer.

The first gate layer GTL1 may be disposed on the first gate insulating layer GI1. The first gate layer GTL1 may include the fan-out line FOL, the gate electrode GE of the thin film transistor TFT, and a first capacitor electrode CE1 of a first capacitor C1. The first gate layer GTL1 may be a single layer or multiple layers, each layer therein including or made of at least one selected from molybdenum (Mo), aluminum (Al), chromium (Cr), gold (Au), titanium (Ti), nickel (Ni), neodymium (Nd) and copper (Cu) or an alloy thereof.

The fan-out line FOL may be connected to the pad part PAD while penetrating (e.g., by being disposed through or via a hole defined through) the first to third passivation layers PAS1, PAS2, and PAS3, the interlayer insulating layer ILD, and the second gate insulating layer GI2. The fan-out line FOL may extend from the pad part PAD to the display area DA, such that the size of the non-display area NDA may be reduced.

The second gate insulating layer GI2 may be disposed on the first gate layer GTL1. The second gate insulating layer GI2 may insulate the first gate layer GTL1 and the second gate layer GTL2. The second gate insulating layer GI2 may include an inorganic layer. In an embodiment, for example, the second gate insulating layer GI2 may include at least one selected from a silicon nitride layer, a silicon oxynitride layer, a silicon oxide layer, a titanium oxide layer, and an aluminum oxide layer.

The second gate layer GTL2 may be disposed on the second gate insulating layer GI2. The second gate layer GTL2 may include the first capacitor electrode CE1 of the first capacitor C1. The second gate layer GTL2 may be a single layer or multiple layers, each layer therein including or made of at least one selected from molybdenum (Mo), aluminum (Al), chromium (Cr), gold (Au), titanium (Ti), nickel (Ni), neodymium (Nd) and copper (Cu) or an alloy thereof.

The interlayer insulating layer ILD may be disposed on the second gate layer GTL2. The interlayer insulating layer ILD may insulate the first source metal layer SDL1 and the second gate layer GTL2. The interlayer insulating layer ILD may include an inorganic layer. In an embodiment, for example, the interlayer insulating layer ILD may include at least one selected from a silicon nitride layer, a silicon oxynitride layer, a silicon oxide layer, a titanium oxide layer, and an aluminum oxide layer. The first source metal layer SDL1 may be disposed on the interlayer insulating layer ILD. The first source metal layer SDL1 may include a connection electrode CCE. The connection electrode CCE may be connected to the anode connection line ACL while penetrating the first passivation layer PAS1 and the first via layer VIAL. The connection electrode CCE may be connected to the drain electrode DE of the thin film transistor TFT while penetrating the interlayer insulating layer ILD, the second gate insulating layer GI2, and the first gate insulating layer GI1. Therefore, the connection electrode CCE may electrically connect the anode connection line ACL and the drain electrode DE. The first source metal layer SDL1 may be a single layer or multiple layers, each layer therein including or made of at least one selected from molybdenum (Mo), aluminum (Al), chromium (Cr), gold (Au), titanium (Ti), nickel (Ni), neodymium (Nd) and copper (Cu) or an alloy thereof.

The first via layer VIA1 may be disposed on the first source metal layer SDL1. The first via layer VIA1 may flatten the upper end of the first source metal layer SDL1. The first via layer VIA1 may include an organic layer such as an acryl resin, an epoxy resin, a phenolic resin, a polyamide resin, a polyimide resin, or the like.

The first passivation layer PAS1 may be disposed on the first via layer VIA1 to protect the first source metal layer SDL1. The first passivation layer PAS1 may include an inorganic layer. In an embodiment, for example, the first passivation layer PAS1 may include at least one selected from a silicon nitride layer, a silicon oxynitride layer, a silicon oxide layer, a titanium oxide layer, and an aluminum oxide layer.

The second source metal layer SDL2 may be disposed on the first via layer VIAL. The second source metal layer SDL2 may include the anode connection line ACL. The anode connection line ACL may be connected to an anode connection electrode ACE while penetrating the second passivation layer PAS2 and the second via layer VIA2. The anode connection line ACL may be connected to the connection electrode CCE while penetrating the first passivation layer PAS1 and the first via layer VIAL Therefore, the anode connection line ACL may electrically connect the anode connection electrode ACE and the connection electrode CCE. The second source metal layer SDL2 may be a single layer or multiple layers, each layer therein including or made of at least one selected from molybdenum (Mo), aluminum (Al), chromium (Cr), gold (Au), titanium (Ti), nickel (Ni), neodymium (Nd) and copper (Cu) or an alloy thereof.

The second via layer VIA2 may be disposed on the second source metal layer SDL2. The second via layer VIA2 may flatten the upper end of the second source metal layer SDL2. The second via layer VIA2 may include an organic layer such as an acryl resin, an epoxy resin, a phenolic resin, a polyamide resin, a polyimide resin, or the like.

The second passivation layer PAS2 may be disposed on the second via layer VIA2 to protect the second source metal layer SDL2. The second passivation layer PAS2 may include an inorganic layer. In an embodiment, for example, the second passivation layer PAS2 may include at least one selected from a silicon nitride layer, a silicon oxynitride layer, a silicon oxide layer, a titanium oxide layer, and an aluminum oxide layer.

The third source metal layer SDL3 may be disposed on the second via layer VIA2. The third source metal layer SDL3 may include the anode connection electrode ACE. The anode connection electrode ACE may be connected to a first pixel electrode AND1 while penetrating the third passivation layer PAS3 and the third via layer VIA3. The anode connection electrode ACE may be connected to the anode connection line ACL while penetrating the second passivation layer PAS2 and the second via layer VIA2. Therefore, the anode connection electrode ACE may electrically connect the first pixel electrode AND1 and the anode connection line ACL. The third source metal layer SDL3 may be a single layer or multiple layers, each layer therein including or made of at least one selected from molybdenum (Mo), aluminum (Al), chromium (Cr), gold (Au), titanium (Ti), nickel (Ni), neodymium (Nd) and copper (Cu) or an alloy thereof.

The third via layer VIA3 may be disposed on the third source metal layer SDL3. The third via layer VIA3 may flatten the upper end of the third source metal layer SDL3. The third via layer VIA3 may include an organic layer such as an acryl resin, an epoxy resin, a phenolic resin, a polyamide resin, a polyimide resin, or the like.

The third passivation layer PAS3 may be disposed on the third via layer VIA3 to protect the third source metal layer SDL3. The third passivation layer PAS3 may include an inorganic layer. In an embodiment, for example, the third passivation layer PAS3 may include at least one selected from a silicon nitride layer, a silicon oxynitride layer, a silicon oxide layer, a titanium oxide layer, and an aluminum oxide layer.

The fourth source metal layer SDL4 may be disposed on the third passivation layer PAS3. The fourth source metal layer SDL4 may include the first pixel electrode AND1. The first pixel electrode AND1 may be connected to the anode connection electrode ACE while penetrating the third passivation layer PAS3 and the third via layer VIA3. The fourth source metal layer SDL4 may be a single layer or multiple layers, each layer therein including or made of at least one selected from molybdenum (Mo), aluminum (Al), chromium (Cr), gold (Au), titanium (Ti), nickel (Ni), neodymium (Nd) and copper (Cu) or an alloy thereof.

The anode layer ANDL may be disposed on the fourth source metal layer SDL4. The anode layer ANDL may include a second pixel electrode AND2. The anode layer ANDL may include a transparent conductive material ("TCO") such as indium tin oxide ("ITO") or indium zinc oxide ("IZO").

The pad part PAD may be disposed on the third passivation layer PAS3 in the non-display area NDA. The pad part PAD may supply the voltage or the signal received from the side surface connection line SCL to the fan-out line FOL. The pad part PAD may include a first pad electrode PAD1 and a second pad electrode PAD2. The first pad electrode PAD1 may be include or formed of a same material as that of the first pixel electrode AND1 in a same process. The first pad electrode PAD1 may be connected to the fan-out line FOL while penetrating the first to third passivation layers PAS1, PAS2, and PAS3, the interlayer insulating layer ILD, and the second gate insulating layer GI2. The second pad electrode PAD2 may include or be formed of a same material as that of the second pixel electrode AND2 in a same process. The second pad electrode PAD2 may be electrically connected to the lead line LDL through the side surface connection line SCL.

The fourth via layer VIA4 may be disposed on the third passivation layer PAS3 on which the pixel electrode AND is not formed. The fourth via layer VIA4 may flatten the upper end of the third passivation layer PAS3.

The fourth passivation layer PAS4 may be disposed on the fourth via layer VIA4 and the edge of the pixel electrode AND. The fourth passivation layer PAS4 may include an inorganic layer. In an embodiment, for example, the fourth passivation layer PAS4 may include at least one selected from a silicon nitride layer, a silicon oxynitride layer, a silicon oxide layer, a titanium oxide layer, and an aluminum oxide layer. The fourth passivation layer PAS4 may expose a part of the top surface of the pixel electrode AND without covering the pixel electrode AND. The light emitting element ED may be disposed on the pixel electrode AND that is not covered by the fourth passivation layer PAS4.

The fifth passivation layer PAS5 may be disposed on the bottom surface of the substrate SUB to flatten the bottom surface of the substrate SUB. The fifth passivation layer PAS5 may include an inorganic layer. In an embodiment, for example, the fifth passivation layer PAS5 may include at least one selected from a silicon nitride layer, a silicon oxynitride layer, a silicon oxide layer, a titanium oxide layer, and an aluminum oxide layer.

The contact electrode CTE may be disposed on one surface or the bottom surface of the fifth passivation layer PAS5. The contact electrode CTE may supply the voltage or the signal received from the flexible film FPCB to the side surface connection line SCL through the lead line LDL. The contact electrode CTE may be electrically connected to the flexible film FPCB through a connection film ACF.

The contact electrode CTE may include a first contact electrode CTE1 and a second contact electrode CTE2. The first contact electrode CTE1 may be disposed on one surface or the bottom surface of the fifth passivation layer PAS5. The first contact electrode CTE1 may be a single layer or multiple layers, each layer therein including or made of at least one selected from molybdenum (Mo), aluminum (Al), chromium (Cr), gold (Au), titanium (Ti), nickel (Ni), neodymium (Nd) and copper (Cu) or an alloy thereof. The second contact electrode CTE2 may be disposed on one surface or the bottom surface of the first contact electrode CTE1. The second contact electrode CTE2 may include a TCO such as ITO or IZO.

The lead line LDL may be disposed on one surface or the bottom surface of the fifth passivation layer PAS5. The lead line LDL may include or be formed of a same material as that of the first contact electrode CTE1 in or directly on a same layer. The lead line LDL may supply the voltage or the signal received from the contact electrode CTE to the side surface connection line SCL.

The side surface connection line SCL may be disposed at the bottom surface edge, the side surface, and the top surface edge of the substrate SUB. One end of the side surface connection line SCL may be connected to the lead line LDL, and another end of the side surface connection line SCL may be connected to the pad part PAD. The side surface connection line SCL may pass through the side surfaces of the substrate SUB, the buffer layer BF, the first and second gate insulating layers GI1 and GI2, the interlayer insulating layer ILD, and the first to third passivation layers PAS1, PAS2, and PAS3.

The fifth via layer VIA5 may cover at least a part of the lead line LDL and the contact electrode CTE. The fifth via layer VIA5 may flatten the lower end of the substrate SUB. The fifth via layer VIA5 may include an organic layer such as an acryl resin, an epoxy resin, a phenolic resin, a polyamide resin, a polyimide resin, or the like.

The sixth passivation layer PAS6 may be disposed on one surface or the bottom surface of the fifth via layer VIA5 to protect the contact electrode CTE and the lead line LDL. The sixth passivation layer PAS6 may include an inorganic layer. In an embodiment, for example, the sixth passivation layer PAS6 may include at least one selected from a silicon nitride layer, a silicon oxynitride layer, a silicon oxide layer, a titanium oxide layer, and an aluminum oxide layer.

The flexible film FPCB may be disposed on one surface or the bottom surface of the sixth passivation layer PAS6. The flexible film FPCB may be attached to the bottom surface of the sixth passivation layer PAS6 using an adhesive member (not shown). One side of the flexible film FPCB may supply a voltage or a signal to the pad part PAD disposed above the substrate SUB through the contact electrode CTE, the lead line LDL, and the side surface connection line SCL. Another side of the flexible film FPCB may be connected to a source circuit board (not shown) under the substrate SUB. The flexible film FPCB may transmit the signal of a display driver (not shown) to the display device 10.

The connection film ACF may attach the flexible film FPCB to the bottom surface of the contact electrode CTE. In an embodiment, for example, the connection film ACF may include an anisotropic conductive film. In an embodiment where the connection film ACF includes the anisotropic conductive film, the connection film ACF may have conductivity in the region where the contact electrode CTE and the flexible film FPCB are in contact with each other, and may electrically connect the flexible film FPCB to the contact electrode CTE.

In such an embodiment, the display device 10 includes the flexible film FPCB disposed under the substrate SUB, the pad part PAD disposed above the substrate SUB, the contact electrode CTE that electrically connects the flexible film FPCB and the pad part PAD, the lead line LDL, and the side surface connection line SCL, such that the area of the non-display area NDA may be minimized.

Figure 14:
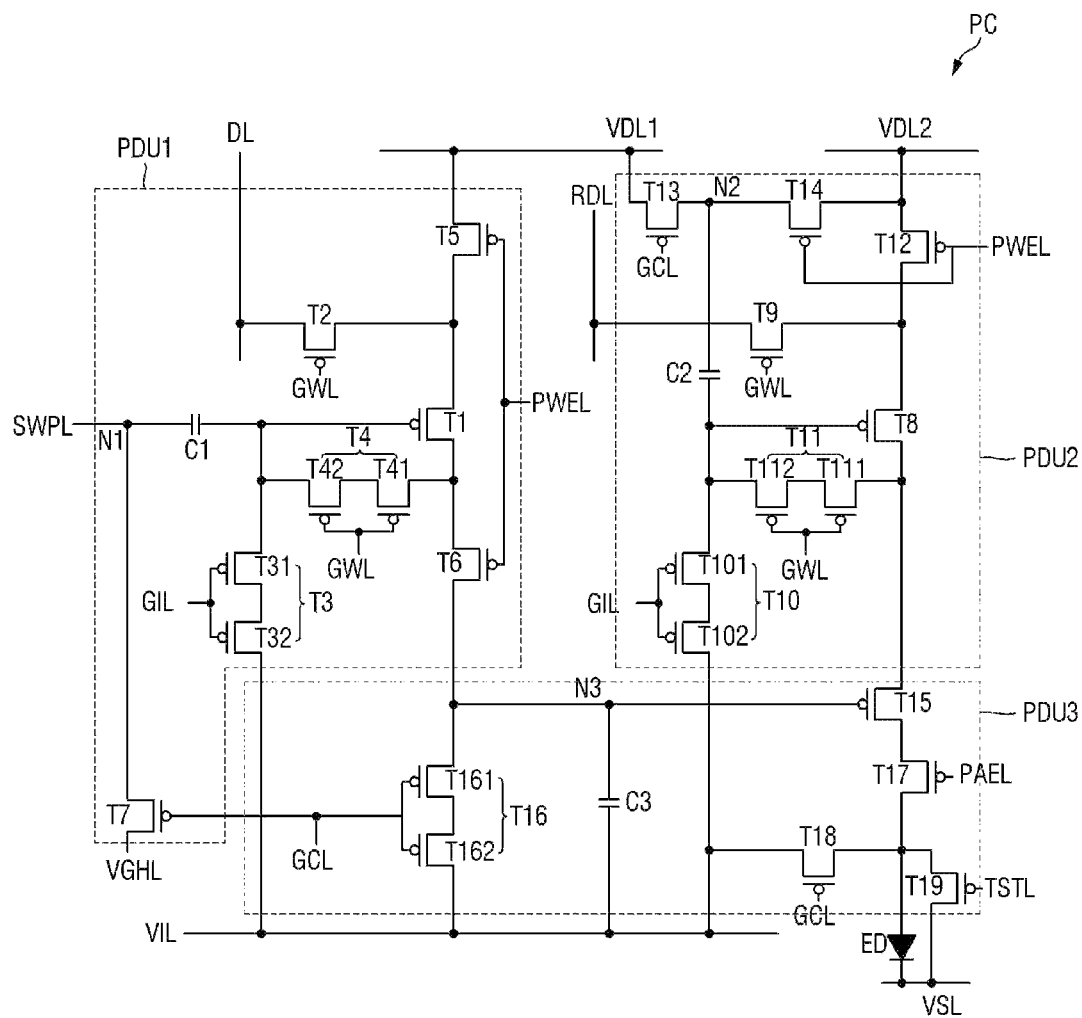
FIG. 14 is a circuit diagram illustrating a pixel circuit of a display device according to an embodiment.

FIG. 14 is a circuit diagram illustrating a pixel circuit of a display device according to an embodiment.

Referring to FIG. 14, in an embodiment, the pixel circuit PC may be connected to the scan write line GWL, the scan initialization line GIL, the scan control line GCL, the sweep line SWPL, the PWM emission line PWEL, the PAM emission line PAEL, the data line DL, and a PAM data line RDL. The pixel circuit PC may be connected to a first power line VDL1 to which a first power voltage is applied, a second power line VDL2 to which a second power voltage is applied, a third power line VSL to which a third power voltage is applied, an initialization voltage line VIL to which an initialization voltage is applied, and the gate-off voltage line VGHL to which a gate-off voltage VGH is applied.

The pixel circuit PC may include a first pixel driver PDU1, a second pixel driver PDU2, and a third pixel driver PDU3. The pixel circuit PC may be connected to the light emitting element ED of each of the first to third pixels SP1, SP2, and SP3.

The light emitting element ED may emit light in response to the driving current generated by the second pixel driver PDU2. The light emitting element ED may be disposed (or connected) between a seventeenth transistor T17 and the third power line VSL. The first electrode of the light emitting element ED may be connected to the second electrode of the seventeenth transistor T17, and the second electrode of the light emitting element ED may be connected to the third power line VSL. The first electrode of the light emitting element ED may be an anode electrode and the second electrode thereof may be a cathode electrode. The light emitting element ED may be an inorganic light emitting element including a first electrode, a second electrode, and an inorganic semiconductor disposed between the first electrode and the second electrode. In an embodiment, for example, the light emitting element ED may be a micro LED including an inorganic semiconductor, but is not limited thereto. The micro LED may be a flip chip type micro LED.

The first pixel driver PDU1 may generate a control current based on the data voltage of the data line DL to control the voltage of a third node N3 of the third pixel driver PDU3. The control current of the first pixel driver PDU1 may adjust the pulse width of the voltage applied to the first electrode of the light emitting element ED, and the first pixel driver PDU1 may perform pulse width modulation of the voltage applied to the first electrode of the light emitting element ED. Therefore, the first pixel driver PDU1 may be a PWM unit.

The first pixel driver PDU1 may include first to seventh transistors T1 to T7 and the first capacitor C1.

The first transistor T1 may control the control current flowing between the second electrode thereof and the first electrode thereof based on the data voltage applied to the gate electrode thereof.

The second transistor T2 may be turned on by the scan write signal of the scan write line GWL to supply the data voltage of the data line DL to the first electrode of the first transistor T1. The gate electrode of the second transistor T2 may be connected to the scan write line GWL, the first electrode thereof may be connected to the data line DL, and the second electrode thereof may be connected to the first electrode of the first transistor T1.

The third transistor T3 may be turned on by the scan initialization signal of the scan initialization line GIL to electrically connect the initialization voltage line VIL to the gate electrode of the first transistor T1. During the turn-on period of the third transistor T3, the gate electrode of the first transistor T1 may be discharged to the initialization voltage of the initialization voltage line VIL. A gate-on voltage VGL of the scan initialization signal may be different from the initialization voltage of the initialization voltage line VIL. Since the difference voltage between the gate-on voltage VGL and the initialization voltage is greater than a threshold voltage of the third transistor T3, the third transistor T3 may be stably turned on even after the initialization voltage is applied to the gate electrode of the first transistor T1. Therefore, when the third transistor T3 is turned on, the gate electrode of the first transistor T1 may stably receive the initialization voltage regardless of the threshold voltage of the third transistor T3.

The third transistor T3 may include a plurality of sub-transistors connected in series. In an embodiment, for example, the third transistor T3 may include a first sub-transistor T31 and a second sub-transistor T32. The first and second sub-transistors T31 and T32 may prevent the voltage of the gate electrode of the first transistor T1 from leaking through the third transistor T3. The gate electrode of the first sub-transistor T31 may be connected to the scan initialization line GIL, the first electrode thereof may be connected to the gate electrode of the first transistor T1, and the second electrode thereof may be connected to the first electrode of the second sub-transistor T32. The gate electrode of the second sub-transistor T32 may be connected to the scan initialization line GIL, the first electrode thereof may be connected to the second electrode of the first sub-transistor T31, and the second electrode thereof may be connected to the initialization voltage line VIL.

The fourth transistor T4 may be turned on by the scan write signal of the scan write line GWL to electrically connect the gate electrode and the second electrode of the first transistor T1. Therefore, during the turn-on period of the fourth transistor T4, the first transistor T1 may operate as a diode.

The fourth transistor T4 may include a plurality of sub-transistors connected in series. In an embodiment, for example, the fourth transistor T4 may include a third sub-transistor T41 and a fourth sub-transistor T42. The third and fourth sub-transistors T41 and T42 may prevent the voltage of the gate electrode of the first transistor T1 from leaking through the fourth transistor T4. The gate electrode of the third sub-transistor T41 may be connected to the scan write line GWL, the first electrode thereof may be connected to the second electrode of the first transistor T1, and the second electrode thereof may be connected to the first electrode of the fourth sub-transistor T42. The gate electrode of the fourth sub-transistor T42 may be connected to the scan write line GWL, the first electrode thereof may be connected to the second electrode of the third sub-transistor T41, and the second electrode thereof may be connected to the gate electrode of the first transistor T1.

The fifth transistor T5 may be turned on by a PWM emission signal of the PWM emission line PWEL to electrically connect the first power line VDL1 to the first electrode of the first transistor T1. The gate electrode of the fifth transistor T5 may be connected to the PWM emission line PWEL, the first electrode thereof may be connected to the first power line VDL1, and the second electrode thereof may be connected to the first electrode of the first transistor T1.

The sixth transistor T6 may be turned on by the PWM emission signal of the PWM emission line PWEL to electrically connect the second electrode of the first transistor T1 to the third node N3 of the third pixel driver PDU3. The gate electrode of the sixth transistor T6 may be connected to the PWM emission line PWEL, the first electrode thereof may be connected to the second electrode of the first transistor T1, and the second electrode thereof may be connected to the third node N3 of the third pixel driver PDU3.

The seventh transistor T7 may be turned on by the scan control signal of the scan control line GCL to supply the gate-off voltage VGH of the gate-off voltage line VGHL to a first node N1 connected to the sweep line SWPL. Therefore, the change in the voltage of the gate voltage of the first transistor T1 may be effectively prevented from being reflected in the sweep signal of the sweep line SWPL by the first capacitor C1 during the period in which the initialization voltage is applied to the gate electrode of the first transistor T1 and the period in which the data voltage of the data line DL and a threshold voltage Vth1 of the first transistor T1 are programmed. The gate electrode of the seventh transistor T7 may be connected to the scan control line GCL, the first electrode thereof may be connected to the gate-off voltage line VGHL, and the second electrode thereof may be connected to the first node N1.

The first capacitor C1 may be connected between the gate electrode of the first transistor T1 and the first node N1. One electrode of the first capacitor C1 may be connected to the gate electrode of the first transistor T1, and another electrode thereof may be connected to the first node N1.

The first node N1 may be the contact point of (or a point connected to) the sweep line SWPL, the second electrode of the seventh transistor T7, and another electrode of the first capacitor C1.

The second pixel driver PDU2 may generate the driving current supplied to the light emitting element ED based on the PAM data voltage of the PAM data line RDL. The second pixel driver PDU2 may be a PAM unit for performing pulse amplitude modulation. The second pixel driver PDU2 may be a constant current generator that receives a same PAM data voltage and generates a same driving current regardless of the luminance of the first to third pixels SP1, SP2, and SP3.

The second pixel driver PDU2 may include eighth to fourteenth transistors T8 to T14 and a second capacitor C2.

The eighth transistor T8 may control the driving current flowing to the light emitting element ED based on the voltage applied to the gate electrode thereof.

The ninth transistor T9 may be turned on by the scan write signal of the scan write line GWL to supply the PAM data voltage of the PAM data line RDL to the first electrode of the eighth transistor T8. The gate electrode of the ninth transistor T9 may be connected to the scan write line GWL, the first electrode thereof may be connected to the PAM data line RDL, and the second electrode thereof may be connected to the first electrode of the eighth transistor T8.

The tenth transistor T10 may be turned on by the scan initialization signal of the scan initialization line GIL to electrically connect the initialization voltage line VIL to the gate electrode of the eighth transistor T8. During the turn-on period of the tenth transistor T10, the gate electrode of the eighth transistor T8 may be discharged to the initialization voltage of the initialization voltage line VIL. The gate-on voltage VGL of the scan initialization signal may be different from the initialization voltage of the initialization voltage line VIL. Since the difference voltage between the gate-on voltage VGL and the initialization voltage is greater than the threshold voltage of the tenth transistor T10, the tenth transistor T10 may be stably turned on even after the initialization voltage is applied to the gate electrode of the eighth transistor T8. Therefore, when the tenth transistor T10 is turned on, the gate electrode of the eighth transistor T8 may stably receive the initialization voltage regardless of the threshold voltage of the tenth transistor T10.

The tenth transistor T10 may include a plurality of sub-transistors connected in series. In an embodiment, for example, the tenth transistor T10 may include a fifth sub-transistor T101 and a sixth sub-transistor T102. The fifth and sixth sub-transistors T101 and T102 may prevent the voltage of the gate electrode of the eighth transistor T8 from leaking through the tenth transistor T10. The gate electrode of the fifth sub-transistor T101 may be connected to the scan initialization line GIL, the first electrode thereof may be connected to the gate electrode of the eighth transistor T8, and the second electrode thereof may be connected to the first electrode of the sixth sub-transistor T102. The gate electrode of the sixth sub-transistor T102 may be connected to the scan initialization line GIL, the first electrode thereof may be connected to the second electrode of the fifth sub-transistor T101, and the second electrode thereof may be connected to the initialization voltage line VIL.

The eleventh transistor T11 may be turned on by the scan write signal of the scan write line GWL to electrically connect the gate electrode and the second electrode of the eighth transistor T8. Therefore, during the turn-on period of the eleventh transistor T11, the eighth transistor T8 may operate as a diode.

The eleventh transistor T11 may include a plurality of sub-transistors connected in series. In an embodiment, for example, the eleventh transistor T11 may include a seventh sub-transistor T111 and an eighth sub-transistor T112. The seventh and eighth sub-transistors T111 and T112 may prevent the voltage of the gate electrode of the eighth transistor T8 from leaking through the eleventh transistor T11. The gate electrode of the seventh sub-transistor T111 may be connected to the scan write line GWL, the first electrode thereof may be connected to the second electrode of the eighth transistor T8, and the second electrode thereof may be connected to the first electrode of the eighth sub-transistor T112. The gate electrode of the eighth sub-transistor T112 may be connected to the scan write line GWL, the first electrode thereof may be connected to the second electrode of the seventh sub-transistor T111, and the second electrode thereof may be connected to the gate electrode of the eighth transistor T8.

The twelfth transistor T12 may be turned on by the PWM emission signal of the PWM emission line PWEL to electrically connect the first electrode of the eighth transistor T8 to the second power line VDL2. The gate electrode of the twelfth transistor T12 may be connected to the PWM emission line PWEL, the first electrode thereof may be connected to the second power line VDL2, and the second electrode thereof may be connected to the first electrode of the eighth transistor T8.

The thirteenth transistor T13 may be turned on by the scan control signal of the scan control line GCL to electrically connect the first power line VDL1 to the second node N2. The gate electrode of the thirteenth transistor T13 may be connected to the scan control line GCL, the first electrode thereof may be connected to the first power line VDL1, and the second electrode thereof may be connected to the second node N2.

The fourteenth transistor T14 may be turned on by the PWM emission signal of the PWM emission line PWEL to electrically connect the first electrode of the eighth transistor T8 to the second node N2. The gate electrode of the fourteenth transistor T14 may be connected to the PWM emission line PWEL, the first electrode thereof may be connected to the second power line VDL2, and the second electrode thereof may be connected to the second node N2.

The second capacitor C2 may be connected between the gate electrode of the eighth transistor T8 and the second node N2. One electrode of the second capacitor C2 may be connected to the gate electrode of the eighth transistor T8, and another electrode thereof may be connected to the second node N2.

The second node N2 may be the contact point of the second electrode of the thirteenth transistor T13, the second electrode of the fourteenth transistor T14, and another electrode of the second capacitor C2.

The third pixel driver PDU3 may control the period in which the driving current is supplied to the light emitting element ED based on the voltage of the third node N3.

The third pixel driver PDU3 may include fifteenth to nineteenth transistors T15 to T19 and a third capacitor C3.

The fifteenth transistor T15 may be turned on based on the voltage of the third node N3. When the fifteenth transistor T15 is turned on, the driving current of the eighth transistor T8 may be supplied to the light emitting element ED. When the fifteenth transistor T15 is turned off, the driving current of the eighth transistor T8 may not be supplied to the light emitting element ED. Therefore, the turn-on period of the fifteenth transistor T15 may be substantially the same as the light emission period of the light emitting element ED. The gate electrode of the fifteenth transistor T15 may be connected to the third node N3, the first electrode thereof may be connected to the second electrode of the eighth transistor T8, and the second electrode thereof may be connected to the first electrode of the seventeenth transistor T17.

The sixteenth transistor T16 may be turned on by the scan control signal of the scan control line GCL to electrically connect the initialization voltage line VIL to the third node N3. Therefore, during the turn-on period of the sixteenth transistor T16, the third node N3 may be discharged to the initialization voltage of the initialization voltage line VIL.

The sixteenth transistor T16 may include a plurality of sub-transistors connected in series. In an embodiment, for example, the sixteenth transistor T16 may include a ninth sub-transistor T161 and a tenth sub-transistor T162. The ninth and tenth sub-transistors T161 and T162 may prevent the voltage of the third node N3 from leaking through the sixteenth transistor T16. The gate electrode of the ninth sub-transistor T161 may be connected to the scan control line GCL, the first electrode thereof may be connected to the third node N3, and the second electrode thereof may be connected to the first electrode of the tenth sub-transistor T162. The gate electrode of the tenth sub-transistor T162 may be connected to the scan control line GCL, the first electrode thereof may be connected to the second electrode of the ninth sub-transistor T161, and the second electrode thereof may be connected to the initialization voltage line VIL.

The seventeenth transistor T17 may be turned on by the PAM emission signal of the PAM emission line PAEL to electrically connect the second electrode of the fifteenth transistor T15 to the first electrode of the light emitting element ED. The gate electrode of the seventeenth transistor T17 may be connected to the PAM emission line PAEL, the first electrode thereof may be connected to the second electrode of the fifteenth transistor T15, and the second electrode thereof may be connected to the first electrode of the light emitting element ED.

The eighteenth transistor T18 may be turned on by the scan control signal of the scan control line GCL to electrically connect the initialization voltage line VIL to the first electrode of the light emitting element ED. Therefore, during the turn-on period of the eighteenth transistor T18, the first electrode of the light emitting element ED may be discharged to the initialization voltage of the initialization voltage line VIL. The gate electrode of the eighteenth transistor T18 may be connected to the scan control line GCL, the first electrode thereof may be connected to the first electrode of the light emitting element ED, and the second electrode thereof may be connected to the initialization voltage line VIL.

The nineteenth transistor T19 may be turned on by the test signal of a test signal line TSTL to electrically connect the first electrode of the light emitting element ED to the third power line VSL. The gate electrode of the nineteenth transistor T19 may be connected to the test signal line TSTL, the first electrode thereof may be connected to the first electrode of the light emitting element ED, and the second electrode thereof may be connected to the third power line VSL.

The third capacitor C3 may be connected between the third node N3 and the initialization voltage line VIL. One electrode of the third capacitor C3 may be connected to the third node N3, and another electrode thereof may be connected to the initialization voltage line VIL.

The third node N3 may be the contact point of the second electrode of the sixth transistor T6, the gate electrode of the fifteenth transistor T15, the first electrode of the ninth sub-transistor T161, and one electrode of the third capacitor C3.

One of the first and second electrodes of each of the first to nineteenth transistors T1 to T19 may be a source electrode, and the other of the first and second electrodes of each of the first to nineteenth transistors T1 to T19 may be a drain electrode. The semiconductor layer of each of the first to nineteenth transistors T1 to T19 may include or be formed of at least one selected from polysilicon, amorphous silicon, and an oxide semiconductor. In an embodiment where the semiconductor layer of each of the first to nineteenth transistors T1 to T19 is polysilicon, the semiconductor layer thereof may be formed by a low temperature polysilicon ("LTPS") process.

In an embodiment shown in FIG. 14, each of the first to nineteenth transistors T1 to T19 may be formed as a P-type metal oxide semiconductor field effect transistor ("MOSFET"), but the embodiment of the specification is not limited thereto. In an alternative embodiment, for example, each of the first to nineteenth transistors T1 to T19 may be formed as an N-type MOSFET.

Figure 15:
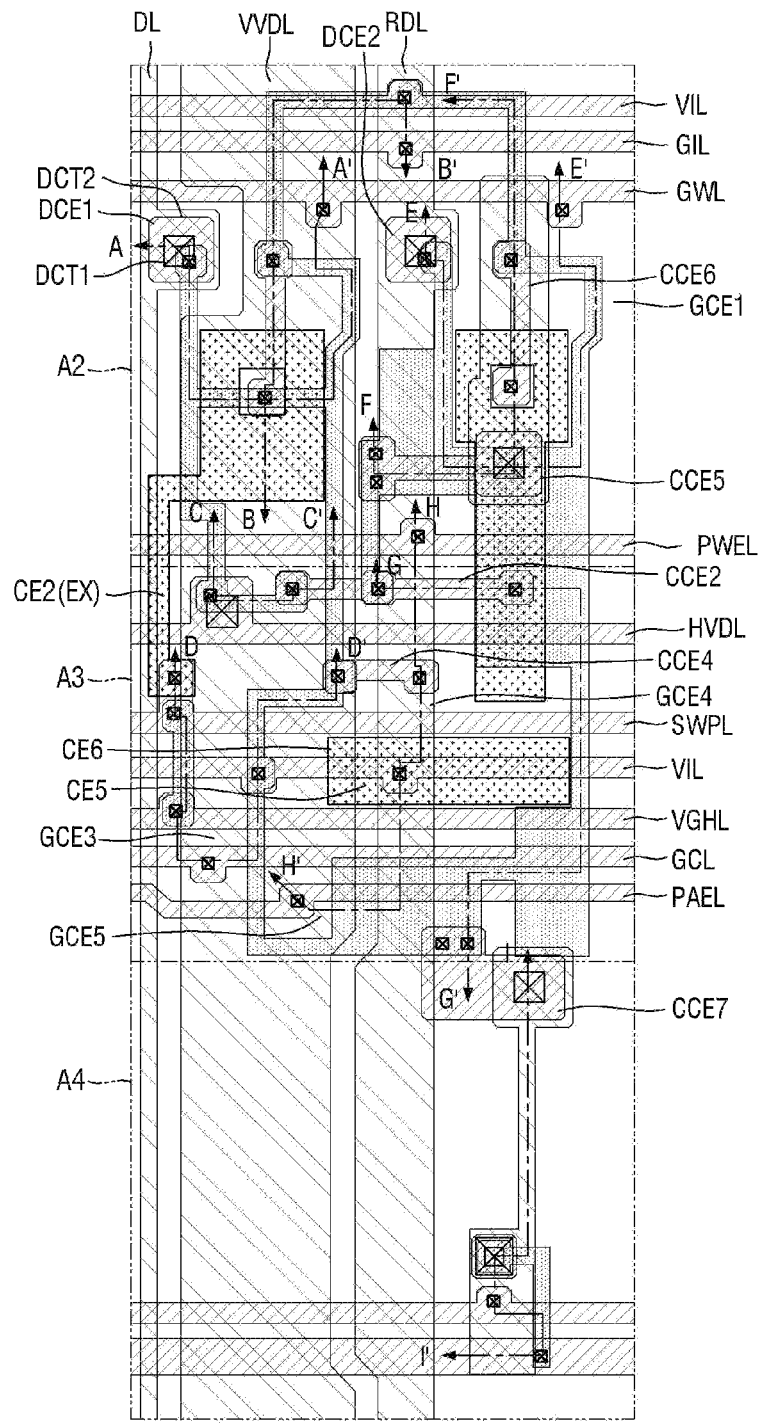
FIG. 15 is a plan view illustrating a pixel circuit of a display device according to an embodiment.
Figure 16:
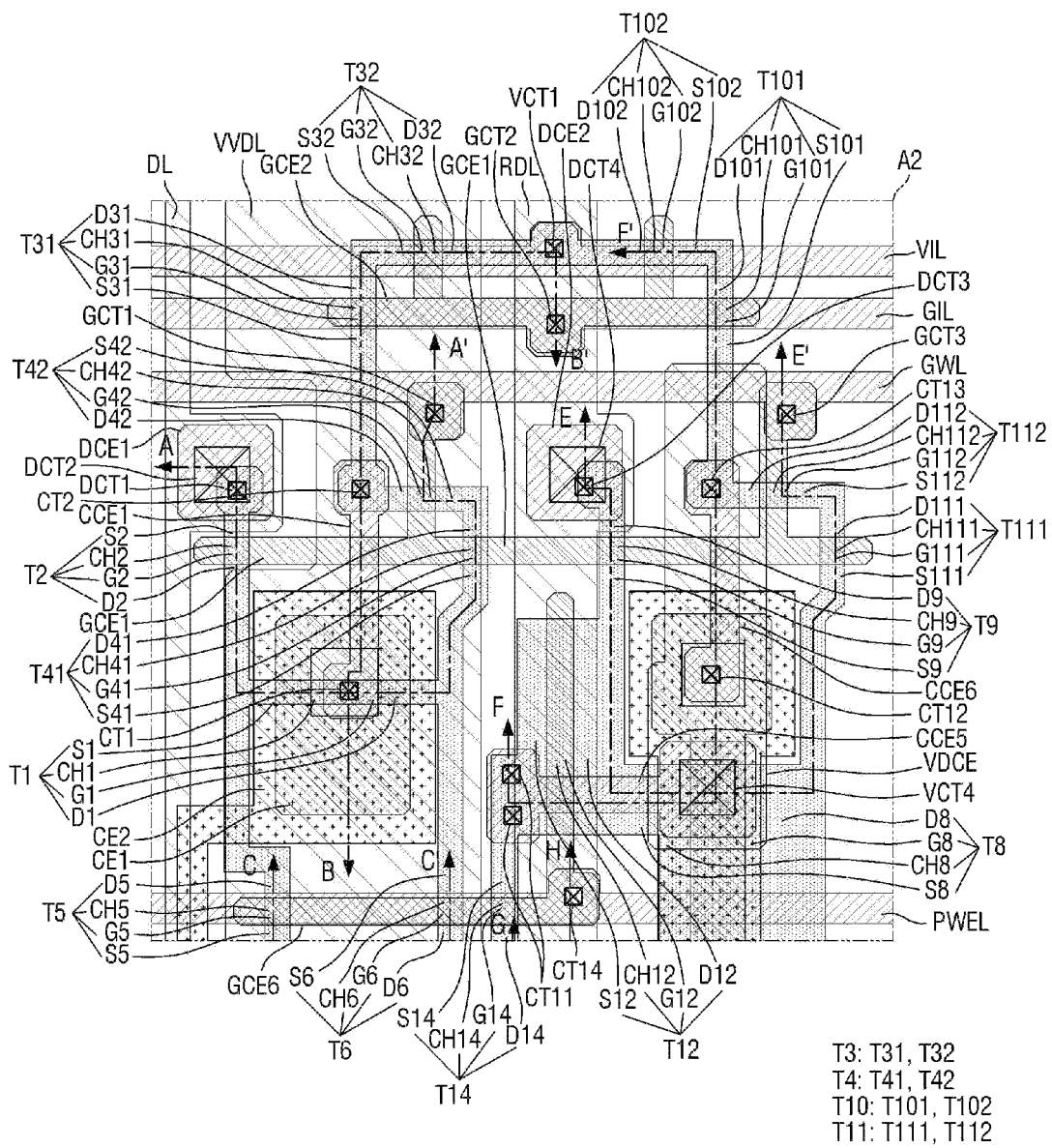
FIG. 16 is an enlarged view of area A2 of FIG. 15.
Figure 17:
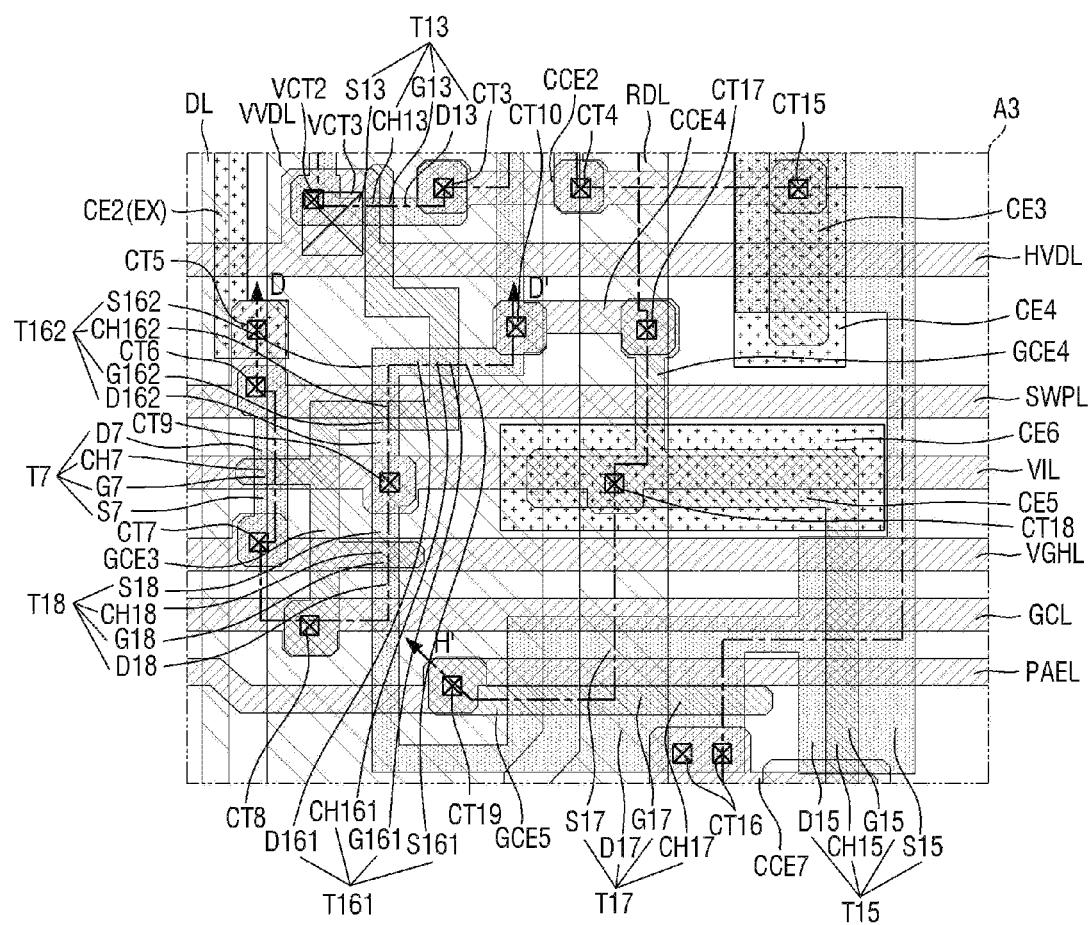
FIG. 17 is an enlarged view of area A3 of FIG. 15.
Figure 18:
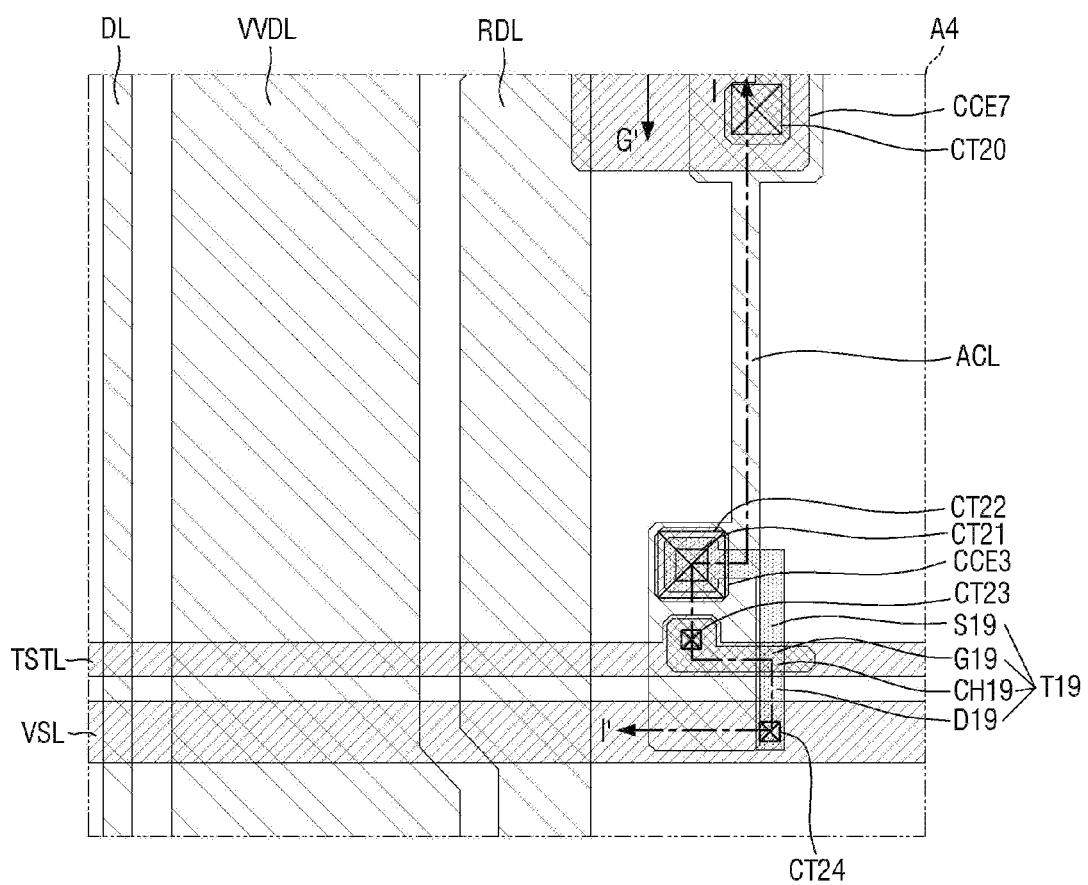
FIG. 18 is an enlarged view of area A4 of FIG. 15.

FIG. 15 is a plan view illustrating a pixel circuit of a display device according to an embodiment, and FIG. 16 is an enlarged view of area A2 of FIG. 15. FIG. 17 is an enlarged view of area A3 of FIG. 15, and FIG. 18 is an enlarged view of area A4 of FIG. 15.

Referring to FIGS. 15 to 18, in an embodiment, the initialization voltage line VIL, the scan initialization line GIL, the scan write line GWL, the PWM emission line PWEL, a first horizontal power line HVDL, the gate-off voltage line VGHL, the sweep line SWPL, the scan control line GCL, the PAM emission line PAEL, the test signal line TSTL, and the third power line VSL may extend in the first direction (X-axis direction) and may be spaced apart from each other in the second direction (Y-axis direction).

The data line DL, a first vertical power line VVDL, and the PAM data line RDL may extend in the second direction (Y-axis direction) and may be spaced apart from each other in the first direction (X-axis direction).

The pixel circuit PC may include the first to nineteenth transistors T1 to T19, first to sixth capacitor electrodes CE1 to CE6, first to fifth gate connection electrodes GCE1 to GCE5, first and second data connection electrodes DCE1 and DCE2, first to seventh connection electrodes CCE1 to CCE7, the anode connection line ACL, and the light emitting element ED.

The first transistor T1 may include a first channel CH1, a first gate electrode G1, a first source electrode S1, and a first drain electrode D1. The first channel CH1 may extend in the first direction (X-axis direction). The first channel CH1 may overlap the first gate electrode G1 in the third direction (Z-axis direction). The first gate electrode G1 may be connected to the first connection electrode CCE1 through a first contact hole CT1. The first gate electrode G1 may be integrally formed with the first capacitor electrode CE1 as a single unitary unit. The first gate electrode G1 may overlap the second capacitor electrode CE2 in the third direction (Z-axis direction). The first source electrode S1 may be disposed on one side of the first channel CH1, and the first drain electrode D1 may be disposed on another side of the first channel CH1. The first source electrode S1 may be connected to a second drain electrode D2 and a fifth drain electrode D5. The first drain electrode D1 may be connected to a third sub-source electrode S41 and a sixth source electrode S6. The first source electrode S1 and the first drain electrode D1 may not overlap the first gate electrode G1 in the third direction (Z-axis direction). The first source electrode S1 and the first drain electrode D1 may overlap the second capacitor electrode CE2 in the third direction (Z-axis direction).

The second transistor T2 may include a second channel CH2, a second gate electrode G2, a second source electrode S2, and the second drain electrode D2. The second channel CH2 may overlap the second gate electrode G2 in the third direction (Z-axis direction). The second gate electrode G2 may be integrally formed with the first gate connection electrode GCE1 as a single unitary unit. The second source electrode S2 may be disposed on one side of the second channel CH2, and the second drain electrode D2 may be disposed on another side of the second channel CH2. The second source electrode S2 may be connected to the first data connection electrode DCE1 through a first data contact hole DCT1. The second drain electrode D2 may be connected to the first source electrode S1. The second source electrode S2 and the second drain electrode D2 may not overlap the second gate electrode G2 in the third direction (Z-axis direction). The second drain electrode D2 may extend in the second direction (Y-axis direction). The second drain electrode D2 may be connected to the first source electrode S1.

The first sub-transistor T31 of the third transistor T3 may include a first sub-channel CH31, a first sub-gate electrode G31, a first sub-source electrode S31, and a first sub-drain electrode D31. The first sub-channel CH31 may overlap the first sub-gate electrode G31 in the third direction (Z-axis direction). The first sub-gate electrode G31 may be integrally formed with the second gate connection electrode GCE2 as a single unitary unit. The first sub-source electrode S31 may be disposed on one side of the first sub-channel CH31, and the first sub-drain electrode D31 may be disposed on another side of the first sub-channel CH31. The first sub-source electrode S31 may be connected to a fourth sub-drain electrode D42, and the first sub-drain electrode D31 may be connected to a second sub-source electrode S32. The first sub-source electrode S31 and the first sub-drain electrode D31 may not overlap the first sub-gate electrode G31. The first sub-source electrode S31 may overlap the scan write line GWL in the third direction (Z-axis direction). The first sub-drain electrode D31 may overlap the initialization voltage line VIL in the third direction (Z-axis direction).

The second sub-transistor T32 of the third transistor T3 may include a second sub-channel CH32, a second sub-gate electrode G32, the second sub-source electrode S32, and a second sub-drain electrode D32. The second sub-channel CH32 may overlap the second sub-gate electrode G32 in the third direction (Z-axis direction). The second sub-gate electrode G32 may be integrally formed with the second gate connection electrode GCE2 as a single unitary unit. The second sub-source electrode S32 may be disposed on one side of the second sub-channel CH32, and the second sub-drain electrode D32 may be disposed on another side of the second sub-channel CH32. The second sub-source electrode S32 may be connected to the first sub-drain electrode D31, and the second sub-drain electrode D32 may be connected to the initialization voltage line VIL through a first power contact hole VCT1. The second sub-source electrode S32 and the second sub-drain electrode D32 may not overlap the second sub-gate electrode G32. The second sub-source electrode S32 and the second sub-drain electrode D32 may overlap the initialization voltage line VIL in the third direction (Z-axis direction).

The third sub-transistor T41 of the fourth transistor T4 may include a third sub-channel CH41, a third sub-gate electrode G41, the third sub-source electrode S41, and a third sub-drain electrode D41. The third sub-channel CH41 may overlap the third sub-gate electrode G41 in the third direction (Z-axis direction). The third sub-gate electrode G41 may be integrally formed with the first gate connection electrode GCE1 as a single unitary unit. The third sub-source electrode S41 may be disposed on one side of the third sub-channel CH41, and the third sub-drain electrode D31 may be disposed on another side of the third sub-channel CH41. The third sub-source electrode S41 may be connected to the first drain electrode D1, and the third sub-drain electrode D41 may be connected to a fourth sub-source electrode S42. The third sub-source electrode S41 and the third sub-drain electrode D41 may not overlap the third sub-gate electrode G41.

The fourth sub-transistor T42 of the fourth transistor T4 may include a fourth sub-channel CH42, a fourth sub-gate electrode G42, the fourth sub-source electrode S42, and the fourth sub-drain electrode D42. The fourth sub-channel CH42 may overlap the fourth sub-gate electrode G42 in the third direction (Z-axis direction). The fourth sub-gate electrode G42 may be integrally formed with the second gate connection electrode GCE2 as a single unitary unit. The fourth sub-source electrode S42 may be disposed on one side of the fourth sub-channel CH42, and the fourth sub-drain electrode D42 may be disposed on another side of the fourth sub-channel CH42. The fourth sub-source electrode S42 may be connected to the third sub-drain electrode D32, and the fourth sub-drain electrode D42 may be connected to the first sub-source electrode S31. The fourth sub-source electrode S42 and the fourth sub-drain electrode D42 may not overlap the fourth sub-gate electrode G42.

The fifth transistor T5 may include a fifth channel CH5, a fifth gate electrode G5, a fifth source electrode S5, and a fifth drain electrode D5. The fifth channel CH5 may overlap the fifth gate electrode G5 in the third direction (Z-axis direction). The fifth gate electrode G5 may be integrally formed with a sixth gate connection electrode GCE6 as a single unitary unit. The fifth source electrode S5 may be disposed on one side of the fifth channel CH5, and the fifth drain electrode D5 may be disposed on another side of the fifth channel CH5. The fifth source electrode S5 may be connected to the first horizontal power line HVDL through a second power contact hole VCT2. The fifth drain electrode D5 may be connected to the first source electrode S1. The fifth source electrode S5 and the fifth drain electrode D5 may not overlap the fifth gate electrode G5 in the third direction (Z-axis direction). The fifth drain electrode D5 may overlap an extension portion EX of the second capacitor electrode CE2 in the third direction (Z-axis direction).

The sixth transistor T6 may include a sixth channel CH6, a sixth gate electrode G6, a sixth source electrode S6, and a sixth drain electrode D6. The sixth channel CH6 may overlap the sixth gate electrode G6 in the third direction (Z-axis direction). The sixth gate electrode G6 may be integrally formed with the sixth gate connection electrode GCE6 as a single unitary unit. The sixth source electrode S6 may be disposed on one side of the sixth channel CH6, and the sixth drain electrode D6 may be disposed on another side of the sixth channel CH6. The sixth source electrode S6 may be connected to the first drain electrode D1. The sixth drain electrode D6 may be connected to the fourth connection electrode CCE4 through a tenth contact hole CT10. The sixth source electrode S6 and the sixth drain electrode D6 may not overlap the sixth gate electrode G6 in the third direction (Z-axis direction). The sixth drain electrode D6 may overlap the second connection electrode CCE2 and the first horizontal power line HVDL in the third direction (Z-axis direction).

The seventh transistor T7 may include a seventh channel CH7, a seventh gate electrode G7, a seventh source electrode S7, and a seventh drain electrode D7. The seventh channel CH7 may overlap the seventh gate electrode G7 in the third direction (Z-axis direction). The seventh gate electrode G7 may be integrally formed with the third gate connection electrode GCE3 as a single unitary unit. The seventh gate electrode G7 may overlap the initialization voltage line VIL in the third direction (Z-axis direction). The seventh source electrode S7 may be disposed on one side of the seventh channel CH7, and the seventh drain electrode D7 may be disposed on another side of the seventh channel CH7. The seventh source electrode S7 may be connected to the gate-off voltage line VGHL through a seventh contact hole CT7. The seventh drain electrode D7 may be connected to the sweep line SWPL through a sixth contact hole CT6. The seventh source electrode S7 and the seventh drain electrode D7 may not overlap the seventh gate electrode G7 in the third direction (Z-axis direction).

The eighth transistor T8 may include an eighth channel CH8, an eighth gate electrode G8, an eighth source electrode S8, and an eighth drain electrode D8. The eighth channel CH8 may overlap the eighth gate electrode G8 in the third direction (Z-axis direction). The eighth gate electrode G8 may extend in the second direction (Y-axis direction). The eighth gate electrode G8 may be integrally formed with the third capacitor electrode CE3 as a single unitary unit. The eighth source electrode S8 may be disposed on one side of the eighth channel CH8, and the eighth drain electrode D8 may be disposed on another side of the eighth channel CH8. The eighth source electrode S8 may be connected to a ninth drain electrode D9 and a twelfth drain electrode D12. The eighth drain electrode D8 may be connected to a seventh sub-source electrode S111. The eighth source electrode S8 and the eighth drain electrode D8 may not overlap the eighth gate electrode G8 in the third direction (Z-axis direction).

The ninth transistor T9 may include a ninth channel CH9, a ninth gate electrode G9, a ninth source electrode S9, and the ninth drain electrode D9. The ninth channel CH9 may overlap the ninth gate electrode G9 in the third direction (Z-axis direction). The ninth gate electrode G9 may extend in the second direction (Y-axis direction). The ninth gate electrode G9 may be integrally formed with the first gate connection electrode GCE1 as a single unitary unit. The ninth source electrode S9 may be disposed on one side of the ninth channel CH9, and the ninth drain electrode D9 may be disposed on another side of the ninth channel CH9. The ninth source electrode S9 may be connected to the second data connection electrode DCE2 through a third data contact hole DCT3. The ninth drain electrode D9 may be connected to the eighth source electrode D8. The ninth source electrode S9 and the ninth drain electrode D9 may not overlap the ninth gate electrode G9 in the third direction (Z-axis direction).

The fifth sub-transistor T101 of the tenth transistor T10 may include a fifth sub-channel CH101, a fifth sub-gate electrode G101, a fifth sub-source electrode S101, and a fifth sub-drain electrode D101. The fifth sub-channel CH101 may overlap the fifth sub-gate electrode G101 in the third direction (Z-axis direction). The fifth sub-gate electrode G101 may be integrally formed with the second gate connection electrode GCE2 as a single unitary unit. The fifth sub-source electrode S101 may be disposed on one side of the fifth sub-channel CH101, and the fifth sub-drain electrode D101 may be disposed on another side of the fifth sub-channel CH101. The fifth sub-source electrode S101 may be connected to an eighth sub-drain electrode D112, and the fifth sub-drain electrode D101 may be connected to a sixth sub-source electrode S102. The fifth sub-source electrode S101 and the fifth sub-drain electrode D101 may not overlap the fifth sub-gate electrode G101. The fifth sub-source electrode S101 may overlap the scan write line GWL in the third direction (Z-axis direction). The fifth sub-drain electrode D101 may overlap the initialization voltage line VIL in the third direction (Z-axis direction).

The sixth sub-transistor T102 of the tenth transistor T10 may include a sixth sub-channel CH102, a sixth sub-gate electrode G102, the sixth sub-source electrode S102, and a sixth sub-drain electrode D102. The sixth sub-channel CH102 may overlap the sixth sub-gate electrode G102 in the third direction (Z-axis direction). The sixth sub-gate electrode G102 may be integrally formed with the second gate connection electrode GCE2 as a single unitary unit. The sixth sub-source electrode S102 may be disposed on one side of the sixth sub-channel CH102, and the sixth sub-drain electrode D102 may be disposed on another side of the sixth sub-channel CH102. The sixth sub-source electrode S102 may be connected to the fifth sub-drain electrode D101, and the sixth sub-drain electrode D102 may be connected to the initialization voltage line VIL through the first power contact hole VCT1. The sixth sub-source electrode S102 and the sixth sub-drain electrode D102 may not overlap the sixth sub-gate electrode G102. The sixth sub-source electrode S102 and the sixth sub-drain electrode D102 may overlap the initialization voltage line VIL in the third direction (Z-axis direction).

The seventh sub-transistor T111 of the eleventh transistor T11 may include a seventh sub-channel CH111, a seventh sub-gate electrode G111, a seventh sub-source electrode S111, and a seventh sub-drain electrode D111. The seventh sub-channel CH111 may overlap the seventh sub-gate electrode G111 in the third direction (Z-axis direction). The seventh sub-gate electrode G111 may be integrally formed with the first gate connection electrode GCE1 as a single unitary unit. The seventh sub-source electrode S111 may be disposed on one side of the seventh sub-channel CH111, and the seventh sub-drain electrode D111 may be disposed on another side of the seventh sub-channel CH111. The seventh sub-source electrode S111 may be connected to the eighth drain electrode D8, and the seventh sub-drain electrode D111 may be connected to an eighth sub-source electrode S112. The seventh sub-source electrode S111 and the seventh sub-drain electrode D111 may not overlap the seventh sub-gate electrode G111.

The eighth sub-transistor T112 of the eleventh transistor T11 may include an eighth sub-channel CH112, an eighth sub-gate electrode G112, the eighth sub-source electrode S112, and the eighth sub-drain electrode D112. The eighth sub-channel CH112 may overlap the eighth sub-gate electrode G112 in the third direction (Z-axis direction). The eighth sub-gate electrode G112 may be integrally formed with the first gate connection electrode GCE1 as a single unitary unit. The eighth sub-source electrode S112 may be disposed on one side of the eighth sub-channel CH112, and the eighth sub-drain electrode D112 may be disposed on another side of the eighth sub-channel CH112. The eighth sub-source electrode S112 may be connected to the seventh sub-drain electrode D111, and the eighth sub-drain electrode D112 may be connected to the fifth sub-source electrode S101. The eighth sub-source electrode S112 and the eighth sub-drain electrode D112 may not overlap the eighth sub-gate electrode G112.

The twelfth transistor T12 may include a twelfth channel CH12, a twelfth gate electrode G12, a twelfth source electrode S12, and the twelfth drain electrode D12. The twelfth channel CH12 may overlap the twelfth gate electrode G12 in the third direction (Z-axis direction). The twelfth gate electrode G12 may be integrally formed with the sixth gate connection electrode GCE6 as a single unitary unit. The twelfth source electrode S12 may be disposed on one side of the twelfth channel CH12, and the twelfth drain electrode D12 may be disposed on another side of the twelfth channel CH12. The twelfth source electrode S12 may be connected to the fifth connection electrode CCE5 through eleventh contact holes CT11. The twelfth source electrode S12 and the twelfth drain electrode D12 may not overlap the twelfth gate electrode G12 in the third direction (Z-axis direction).

The thirteenth transistor T13 may include a thirteenth channel CH13, a thirteenth gate electrode G13, a thirteenth source electrode S13, and a thirteenth drain electrode D13. The thirteenth channel CH13 may overlap the thirteenth gate electrode G13 in the third direction (Z-axis direction). The thirteenth gate electrode G13 may be integrally formed with the third gate connection electrode GCE3 as a single unitary unit. The thirteenth source electrode S13 may be disposed on one side of the thirteenth channel CH13, and the thirteenth drain electrode D13 may be disposed on another side of the thirteenth channel CH13. The thirteenth source electrode S13 may be connected to the first horizontal power line HVDL through the second power contact hole VCT2. The thirteenth drain electrode D13 may be connected to the second connection electrode CCE2 through a third contact hole CT3. The thirteenth source electrode S13 and the thirteenth drain electrode D13 may not overlap the thirteenth gate electrode G13 in the third direction (Z-axis direction).

The fourteenth transistor T14 may include a fourteenth channel CH14, a fourteenth gate electrode G14, a fourteenth source electrode S14, and a fourteenth drain electrode D14. The fourteenth channel CH14 may overlap the fourteenth gate electrode G14 in the third direction (Z-axis direction). The fourteenth gate electrode G14 may be integrally formed with the sixth gate connection electrode GCE6 as a single unitary unit. The fourteenth source electrode S14 may be disposed on one side of the fourteenth channel CH14, and the fourteenth drain electrode D14 may be disposed on another side of the fourteenth channel CH14. The fourteenth source electrode S14 may be connected to the fifth connection electrode CCE5 through the eleventh contact holes CT11. The fourteenth drain electrode D14 may be connected to the second connection electrode CCE2 through a fourth contact hole CT4. The fourteenth source electrode S14 and the fourteenth drain electrode D14 may not overlap the fourteenth gate electrode G14 in the third direction (Z-axis direction).

The fifteenth transistor T15 may include a fifteenth channel CH15, a fifteenth gate electrode G15, a fifteenth source electrode S15, and a fifteenth drain electrode D15. The fifteenth channel CH15 may overlap the fifteenth gate electrode G15 in the third direction (Z-axis direction). The fifteenth gate electrode G15 may be integrally formed with the fifth capacitor electrode CE5 as a single unitary unit. The fifteenth source electrode S15 may be disposed on one side of the fifteenth channel CH15, and the fifteenth drain electrode D15 may be disposed on another side of the fifteenth channel CH15. The fifteenth source electrode S15 may be connected to the ninth drain electrode D5. The fifteenth drain electrode D15 may be connected to a seventeenth source electrode S17. The fifteenth source electrode S15 and the fifteenth drain electrode D15 may not overlap the fifteenth gate electrode G15 in the third direction (Z-axis direction).

The ninth sub-transistor T161 of the sixteenth transistor T16 may include a ninth sub-channel CH161, a ninth sub-gate electrode G161, a ninth sub-source electrode S161, and a ninth sub-drain electrode D161. The ninth sub-channel CH161 may overlap the ninth sub-gate electrode G161 in the third direction (Z-axis direction). The ninth sub-gate electrode G161 may be integrally formed with the third gate connection electrode GCE3 as a single unitary unit. The ninth sub-source electrode S161 may be disposed on one side of the ninth sub-channel CH161, and the ninth sub-drain electrode D161 may be disposed on another side of the ninth sub-channel CH161. The ninth sub-source electrode S161 may be connected to the fourth connection electrode CCE4 through the tenth contact hole CT10, and the ninth sub-drain electrode D161 may be connected to a tenth sub-source electrode S162. The ninth sub-source electrode S161 and the ninth sub-drain electrode D161 may not overlap the ninth sub-gate electrode G161.

The tenth sub-transistor T162 of the sixteenth transistor T16 may include a tenth sub-channel CH162, a tenth sub-gate electrode G162, the tenth sub-source electrode S162, and a tenth sub-drain electrode D162. The tenth sub-channel CH162 may overlap the tenth sub-gate electrode G162 in the third direction (Z-axis direction). The tenth sub-gate electrode G162 may be integrally formed with the third gate connection electrode GCE3 as a single unitary unit. The tenth sub-source electrode S162 may be disposed on one side of the tenth sub-channel CH162, and the tenth sub-drain electrode D162 may be disposed on another side of the tenth sub-channel CH162. The tenth sub-source electrode S162 may be connected to the ninth sub-drain electrode D161, and the tenth sub-drain electrode D162 may be connected to the initialization voltage line VIL through a ninth contact hole CT9. The tenth sub-source electrode S162 and the tenth sub-drain electrode D162 may not overlap the tenth sub-gate electrode G162.

The seventeenth transistor T17 may include a seventeenth channel CH17, a seventeenth gate electrode G17, the seventeenth source electrode S17, and a seventeenth drain electrode D17. The seventeenth channel CH17 may overlap the seventeenth gate electrode G17 in the third direction (Z-axis direction). The seventeenth gate electrode G17 may be integrally formed with the fifth gate connection electrode GCE5 as a single unitary unit. The seventeenth source electrode S17 may be disposed on one side of the seventeenth channel CH17, and the seventeenth drain electrode D17 may be disposed on another side of the seventeenth channel CH17. The seventeenth source electrode S17 may be connected to the fifteenth drain electrode D15. The seventeenth drain electrode D17 may be connected to the seventh connection electrode CCE7 through sixteenth contact holes CT16. The seventeenth source electrode S17 and the seventeenth drain electrode D17 may not overlap the seventeenth gate electrode G17 in the third direction (Z-axis direction).

The eighteenth transistor T18 may include an eighteenth channel CH18, an eighteenth gate electrode G18, an eighteenth source electrode S18, and an eighteenth drain electrode D18. The eighteenth channel CH18 may overlap the eighteenth gate electrode G18 in the third direction (Z-axis direction). The eighteenth gate electrode G18 may be integrally formed with the third gate connection electrode GCE3 as a single unitary unit. The eighteenth source electrode S18 may be disposed on one side of the eighteenth channel CH18, and the eighteenth drain electrode D18 may be disposed on another side of the eighteenth channel CH18. The eighteenth source electrode S18 may be connected to the initialization voltage line VIL through the ninth contact hole CT9. The eighteenth drain electrode D18 may be connected to the seventh connection electrode CCE7 through the sixteenth contact holes CT16. The eighteenth source electrode S18 and the eighteenth drain electrode D18 may not overlap the eighteenth gate electrode G18 in the third direction (Z-axis direction).

The nineteenth transistor T19 may include a nineteenth channel CH19, a nineteenth gate electrode G19, a nineteenth source electrode S19, and a nineteenth drain electrode D19. The nineteenth channel CH19 may overlap the nineteenth gate electrode G19 in the third direction (Z-axis direction). The nineteenth gate electrode G19 may be connected to the test signal line TSTL through a twenty-third contact hole CT23. The nineteenth source electrode S19 may be disposed on one side of the nineteenth channel CH19, and the nineteenth drain electrode D19 may be disposed on another side of the nineteenth channel CH19. The nineteenth source electrode S19 may be connected to the third connection electrode CCE3 through a twenty-first contact hole CT21. The nineteenth drain electrode D19 may be connected to the third power line VSL through a twenty-fourth contact hole CT24. The nineteenth source electrode S19 and the nineteenth drain electrode D19 may not overlap the nineteenth gate electrode G19 in the third direction (Z-axis direction).

The first capacitor electrode CE1 may be integrally formed with the first gate electrode G1 as a single unitary unit. The second capacitor electrode CE2 may overlap the first capacitor electrode CE1 in the third direction (Z-axis direction). The first capacitor electrode CE1 may be one electrode of the first capacitor C1, and the second capacitor electrode CE2 may be another electrode of the first capacitor C1.

The second capacitor electrode CE2 may include the hole exposing the first gate electrode G1, and the first connection electrode CCE1 may be connected to the first gate electrode G1 through the first contact hole CT1 in the hole.

The second capacitor electrode CE2 may include the extension portion EX extending in the second direction (Y-axis direction). The extension portion EX of the second capacitor electrode CE2 may intersect the PWM emission line PWEL and the first horizontal voltage line HVDL. The extension portion EX of the second capacitor CE2 may be connected to the sweep line SWPL through a fifth contact hole CT5.

The third capacitor electrode CE3 may be integrally formed with the eighth gate electrode G8 as a single unitary unit. The fourth capacitor electrode CE4 may overlap the third capacitor electrode CE3 in the third direction (Z-axis direction). The third capacitor electrode CE3 may be one electrode of the second capacitor C2, and the fourth capacitor electrode CE4 may be another electrode of the second capacitor C2.

The fourth capacitor electrode CE4 may include the hole exposing the eighth gate electrode G8, and the sixth connection electrode CCE6 may be connected to the eighth gate electrode G8 through a twelfth contact hole CT12 in the hole.

The fifth capacitor electrode CE5 may be integrally formed with the fourth gate connection electrode GCE4 and the fifteenth gate electrode G15 as a single unitary unit. The sixth capacitor electrode CE6 may overlap the fifth capacitor electrode CE5 in the third direction (Z-axis direction). The fifth capacitor electrode CE5 may be one electrode of the third capacitor C3, and the sixth capacitor electrode CE6 may be another electrode of the third capacitor C3. The sixth capacitor electrode CE6 may be connected to the initialization voltage line VIL through an eighteenth contact hole CT18.

The first gate connection electrode GCE1 may be connected to the scan write line GWL through a first gate contact hole GCT1 and a third gate contact hole GCT3. The second gate connection electrode GCE2 may be connected to the scan initialization line GIL through a second gate contact hole GCT2. The sixth gate connection electrode GCE6 may be connected to the PWM emission line PWEL through a fourteenth contact hole CT14. The fourth gate connection electrode GCE4 may be connected to the scan control line GCL through an eighth contact hole CT8. The fourth gate connection electrode GCE4 may be connected to the fourth connection electrode CCE4 through a seventeenth contact hole CT17. The fifth gate connection electrode GCE5 may be connected to the PAM emission line PAEL through a nineteenth contact hole CT19.

The first data connection electrode DCE1 may be connected to the second source electrode S2 through the first data contact hole DCT1 and may be connected to the data line DL through a second data contact hole DCT2. The second data connection electrode DCE2 may be connected to the ninth source electrode S9 through the third data contact hole DCT3 and may be connected to the PAM data line RDL through a fourth data contact hole DCT4.

The first connection electrode CCE1 may extend in the second direction (Y-axis direction). The first connection electrode CCE1 may be connected to the first gate electrode G1 through the first contact hole CT1, and may be connected to the first sub-source electrode S31 and the fourth sub-drain electrode D42 through a second contact hole CT2.

The second connection electrode CCE2 may extend in the first direction (X-axis direction). The second connection electrode CCE2 may be connected to the twelfth drain electrode D12 through the third contact hole CT3, may be connected to the fourteenth drain electrode D14 through the fourth contact hole CT4, and may be connected to the fourth capacitor electrode CE4 through a fifteenth contact hole CT15.

The third connection electrode CCE3 may be connected to the nineteenth source electrode S19 through the twenty-first contact hole CT21, and may be connected to the anode connection line ACL through a twenty-second contact hole CT22.

The fourth connection electrode CCE4 may extend in the first direction (X-axis direction). The fourth connection electrode CCE4 may be connected to the sixth drain electrode D6 and the ninth sub-source electrode S161 through the tenth contact hole CT10, and may be connected to the fourth gate electrode GCE4 through the seventeenth contact hole CT17.

The fifth connection electrode CCE5 may extend in the first direction (X-axis direction). The fifth connection electrode CCE5 may be connected to the twelfth source electrode S12 and the fourteenth source electrode S14 through the eleventh contact holes CT11, and may be connected to the fourth capacitor electrode CE4 through a fourth power contact hole VCT4.

The sixth connection electrode CCE6 may extend in the second direction (Y-axis direction). The sixth connection electrode CCE6 may be connected to the third capacitor electrode CE3 through the twelfth contact hole CT12, and may be connected to the fifth sub-source electrode S101 and the eighth sub-drain electrode D112 through a thirteenth contact hole CT13.

The seventh connection electrode CCE7 may be connected to the seventeenth drain electrode D17 and the eighteenth drain electrode D18 through the sixteenth contact holes CT16. The seventh connection electrode CCE7 may be connected to the anode connection line ACL through a twentieth contact hole CT20.

The anode connection line ACL may extend in the second direction (Y-axis direction). The anode connection line ACL may be connected to the seventh connection electrode CCE7 through the twentieth contact hole CT20, and may be connected to the third connection electrode CCE3 through the twenty-second contact hole CT22.

A second power connection electrode VDCE may extend in the second direction (Y-axis direction). The second power connection electrode VDCE may be connected to the fifth connection electrode CCE5 through the fourth power contact hole VCT4.

Figure 19:
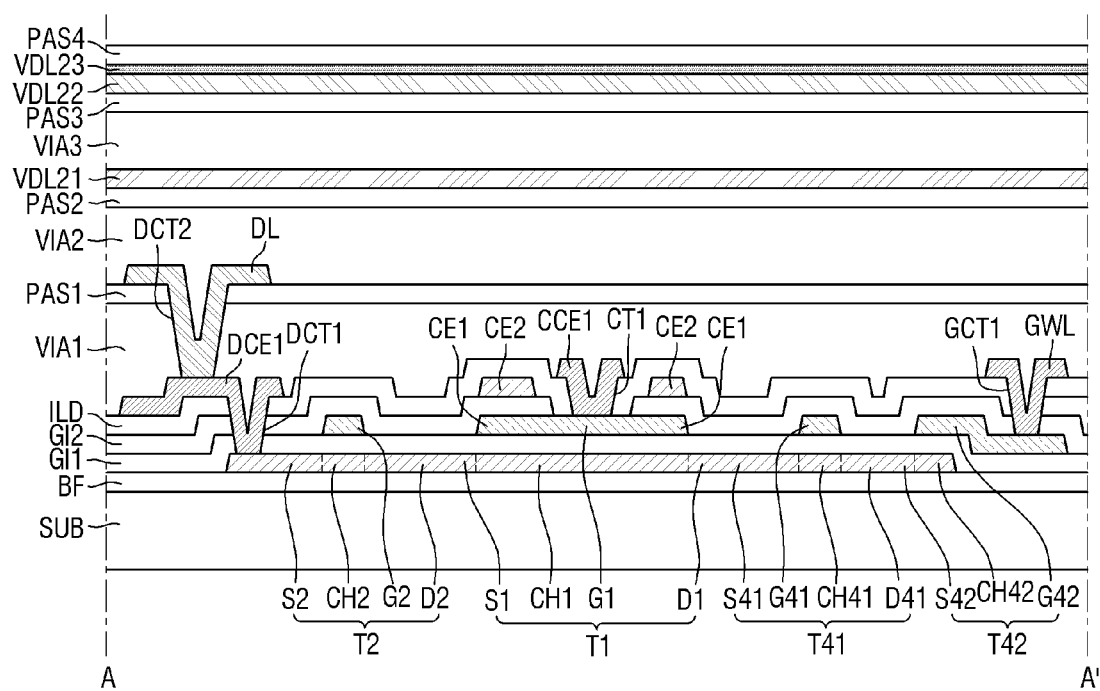
FIG. 19 is a cross-sectional view taken along line A-A' of FIG. 15.
Figure 20:
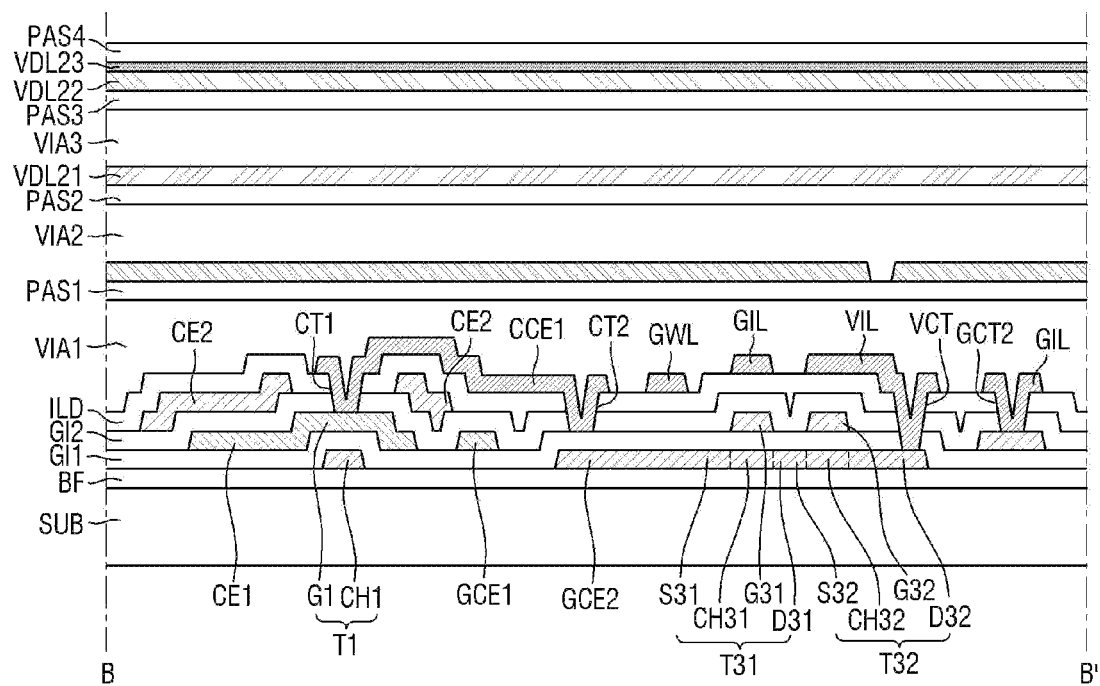
FIG. 20 is a cross-sectional view taken along line B-B' of FIG. 15.
Figure 21:
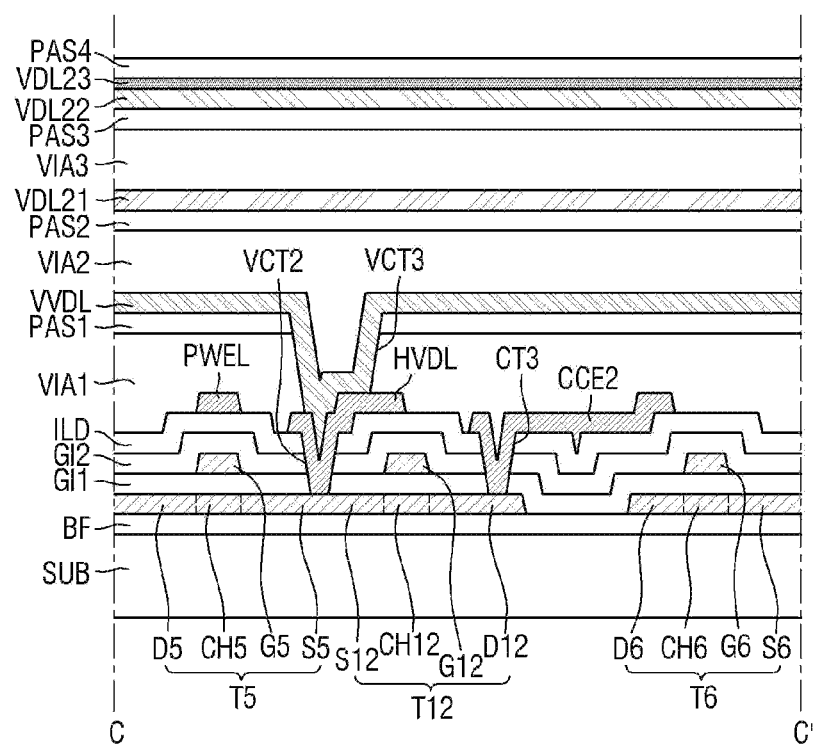
FIG. 21 is a cross-sectional view taken along line C-C' of FIG. 15.
Figure 22:
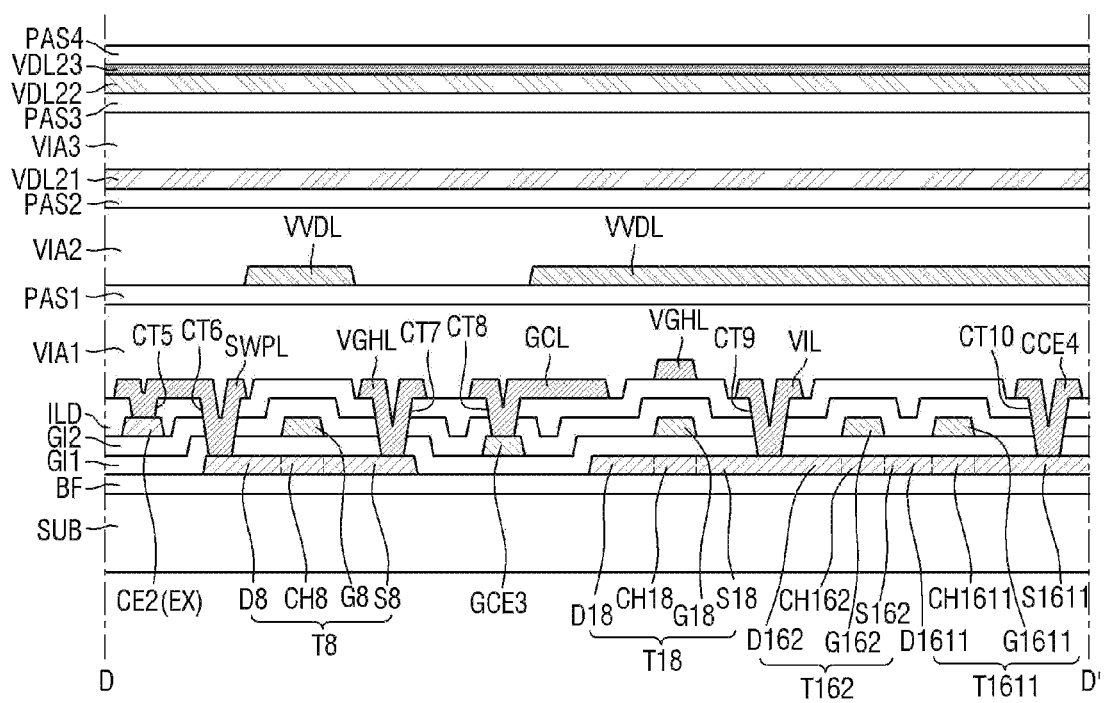
FIG. 22 is a cross-sectional view taken along line D-D' of FIG. 15.
Figure 23:
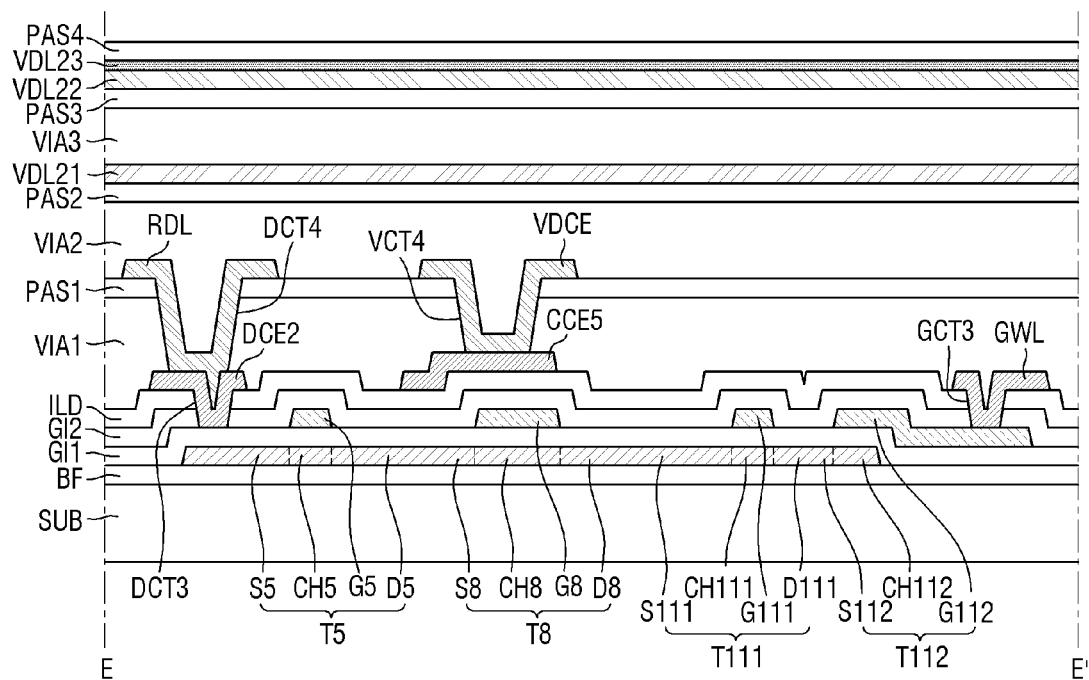
FIG. 23 is a cross-sectional view taken along line E-E' of FIG. 15.
Figure 24:
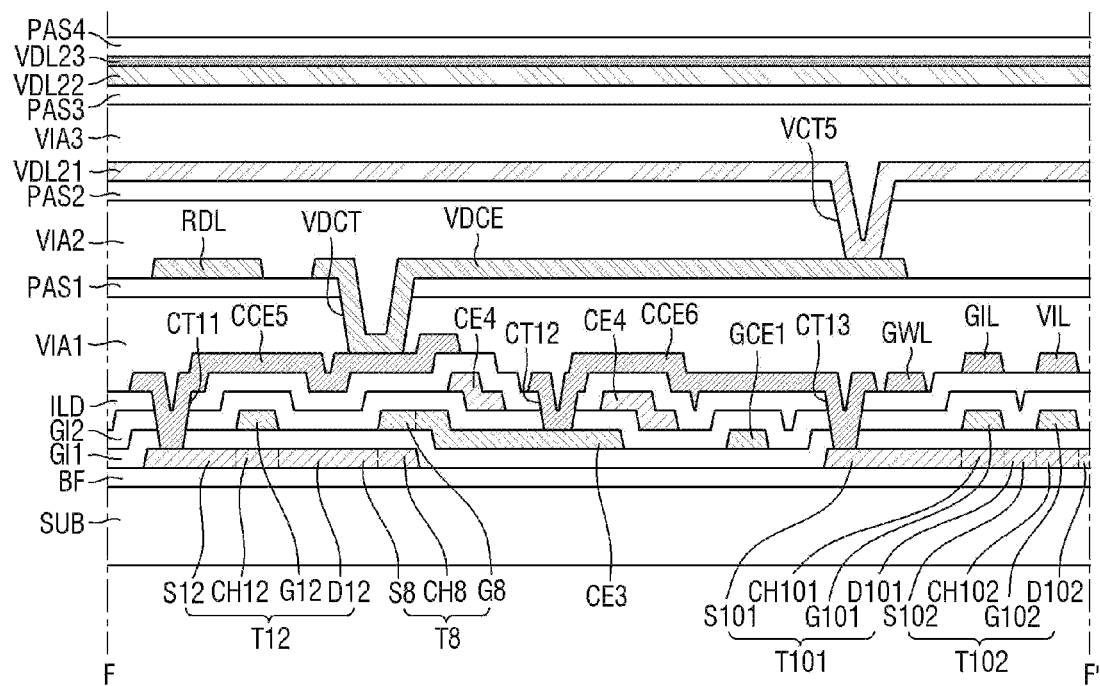
FIG. 24 is a cross-sectional view taken along line F-F' of FIG. 15.
Figure 25:
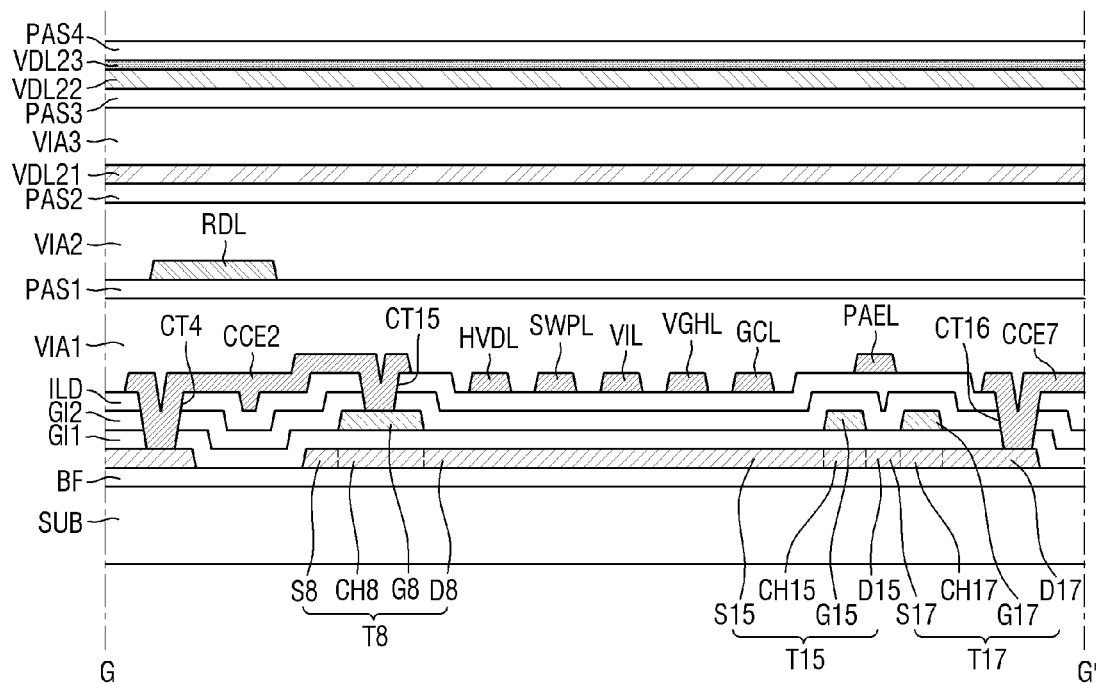
FIG. 25 is a cross-sectional view taken along line G-G' of FIG. 15.
Figure 26:
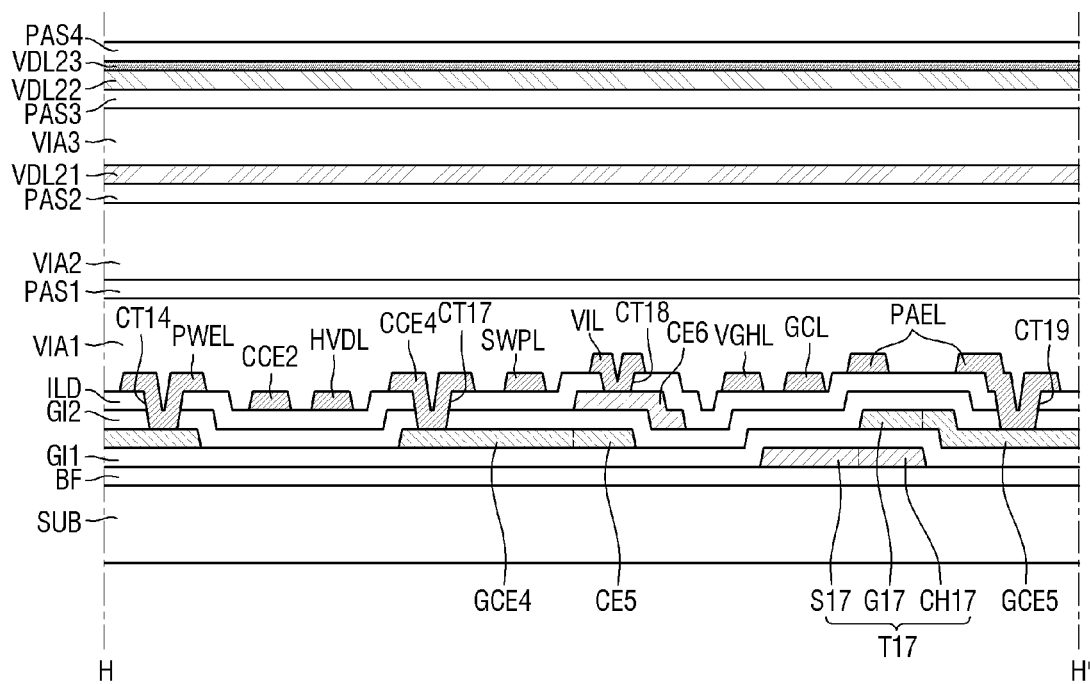
FIG. 26 is a cross-sectional view taken along line H-H' of FIG. 15.
Figure 27:
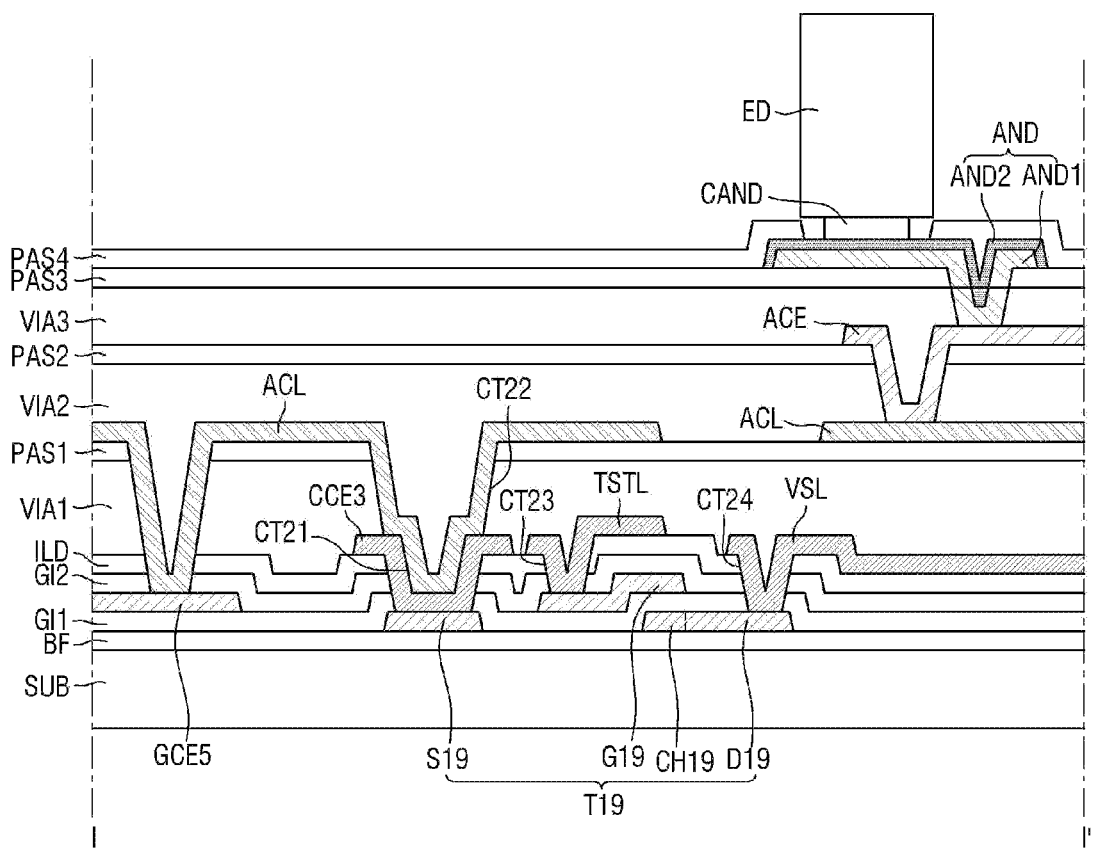
FIG. 27 is a cross-sectional view taken along line I-I' of FIG. 15.

FIG. 19 is a cross-sectional view taken along line A-A' of FIG. 15, and FIG. 20 is a cross-sectional view taken along line B-B' of FIG. 15. FIG. 21 is a cross-sectional view taken along line C-C' of FIG. 15, and FIG. 22 is a cross-sectional view taken along line D-D' of FIG. 15. FIG. 23 is a cross-sectional view taken along line E-E' of FIG. 15, and FIG. 24 is a cross-sectional view taken along line F-F' of FIG. 15. FIG. 25 is a cross-sectional view taken along line G-G' of FIG. 15, FIG. 26 is a cross-sectional view taken along line H-H' of FIG. 15, and FIG. 27 is a cross-sectional view taken along line I-I' of FIG. 15.

Referring to FIGS. 19 to 27, an embodiment of the display device 10 may include the substrate SUB, the buffer layer BF, the first gate insulating layer GI1, the second gate insulating layer GI2, the interlayer insulating layer ILD, the first via layer VIA1, the first passivation layer PAS1, the second via layer VIA2, the second passivation layer PAS2, the third via layer VIA3, the third passivation layer PAS3, and the fourth passivation layer PAS4.

The substrate SUB may be a support layer of the display device 10. The substrate SUB may be a base substrate or a base member. The substrate SUB may be a flexible substrate which can be bent, folded or rolled. In an embodiment, for example, the substrate SUB may include an insulating material such as a polymer resin such as polyimide ("PI"), but the disclosure is not limited thereto. In an alternative embodiment, for example, the substrate SUB may be a rigid substrate including a glass material.

The buffer layer BF may be disposed on the substrate SUB. The buffer layer BF may include an inorganic material capable of preventing permeation of air or moisture. The buffer layer BF may include or be defined by a single inorganic layer or a plurality inorganic layers that are alternately stacked one on another. In an embodiment, for example, the buffer layer BF may be a multilayer in which at least one inorganic layer selected from a silicon nitride layer, a silicon oxynitride layer, a silicon oxide layer, a titanium oxide layer and an aluminum oxide layer are alternately stacked one on another.

The active layer ACTL (shown in FIG. 13) may be disposed on the buffer layer BF. The active layer ACTL may include or define the first to nineteenth channels CH1 to CH19, the first to nineteenth source electrodes S1 to S19, and the first to nineteenth drain electrodes D1 to D19 of the first to nineteenth transistors T1 to T19. In an embodiment, for example, the active layer ACTL may include polycrystalline silicon, monocrystalline silicon, low-temperature polycrystalline silicon, amorphous silicon, or an oxide semiconductor.

In an alternative embodiment, for example, the channels, the source electrodes, and the drain electrodes of some of the first to nineteenth transistors T1 to T19 may be disposed on the first active layer including polycrystalline silicon, monocrystalline silicon, low-temperature polycrystalline silicon, or amorphous silicon. The channels, the source electrodes, and the drain electrodes of some others of the first to nineteenth transistors T1 to T19 may be disposed on the second active layer including an oxide semiconductor.

The first to nineteenth channels CH1 to CH19 may overlap the first to nineteenth gate electrodes G1 to G19 in the third direction (Z-axis direction), respectively. The first to nineteenth source electrodes S1 to S19 and the first to nineteenth drain electrodes D1 to D19 may not overlap the first to nineteenth gate electrodes G1 to G19 in the third direction (Z-axis direction). The first to nineteenth source electrodes S1 to S19 and the first to nineteenth drain electrodes D1 to D19 may be conductive regions obtained by doping a silicon semiconductor or an oxide semiconductor with ions or impurities.

The first gate insulating layer GI1 may be disposed on the active layer ACTL. The first gate insulating layer GI1 may insulate the first to nineteenth channels CH1 to CH19 from the first to nineteenth gate electrodes G1 to G19, respectively. The first gate insulating layer GI1 may include an inorganic layer. In an embodiment, for example, the first gate insulating layer GI1 may include at least one selected from a silicon nitride layer, a silicon oxynitride layer, a silicon oxide layer, a titanium oxide layer, and an aluminum oxide layer. The first gate layer GTL1 may be disposed on the first gate insulating layer GI1. The first gate layer GTL1 may include or define the first to nineteenth gate electrodes G1 to G19, the first capacitor electrode CE1, the third capacitor electrode CE3, the fifth capacitor electrode CE5, and the first to fifth gate connection electrodes GCE1 to GCE5.

The second gate insulating layer GI2 may be disposed on the first gate layer GTL1. The second gate insulating layer GI2 may insulate the first gate layer GTL1 and the second gate layer GTL2 from each other. The second gate insulating layer GI2 may include an inorganic layer. In an embodiment, for example, the second gate insulating layer GI2 may include at least one selected from a silicon nitride layer, a silicon oxynitride layer, a silicon oxide layer, a titanium oxide layer, and an aluminum oxide layer.

The second gate layer GTL2 (shown in FIG. 13) may be disposed on the second gate insulating layer GI2. The second gate layer GTL2 may include or define the second capacitor electrode CE2, the fourth capacitor electrode CE4, and the sixth capacitor electrode CE6.

The interlayer insulating layer ILD may be disposed on the second gate layer GTL2. The interlayer insulating layer ILD may insulate the first source metal layer SDL1 and the second gate layer GTL2 from each other. The interlayer insulating layer ILD may include an inorganic layer. In an embodiment, for example, the interlayer insulating layer ILD may include at least one selected from a silicon nitride layer, a silicon oxynitride layer, a silicon oxide layer, a titanium oxide layer, and an aluminum oxide layer.

The first source metal layer SDL1 (shown in FIG. 13) may be disposed on the interlayer insulating layer ILD. The first source metal layer SDL1 may include or define the initialization voltage line VIL, the scan initialization line GIL, the scan write line GWL, the PWM emission line PWEL, the first horizontal power line HVDL, the gate-off voltage line VGHL, the sweep line SWPL, the scan control line GCL, the PAM emission line PAEL, the test signal line TSTL, and the third power line VSL. The first source metal layer SDL1 may include the first and second data connection electrodes DCE1 and DCE2 and the first to seventh connection electrodes CCE1 to CCE7.

The scan write line GWL may be connected to the first gate connection electrode GCE1 through the first gate contact hole GCT1 and the third gate contact hole GCT3 defined through the second gate insulating layer GI2 and the interlayer insulating layer ILD. The scan initialization line GIL may be connected to the second gate connection electrode GCE2 through the second gate contact hole GCT2 defined through the second gate insulating layer GI2 and the interlayer insulating layer ILD. The PWM emission line PWEL may be connected to the sixth gate connection electrode GCE6 through the fourteenth contact hole CT14 defined through the second gate insulating layer GI2 and the interlayer insulating layer ILD. The scan control line GCL may be connected to the fourth gate connection electrode GCE4 through the eighth contact hole CT8 defined through the second gate insulating layer GI2 and the interlayer insulating layer ILD. The PAM emission line PAEL may be connected to the fifth gate connection electrode GCE5 through the nineteenth contact hole CT19 defined through the second gate insulating layer GI2 and the interlayer insulating layer ILD.

The initialization voltage line VIL may be connected to the second sub-drain electrode D32 and the sixth sub-drain electrode D102 through the first power contact hole VCT1 defined through the first gate insulating layer GI1, the second gate insulating layer GI2, and the interlayer insulating layer ILD. The initialization voltage line VIL may be connected to the tenth sub-drain electrode D162 and the eighteenth drain electrode D18 through the ninth contact hole CT9 defined through the first gate insulating layer GI1, the second gate insulating layer GI2, and the interlayer insulating layer ILD. The initialization voltage line VIL may be connected to the sixth capacitor electrode CE6 through the eighteenth contact hole CT18 defined through the interlayer insulating layer ILD. The first horizontal power line HVDL may be connected to the fifth source electrode S5 and the thirteenth source electrode S13 through the second power contact hole VCT2 defined through the first gate insulating layer GI1, the second gate insulating layer GI2, and the interlayer insulating layer ILD. The gate-off voltage line VGHL may be connected to the seventh source electrode S7 through the seventh contact hole CT7 defined through the first gate insulating layer GI1, the second gate insulating layer GI2, and the interlayer insulating layer ILD. The test signal line TSTL may be connected to the nineteenth gate electrode G19 through the twenty-third contact hole CT23 defined through the second gate insulating layer GI2 and the interlayer insulating layer ILD. The third power line VSL may be connected to the nineteenth drain electrode D19 through the twenty-fourth contact hole CT24 defined through the first gate insulating layer GI1, the second gate insulating layer GI2, and the interlayer insulating layer ILD.

The first data connection electrode DCE1 may be connected to the second source electrode S2 through the first data contact hole DCT1 defined through the first gate insulating layer GI1, the second gate insulating layer GI2, and the interlayer insulating layer ILD. The second data connection electrode DCE2 may be connected to the ninth source electrode S9 through the third data contact hole DCT3 defined through the first gate insulating layer GI1, the second gate insulating layer GI2, and the interlayer insulating layer ILD.

The first connection electrode CCE1 may be connected to the first gate electrode G1 through the first contact hole CT1 defined through the second gate insulating layer GI2 and the interlayer insulating layer ILD, and may be connected to the first sub-source electrode S31 and the fourth sub-drain electrode D42 through a second contact hole CT2 defined through the first gate insulating layer GI1, the second gate insulating layer GI2, and the interlayer insulating layer ILD.

The second connection electrode CCE2 may be connected to the seventeenth drain electrode D17 through the third contact hole CT3 defined through the first gate insulating layer GI1, the second gate insulating layer GI2, and the interlayer insulating layer ILD, may be connected to the fourteenth drain electrode D14 through the fourth contact hole CT4 defined through the first gate insulating layer GI1, the second gate insulating layer GI2, and the interlayer insulating layer ILD, and may be connected to the fourth capacitor electrode CE4 through the fifteenth contact hole CT15 defined through the interlayer insulating layer ILD.

The third connection electrode CCE3 may be connected to the nineteenth source electrode S19 through the twenty-first contact hole CT21 defined through the first gate insulating layer GI1, the second gate insulating layer GI2, and the interlayer insulating layer ILD.

The fourth connection electrode CCE4 may be connected to the sixth drain electrode D6 through the tenth contact hole CT10 defined through the first gate insulating layer GIL the second gate insulating layer GI2, and the interlayer insulating layer ILD, and may be connected to the fourth gate connection electrode GCE4 through the seventeenth contact hole CT17 defined through the second gate insulating layer GI2 and the interlayer insulating layer ILD.

The fifth connection electrode CCE5 may be connected to the twelfth source electrode S12 and the fourteenth source electrode S14 through the eleventh contact holes CT11 defined through the first gate insulating layer GIL the second gate insulating layer GI2, and the interlayer insulating layer ILD.

The sixth connection electrode CCE6 may be connected to the eighth gate electrode G8 through the twelfth contact hole CT12 defined through the second gate insulating layer GI2 and the interlayer insulating layer ILD, and may be connected to the fifth sub-source electrode S101 and the eighth sub-drain electrode D112 through the thirteenth contact hole CT13 defined through the first gate insulating layer GI1 the second gate insulating layer GI2, and the interlayer insulating layer ILD.

The seventh connection electrode CCE7 may be connected to the seventeenth drain electrode D17 and the eighteenth drain electrode D18 through the sixteenth contact holes CT16 defined through the first gate insulating layer GI1 the second gate insulating layer GI2, and the interlayer insulating layer ILD.

The first via layer VIA1 may be disposed on the first source metal layer SDL1. The first via layer VIA1 may flatten the upper end of the first source metal layer SDL1.

The first passivation layer PAS1 may be disposed on the first via layer VIA1 to protect the first source metal layer SDL1. The first passivation layer PAS1 may include an inorganic layer. In an embodiment, for example, the first passivation layer PAS1 may include at least one selected from a silicon nitride layer, a silicon oxynitride layer, a silicon oxide layer, a titanium oxide layer, and an aluminum oxide layer.

The second source metal layer SDL2 (shown in FIG. 13) may be disposed on the first passivation layer PAS1. The second source metal layer SDL2 may include or define the data line DL, the first vertical power line VVDL, and the PAM data line RDL. The second source metal layer SDL2 may further include or define the anode connection line ACL and the second power connection electrode VDCE.

The data line DL may be connected to the first data connection electrode DCE1 through the second data contact hole DCT2 defined through the first passivation layer PAS1 and the first via layer VIA'. The PAM data line RDL may be connected to the second data connection electrode DCE2 through the fourth data contact hole DCT4 defined through the first passivation layer PAS1 and the first via layer VIAL. The first vertical power line VVDL may be connected to the first horizontal power line HVDL through a third power contact hole VCT3 defined through the first passivation layer PAS1 and the first via layer VIAL. The third power contact hole VCT3 may overlap the second power contact hole VCT2 in the third direction (Z-axis direction). The area of the third power contact hole VCT3 may be larger than the area of the second power contact hole VCT2.

The anode connection line ACL may be connected to the seventh connection electrode CCE7 through the twentieth contact hole CT20 defined through the first passivation layer PAS1 and the first via layer VIA1, and may be connected to the third connection electrode CCE3 through the twenty-second contact hole CT22 defined through the first passivation layer PAS1 and the first via layer VIA1. The second power connection electrode VDCE may be connected to the fifth connection electrode CCE5 through the fourth power contact hole VCT4 defined through the first passivation layer PAS1 and the first via layer VIA1.

The second via layer VIA2 may be disposed on the second source metal layer SDL2. The second via layer VIA2 may flatten the upper end of the second source metal layer SDL2.

The second passivation layer PAS2 may be disposed on the second via layer VIA2 to protect the second source metal layer SDL2. The second passivation layer PAS2 may include an inorganic layer. In an embodiment, for example, the second passivation layer PAS2 may include at least one selected from a silicon nitride layer, a silicon oxynitride layer, a silicon oxide layer, a titanium oxide layer, and an aluminum oxide layer.

The third source metal layer SDL3 (shown in FIG. 13) may be disposed on the second passivation layer PAS2. The third source metal layer SDL3 may include or define a first sub-power line VDL21. The first sub-power line VDL21 may be connected to the second power connection electrode VDCE through a fifth power contact hole VCT5 defined through the second via layer VIA2.

The third via layer VIA3 may be disposed on the third source metal layer SDL3. The third via layer VIA3 may flatten the upper end of the third source metal layer SDL3.

The third passivation layer PAS3 may be disposed on the third via layer VIA3 to protect the third source metal layer SDL3. The third passivation layer PAS3 may include an inorganic layer. In an embodiment, for example, the third passivation layer PAS3 may include at least one selected from a silicon nitride layer, a silicon oxynitride layer, a silicon oxide layer, a titanium oxide layer, and an aluminum oxide layer.

The fourth source metal layer SDL4 (show in FIG. 13) may be disposed on the third passivation layer PAS3. The fourth source metal layer SDL4 may include or define a second sub-power line VDL22 and the first pixel electrode AND1.

The anode layer ANDL (shown in FIG. 13) may be disposed on the fourth source metal layer SDL4. The anode layer ANDL may include or define a third sub-power line VDL23 and the second pixel electrode AND2. The third sub-power line VDL23 and the second pixel electrode AND2 may include a TCO such as ITO or IZO.

The fourth passivation layer PAS4 may be disposed on the anode layer ANDL. The fourth passivation layer PAS4 may include an inorganic layer. In an embodiment, for example, the fourth passivation layer PAS4 may include at least one selected from a silicon nitride layer, a silicon oxynitride layer, a silicon oxide layer, a titanium oxide layer, and an aluminum oxide layer. The fourth passivation layer PAS4 may expose a part of the top surface of the pixel electrode AND without covering it.

The light emitting element ED may be disposed on the pixel electrode AND that is not covered by the fourth passivation layer PAS4. A contact electrode CAND may be disposed between the light emitting element ED and the pixel electrode AND to electrically connect the light emitting element ED and the pixel electrode AND.

The light emitting element ED may be an inorganic light emitting diode. The light emitting element ED may include a first semiconductor layer, an electron blocking layer, an active layer, a superlattice layer, and a second semiconductor layer that are sequentially stacked one on another.

The first semiconductor layer may be disposed on the contact electrode CAND. The first semiconductor layer may be doped with a first conductive dopant such as Mg, Zn, Ca, Se, Ba, or the like. In an embodiment, for example, the first semiconductor layer may be p-GaN doped with p-type Mg.

The electron blocking layer may be disposed on the first semiconductor layer. The electron blocking layer may be the layer for suppressing or preventing too many electrons from flowing into the active layer. In an embodiment, for example, the electron blocking layer may be p-AlGaN doped with p-type Mg. The electron blocking layer may be omitted.

The active layer may be disposed on the electron blocking layer. The active layer may emit light by coupling of electron-hole pairs based on an electrical signal applied through the first semiconductor layer and the second semiconductor layer.

The active layer may include a material having a single or multiple quantum well structure. In an embodiment where the active layer contains a material having a multiple quantum well structure, the active layer may have the structure in which a plurality of well layers and barrier layers are alternately laminated.

Alternatively, the active layer may have a structure in which semiconductor materials having large band gap energy and semiconductor materials having small band gap energy are alternately stacked one on another, and may include other group III to V semiconductor materials according to the wavelength band of the emitted light.

In an embodiment where the active layer includes InGaN, the color of emitted light may vary depending on the content of indium. In an embodiment, for example, as the content of indium increases, the wavelength band of the light emitted from the active layer may be shifted to a red wavelength band, and as the content of indium decreases, the wavelength band of the light emitted from the active layer may be shifted to a blue wavelength band. In an embodiment, for example, the content of indium (In) in the active layer of the light emitting element ED of the third pixel SP3 may be approximately 15%, the content of indium (In) in the active layer of the light emitting element ED of the second pixel SP2 may be approximately 25%, and the content of indium (In) in the active layer of the light emitting element ED of the first pixel SP1 may be 35% or higher. That is, by adjusting the content of indium (In) in the active layer, the light emitting element ED of the first pixel SP1 may emit light of a first color, the light emitting element ED of the second pixel SP2 may emit light of a second color, and the light emitting element ED of the third pixel SP3 may emit light of a third color.

The superlattice layer may be disposed on the active layer. The superlattice layer may be the layer for reducing stress between the second semiconductor layer and the active layer. In an embodiment, for example, the superlattice layer may include or be formed of InGaN or GaN. Alternatively, the superlattice layer may be omitted.

The second semiconductor layer may be disposed on the superlattice layer. The second semiconductor layer may be doped with a second conductive dopant such as Si, Ge, Sn, or the like. In an embodiment, for example, the second semiconductor layer may be n-GaN doped with n-type Si.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
a display area which displays an image; and
a non-display area disposed around the display area and comprising a pad part,
wherein the display area comprises:
unit pixels of a first pixel row which are unit pixels arranged in a first direction along the first pixel row, wherein each of the unit pixels of the first pixel row includes pixels which emit light of different colors, and the first direction is a direction crossing an extending direction of data lines;
unit pixels of a second pixel row which are unit pixels arranged in the first direction along the second pixel row next to the first pixel row, wherein each of the unit pixels of the second pixel row includes pixels which emit light of different colors; and
pixel circuits of a first circuit row which are pixel circuits arranged in the first direction along the first circuit row, wherein the pixel circuits of the first circuit row are electrically connected to pixels of the unit pixels of the first pixel row, respectively;
unit pixels of a third pixel row which are unit pixels arranged in the first direction along the third pixel row next to the second pixel row, wherein each of the unit pixels of the third pixel row includes pixels which emit light of different colors; and
a demultiplexer disposed between the second pixel row and the third pixel row,
wherein the first pixel row and the first circuit row are spaced apart from each other with the second pixel row interposed therebetween,
the first circuit row is disposed between the demultiplexer and the third pixel row.

2. The display device of claim 1, wherein
the display area further comprises a first anode connection line electrically connecting one of pixels of the unit pixels of the first pixel row to a corresponding one of the pixel circuits of the first circuit row, and
the first anode connection line overlaps the second pixel row.

3. The display device of claim 1, wherein the display area further comprises:
pixel circuits of a second circuit row which are pixel circuits arranged in the first direction along the second circuit row next to the first circuit row, wherein the pixel circuits of the second circuit row are electrically connected to pixels of the unit pixels of the second pixel row, respectively,
wherein the second pixel row and the second circuit row are spaced apart from each other with the third pixel row interposed therebetween.

4. The display device of claim 3, wherein
the display area further comprises a second anode connection line electrically connecting one of pixels of the unit pixels of the second pixel row to a corresponding one of the pixel circuits of the second circuit row, and
the second anode connection line overlaps the third pixel row.

5. The display device of claim 1, wherein
the display area further comprises a fan-out area including a fan-out line disposed between the pad part of the non-display area and the demultiplexer, and
the fan-out line is connected between the pad part and the demultiplexer.

6. The display device of claim 5, wherein the fan-out area overlaps the second pixel row.

7. The display device of claim 5, wherein
the display area further comprises an electrostatic discharging circuit disposed between the non-display area and the fan-out area, and
the electrostatic discharging circuit overlaps the first pixel row.

8. The display device of claim 1, wherein the display area further comprises:
a demultiplexer disposed between the first circuit row and the pad part;
an electrostatic discharging circuit disposed between the demultiplexer and the pad part; and
a fan-out line disposed between the electrostatic discharging circuit and the pad part.

9. The display device of claim 1, wherein the display area further comprises:
- an electrostatic discharging circuit disposed between the first circuit row and the pad part;
- a demultiplexer disposed between the electrostatic discharging circuit and the pad part; and
- a fan-out line disposed between the demultiplexer and the pad part.

10. A display device comprising:
- a display area which displays an image; and
- a non-display area disposed around the display area and comprising a pad part,
- wherein the display area comprises:
  - pixels of a first pixel row which are pixels arranged in a first direction along a first pixel row;
  - pixels of a second pixel row which are pixels arranged in the first direction along the second pixel row next to the first pixel row;
  - pixel circuits of a first circuit row which are pixel circuits arranged in the first direction along the first circuit row, wherein the pixel circuits of the first circuit row are electrically connected to the pixels of the first pixel row, respectively;
  - a demultiplexer spaced apart from the non-display area with the first pixel row and the second pixel row interposed therebetween; and
  - a fan-out line connected between the pad part and the demultiplexer.

11. The display device of claim 10, wherein the fan-out line overlaps the second pixel row.

12. The display device of claim 11, wherein
- the display area further comprises an electrostatic discharging circuit disposed between a fan-out area, which comprises the fan-out line, and the non-display area, and
- the electrostatic discharging circuit overlaps the first pixel row.

13. The display device of claim 10, wherein the first pixel row and the first circuit row are spaced apart from each other with the second pixel row interposed therebetween.

14. The display device of claim 10, wherein the display area further comprises:
- pixels of a third pixel row which are pixels arranged in the first direction along the third pixel row next to the second pixel row; and
- pixel circuits of a second circuit row which are pixel circuits arranged in the first direction along the second circuit row next to the first circuit row, wherein the pixel circuits of the second circuit row are electrically connected to the pixels of the second pixel row, respectively,
- wherein the second pixel row and the second circuit row are spaced apart from each other with the third pixel row interposed therebetween.

15. The display device of claim 14, wherein the demultiplexer and the first circuit row are disposed between the second pixel row and the third pixel row.

16. A display device comprising:
- a display area which displays an image; and
- a non-display area disposed around the display area and comprising a pad part,
- wherein the display area comprises:
  - pixels of a first pixel row which are pixels arranged in a first direction along the first pixel row;
  - pixels of a second pixel row which are pixels arranged in the first direction along the second pixel row next to the first pixel row;
  - a plurality of demultiplexers spaced apart from the non-display area with the second pixel row interposed therebetween;
  - a clock line disposed between the plurality of demultiplexers and extending in a second direction crossing the first direction;
  - a voltage line spaced apart from the clock line with at least one demultiplexer of the plurality of demultiplexers interposed therebetween; and
  - a gate driver comprising a plurality of stages connected to the clock line and the voltage line.

17. The display device of claim 16, wherein the display area further comprises:
- pixel circuits of a first circuit row which are pixel circuits arranged in the first direction along a first circuit row, wherein the pixel circuits of the first circuit row are electrically connected to the pixels of the first pixel row, respectively;
- pixels of a third pixel row which are pixels arranged in the first direction along the third pixel row next to the second pixel row;
- pixel circuits of a second circuit row which are pixel circuits arranged in the first direction along the second circuit row next to the first circuit row, wherein the pixel circuits of the second circuit row are electrically connected to the pixels of the second pixel row, respectively; and
- pixel circuits of a third circuit row which are pixel circuits arranged in the first direction along a third circuit row next to the second circuit row wherein the pixel circuits of the third circuit row are electrically connected to the pixels of the third pixel row, respectively,
- wherein the gate driver is spaced apart from the non-display area with the third pixel row interposed therebetween.

18. The display device of claim 17, wherein
- the gate driver comprises a first stage electrically connected to a first gate line connected to the first circuit row, and
- the first stage is electrically connected to the first gate line through a connection line overlapping the second circuit row and the third circuit row.

19. The display device of claim 18, wherein
- the first gate line comprises a scan initialization line and a scan write line, and
- the first stage comprises:
  - a scan initialization stage which supplies a scan initialization signal to the scan initialization line; and
  - a scan write stage which supplies a scan write signal delayed in phase from the scan initialization signal to the scan write line.

20. A tiled display device comprising:
- a plurality of display devices, each comprising a display area which displays an image and a non-display area surrounding the display area; and
- a coupling area disposed between the plurality of display devices,
- wherein the display area of each of the plurality of display devices comprises:
  - unit pixels of a first pixel row which are unit pixels arranged in a first direction along the first pixel row, wherein each of the unit pixels of the first pixel row includes pixels which emit light of different colors, and the first direction is a direction crossing an extending direction of data lines;
  - unit pixels of a second pixel row which are unit pixels arranged in the first direction along the second pixel row next to the first pixel row, wherein each of the unit pixels of the second pixel row includes pixels which emit light of different colors;

pixel circuits of a first circuit row which are pixel circuits arranged in the first direction along the first circuit row, wherein the pixel circuits of the first circuit row are electrically connected to pixels of the unit pixels of the first pixel row, respectively;

unit pixels of a third pixel row which are unit pixels arranged in the first direction along the third pixel row next to the second pixel row, wherein each of the unit pixels of the third pixel row includes pixels which emit light of different colors; and a demultiplexer disposed between the second pixel row and the third pixel row, wherein the first pixel row and the first circuit row are spaced apart from each other with the second pixel row interposed therebetween, the first circuit row is disposed between the demultiplexer and the third pixel row.

21. The tiled display device of claim 20, wherein pixels of the unit pixels of the first pixel row and the second pixel row include a flip chip type micro light emitting diode element.

* * * * *